(12) United States Patent
Lute et al.

(10) Patent No.: US 8,181,857 B1
(45) Date of Patent: *May 22, 2012

(54) BANKING SYSTEM CONTROLLED RESPONSIVE TO DATA BEARING RECORDS

(75) Inventors: Richard C. Lute, Mogadore, OH (US); Klaus Steinbach, Canton, OH (US); Pedro Tula, North Canton, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 460 days.

This patent is subject to a terminal disclaimer.

(21) Appl. No.: 12/386,264

(22) Filed: Apr. 14, 2009

Related U.S. Application Data

(63) Continuation-in-part of application No. 12/229,759, filed on Aug. 26, 2008.

(60) Provisional application No. 61/124,530, filed on Apr. 16, 2008, provisional application No. 60/966,709, filed on Aug. 29, 2007.

(51) Int. Cl.
*G07F 19/00* (2006.01)

(52) U.S. Cl. ............ 235/379; 902/8.22; 705/43
(58) Field of Classification Search .......... 235/379, 235/375, 487; 902/83–22, 8.22, 30; 705/43
See application file for complete search history.

(56) References Cited

U.S. PATENT DOCUMENTS 7,938,317 B1 * 5/2011 Lute et al. ............ 235/379

* cited by examiner

*Primary Examiner* — Karl D. Frech
(74) *Attorney, Agent, or Firm* — Ralph E. Jocke; Daniel D. Wasil; Walker & Jocke

(57) ABSTRACT

An automated banking machine is operated responsive to data read from data bearing records. The automated banking machine operates responsive to the card data read from user cards to carry out financial transfers for authorized users. The banking machine includes a top housing, a fascia assembly, a support, a card reader, a display, a cash dispenser, and a chest portion. An automated banking machine includes a processor case in horizontally pivotally supported connection with the housing, and which may be released from supported connection with the housing.

20 Claims, 47 Drawing Sheets

BANKING SYSTEM CONTROLLED RESPONSIVE TO DATA BEARING RECORDS

CROSS REFERENCE TO RELATED APPLICATIONS

This Application claims benefit pursuant to 35 U.S.C. §119 (e) of Provisional Application 61/124,530 filed Apr. 16, 2008. This Application is also a continuation-in-part of U.S. application Ser. No. 12/229,759 filed Aug. 26, 2008 which application claims benefit pursuant to 35 U.S.C. §119(e) of Provisional Application 60/966,709 filed Aug. 29, 2007. The disclosure of each of these applications is incorporated herein by reference.

TECHNICAL FIELD

This invention relates to automated banking machines that operate responsive to data read from user cards and which may be classified in U.S. Class 235, Subclass 379.

BACKGROUND ART

Automated banking machines may include a card reader that operates to read data from a bearer record such as a user card. The automated banking machine may operate to cause the data read from the card to be compared with other computer stored data related to the bearer. The machine operates in response to the comparison determining that the bearer is an authorized system user to carry out at least one transaction which is operative to transfer value to or from at least one account. A record of the transaction is also commonly printed through operation of the automated banking machine and provided to the user. A common type of automated banking machine used by consumers is an automated teller machine which enables customers to carry out banking transactions. Banking transactions carried out may include the dispensing of cash, the making of deposits, the transfer of funds between accounts and account balance inquiries. The types of banking transactions a customer can carry out are determined by the capabilities of the particular banking machine and the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine or an ATM shall be deemed to include any machine that may be used to electronically carry out transactions involving transfers of value.

Automated banking machines may benefit from improvements.

OBJECTS OF EXEMPLARY EMBODIMENTS

It is an object of an exemplary embodiment to provide a banking system apparatus that is operated responsive to data bearing records.

It is an object of an exemplary embodiment to provide an automated banking machine.

It is a further object of an exemplary embodiment to provide an automated banking machine that has an attractive appearance.

It is a further object of an exemplary embodiment to provide an automated banking machine which is more readily serviced.

It is a further object of an exemplary embodiment to provide an automated banking machine which is more readily manufactured.

It is a further object of an exemplary embodiment to provide an automated banking machine which requires less space for servicing.

It is a further object of an exemplary embodiment to provide an automated banking machine which provides improved access for servicing of internal components.

It is a further object of an exemplary embodiment to provide a method for manufacturing an automated banking machine.

It is a further object of an exemplary embodiment to provide a method for servicing an automated banking machine.

Further objects of exemplary embodiments will be made apparent in the following Detailed Description of Exemplary Embodiments and the appended claims.

The foregoing objects are accomplished in an exemplary embodiment by an automated banking machine which includes a top housing bounding an interior area. The automated banking machine includes a card reader that reads data from user cards. The data read from user cards is used to enable the machine to operate to carry out financial transactions. The top housing defines a front opening to the interior area. The top housing is mounted above a secure enclosure which is alternatively referred to herein as a chest or safe.

The top housing houses upper banking machine components which may include, for example, a display, the card reader, a receipt printer, a keypad, controllers, actuators, sensors, and others. As used herein "keypad" means input keys whether arranged in a keypad arrangement, keyboard arrangement, or otherwise, and the designations are interchangeable unless expressly identified as being used in a restricted manner. The chest houses lower banking machine components which may include, for example, a currency dispenser mechanism, a currency recycler, a secure deposit holding container and other devices.

The exemplary automated banking machine includes an upper fascia adapted to selectively cover the front opening. The upper fascia may include a rearwardly extending projection which selectively overlies a forward region of the top housing adjacent the front opening to provide an attractive appearance to the machine. In one embodiment, the upper fascia is movable from a first position where the upper fascia covers the front opening, and a second position where the fascia is disposed away from the front opening.

A lower fascia is moveably mounted in supporting connection with the chest. The lower fascia of an exemplary embodiment is selectively movable between a covering position where the lower fascia covers a closed chest door and an accessible position where the lower fascia is disposed away from the closed chest door.

The lower fascia may include first and second side extensions so that when the lower fascia is in the covering position the first and second side extensions respectively cover forward portions of the first and second side walls of the chest housing.

In one exemplary embodiment, a rollout tray is moveably mounted in supporting connection with the top housing. Several of the upper banking machine components may be supported on the rollout tray. Additionally, the upper fascia may be mounted to the rollout tray. The rollout tray is movable between a retractable position where the rollout tray is in the interior area and an extended position where the rollout tray extends from the front opening. When the rollout tray is in the retracted position, the upper fascia selectively covers the front opening. When the rollout tray is in the extended position, the banking components mounted thereon may be more readily serviced.

The chest of the exemplary embodiment includes a door selectively movable between a closed position and an open position. In one embodiment, when the lower fascia is in the accessible position and the chest door is in the open position, the lower fascia is adapted to engage the chest door to retain the door in the open position. The lower fascia is adapted for movement away from the chest door in order to release the door from engagement with the lower fascia.

In one exemplary embodiment, the chest housing includes a first opening at a first end thereof and a second opening at a second end thereof. Thus, a master ATM chest housing may be used in either front-load or rear-load ATM. A first chest door is an operable door and is adapted for selectively closing the first opening. A locking bolt mechanism is carried on the operable chest door.

A second chest door, not generally used during regular operation of the automated transaction machine, can be adapted to semi-permanently close the second opening. An alternate securing mechanism, such as bolts or other fasteners, may be used to semi-permanently engage the second chest door with the housing. As a result, the functional uses of the first and second chest doors can be selected so that the second chest door becomes the operational door, and the other door is securely mounted in a fixed position.

In one exemplary embodiment, a processor case housing the primary processor for the automated transaction machine is rotationally mounted in supporting connection with the chest. The processor case is adapted for rotational movement between an operational position and a service position. In the operational position, a first functional side of the processor case faces a side wall of the top housing. In the service position, the first functional side of the processor case faces a front opening of the top housing.

In one embodiment, a rollout tray, supporting several upper banking machine components, is movable from a retracted position to an extended position to allow the processor case to rotate into the service position. In the service position, cables, connections, and other components, including one or more processors, are accessible for servicing.

In another exemplary embodiment, a top housing cover is mounted in slidable supporting relationship with the chest housing. Several upper banking machine components may be supported on a mounting tray equipped with side flanges. The top housing cover may include channel members for slidable engagement with the side flanges. The upper banking machine components may be accessed for servicing by rearwardly sliding the top housing cover. A plurality of fasteners and/or locking mechanisms may be employed to secure the top housing cover in an operational position. Alternately, the mounting tray may include channel members for slidable engagement with flange members carried on the top housing cover.

In another exemplary embodiment, an automated banking machine includes a top housing mounted in supporting connection with a chest. The machine includes a card reader, operative to read indicia on user cards corresponding to financial accounts, in operatively supported connection with the top housing, a display in operatively supported connection with the top housing, and a cash dispenser in operatively supported connection with the top housing. The exemplary embodiment further includes a chest having a first sidewall and a second sidewall, the second sidewall including a striker plate and a locking bolt aperture, and a chest door moveably mounted in supporting connection with the first sidewall. The exemplary embodiment further includes a locking bolt moveably mounted to the chest door, the locking bolt including a locking bolt projection configured to mate with the locking bolt aperture. When the chest door is in a closed position, the locking bolt is moveable between an unlocked position, the locking bolt projection free of the locking bolt aperture, and a locked position, wherein the locking bolt projection is engaged with the locking bolt aperture. The embodiment further includes an aligner operably connected with the locking bolt and adjustable to align the chest door with the striker plate.

In a further exemplary embodiment, the automated banking machine includes fascia trim mounted in supporting connection with the chest door and operative to cooperate with the second sidewall to hide the locking bolt projection and the locking bolt aperture. Adjustments to the aligner are operable to align the fascia trim with the second sidewall.

In a further exemplary embodiment, the aligner includes a set screw with male threads which cooperates with female threads formed in the locking bolt. In a further exemplary embodiment, the aligner is operably connected with the locking bolt projection. In a further exemplary embodiment, the aligner is spring-loaded. In a further exemplary embodiment, the aligner operates with a ratchet mechanism, the ratchet mechanism including teeth and a pawl.

In a further exemplary embodiment, a method is provided for servicing components of an automated banking machine. The exemplary automated banking machine includes a top housing mounted in supporting connection with a chest. The machine further includes a card reader, operative to read indicia on user cards corresponding to financial accounts, in operatively supported connection with the top housing, a display in operatively supported connection with the top housing, and a cash dispenser in operatively supported connection with the top housing. The exemplary automated banking machine further includes a chest having a first sidewall and a second sidewall, the second sidewall including a striker plate and a locking bolt aperture, and a chest door moveably mounted in supporting connection with the first sidewall. The exemplary automated banking machine further includes a locking bolt moveably mounted to the chest door, the locking bolt including a locking bolt projection configured to mate with the locking bolt aperture. When the chest door is in a closed position, the locking bolt is moveable between an unlocked position, the locking bolt projection free of the locking bolt aperture, and a locked position, the locking bolt projection engaged with the locking bolt aperture. The exemplary automated banking machine further includes an aligner operably connected with the locking bolt and adjustable to align the chest door with the striker plate. The method comprises the steps of moving the locking bolt from the locked position to the unlocked position, opening the chest door by moving it from the closed to the open position, subsequently servicing at least one component of the automated banking machine, closing the chest door by moving it from the open to the closed position, moving the locking bolt from the unlocked position to the locked position, and adjusting the aligner to align the chest door with the striker plate.

In a further exemplary embodiment, the aligner includes a set screw and the step of adjusting includes screwing the aligner further into the locking bolt, thereby drawing the chest door toward the striker plate.

In a further exemplary embodiment, a method is provided for constructing an automated banking machine. The method comprises mounting a top housing in supporting connection with a chest adapted for use in an automated banking machine. The chest includes at least a portion of a currency dispenser, a first sidewall, a second sidewall, the second sidewall including a striker plate and a locking bolt aperture, a chest door moveably mounted in supporting connection with the first sidewall, a locking bolt moveably mounted to the chest door, the locking bolt having a locking bolt projection configured to mate with the locking bolt aperture, wherein when the chest door is in a closed position, the locking bolt is moveable between an unlocked position, wherein the locking bolt projection is free of the locking bolt aperture, and a locked position, wherein the locking bolt projection is engaged with the locking bolt aperture, and an aligner operably connected with the locking bolt, wherein the aligner is adjustable to align the chest door with the striker plate. The method further comprises mounting a card reader in operatively supported connection with the top housing, wherein the card reader is operative to read indicia on user cards corresponding to financial accounts, mounting a display in operatively supported connection with the top housing, and adjusting the aligner whereby when the chest door is in the closed position and the locking bolt is in the locked position, the chest door is seated on the striker plate.

In a further exemplary embodiment, an automated banking machine comprises a secure enclosure, including a chest, a housing in operatively supported connection with the chest and including an interior and at least one opening, a card reader in operatively supported connection with the housing, the card reader operative to read indicia on user cards corresponding to financial accounts, a display in operatively supported connection with the housing, a cash dispenser in operatively supported connection with the housing, and a fascia assembly in operatively supported connection with the housing and moveable between a secure closed position adjacent the housing opening, at least a portion of the housing opening covered by the fascia assembly, and a released away position, the fascia assembly at least partially separated from the housing opening. The fascia assembly comprises a fascia frame and a fascia cover in operatively supported connection with the fascia frame. The automated banking machine further comprises a support in operatively supported connection with the housing and moveable between a position substantially within the interior of the housing and a position wherein at least a portion of the support is extended through the housing opening, and wherein at least one of the fascia frame and the support comprises at least a first hook and the other comprises at least a first slot, the at least first hook and the at least first slot formed to engage each other, and the fascia assembly is mounted to the support with the at least first hook engaged with the at least first slot.

In a further exemplary embodiment, the automated banking machine further comprises an at least first tab adjacent the at least first slot, the at least first tab formed to guide the at least first hook into the at least first slot. In a further exemplary embodiment, the support is slideably mounted to the housing.

In a further exemplary embodiment, a method is provided for manufacturing an automated banking machine. The method comprises mounting a housing in supporting connection with a chest adapted for use in an automated banking machine, the housing comprising an interior and at least one opening into the interior. Installing a card reader in operatively supported connection with the housing, wherein the card reader is operative to read indicia on user cards corresponding to financial accounts. Installing a display in operatively supported connection with the housing. Installing a cash dispenser in operatively supported connection with the housing. Installing a support in operatively supported connection with the housing, the support moveable between a position substantially within the interior area of the housing and a position wherein at least a portion of the support is extended through the housing opening. Mounting a fascia assembly to the support, the fascia assembly comprising a fascia frame and a fascia cover in operatively supported connection with the fascia frame. At least one of the fascia frame and the support comprises at least a first hook and the other comprises at least a first slot, the at least first hook and the at least first slot formed to engage each other, engaging the at least first hook with the at least first slot.

In a further exemplary embodiment, the method further comprises moving the at least first hook to an offset position relative to the at least first slot. In a further exemplary embodiment, the method further comprises securing the fascia assembly to the support.

In a further exemplary embodiment, a method is provided for servicing an automated banking machine. The method comprises moving a fascia assembly, which is in operatively supported connection with a housing of an automated banking machine, from a secure closed position adjacent an opening to an interior of the housing to a released away position away from the opening. The automated banking machine comprises a card reader in operatively supported connection with the housing and operative to read indicia corresponding to financial accounts on user cards, a display in operatively supported connection with the housing, a printer in operatively-supported connection with the housing and operative to print information corresponding to financial accounts and financial transactions, a cash dispenser in operatively supported connection with the housing, and a support in operatively supported connection with the housing, the support moveable between a position substantially within the interior of the housing and a position wherein at least a portion of the support is extended through the housing opening. The fascia assembly comprises a fascia frame and a fascia cover in operatively supported connection with the fascia frame. At least one of the fascia frame and the support comprises at least a first hook and the other comprises at least a first slot, the at least first hook and the at least first slot formed to engage each other. The method further comprises disengaging the at least first hook from the at least first slot, servicing at least one of a serviceable automated banking machine component, engaging the at least first hook with the at least first slot, and moving the fascia assembly from the released away position from the opening to the secure closed position adjacent the opening.

The fascia assembly may be further secured to the support with one or more fasteners and the method further comprises releasing the one or more fasteners securing the fascia assembly to the support. The method may further comprise securing the one or more fasteners securing the fascia assembly to the support.

In a further exemplary embodiment, an automated banking machine comprises a secure enclosure, including a chest, a housing in operatively supported connection with the chest, and the housing includes an interior and at least one opening into the interior of the housing. In operatively supported connection with the housing is a card reader, the card reader operative to read indicia on user cards corresponding to financial accounts, a display, a cash dispenser, and a fascia assembly. The fascia assembly is moveable between a secure closed position adjacent to the housing opening, where at least a portion of the housing opening is covered by the fascia assembly, and a released away position, where the fascia assembly is at least partially separated from the housing opening. An automated banking machine component is in horizontally pivotally operatively supported first connection with the housing and in releasably supported second connection with the housing.

In a further exemplary embodiment, an automated banking machine comprises a secure enclosure, including a chest and a housing in operatively supported connection with the chest. The housing includes an interior and at least one opening into the interior of the housing. In operatively supported connection with the housing is a card reader, the card reader operative to read indicia on user cards corresponding to financial accounts, a display, a cash dispenser, and a fascia assembly. The fascia assembly is moveable between a secure closed position adjacent to the housing opening, where at least a portion of the housing opening is covered by the fascia assembly, and a released away position, where the fascia assembly is at least partially separated from the housing opening. An automated banking machine component is in operatively supported connection with the housing. The automated banking machine further comprises a shroud adapted to at least partially enclose the automated banking machine component. The shroud comprises a first alignment tab which is formed to align the automated banking machine component is the vertical direction and a second alignment tab formed to align the automated banking machine component in a horizontal direction. Movement of the automated banking machine component may be further limited in other horizontal directions to help secure the component in an operational position.

In an exemplary embodiment, a method is provided for manufacturing an automated banking machine. The method comprises mounting a housing in supporting connection with a chest adapted for use in an automated banking machine. The housing comprises an interior and an opening to the interior. The method further comprises installing, in operatively supported connection with the housing, a card reader, operative to read indicia on user cards corresponding to financial accounts, a display, a cash dispenser, and a printer, operative to print information corresponding to financial accounts and financial transactions. The method further comprises installing an automated banking machine component horizontally and pivotally in operatively supported connection with the housing at, for example, the back of the component. The method further comprises securing, for example, the front of the component to limit pivotal movement of the component.

In a further exemplary embodiment, a method is provided for manufacturing an automated banking machine. The method comprises mounting a housing in supporting connection with a chest adapted for use in an automated banking machine. The housing comprises an interior and an opening to the interior. The method further comprises installing, in operatively supported connection with the housing, a card reader, operative to read indicia on user cards corresponding to financial accounts, a display, a cash dispenser, and a printer, operative to print information corresponding to financial accounts and financial transactions. The method further comprises installing an automated banking machine component in operatively supported connection with the housing. The component is moveable between an operational position and a first service position and the operational position and a second service position. The method further comprises installing a shroud, the shroud at least partially enclosing the automated banking machine component. The shroud comprises a first alignment tab, formed to align the automated banking machine component in the vertical direction and a second alignment tab, formed to align the automated banking machine component in a first horizontal direction. A retainer, formed to limit movement of the component in a second horizontal direction, is installed.

In a further exemplary embodiment, a method is provided for servicing an automated banking machine. The method comprises accessing an interior of a housing of an automated banking machine. The automated banking machine includes, in operatively supported connection with the housing, a card reader, operative to read indicia on user cards corresponding to financial accounts, a display, a cash dispenser, and an automated banking machine component, at least partially within the housing interior. The automated banking machine component is in horizontally pivotally supported first connection with the housing and in releasably supported second connection with the housing. The method further comprises releasing the component second connection, pivoting the component from an operational position to a first service position, servicing the component, pivoting the component from the first service position to the operational position, and securing the component second connection.

In a further exemplary embodiment, a method is provided for servicing an automated banking machine. The method comprises accessing an interior of a housing of an automated banking machine. The automated banking machine includes, in operatively supported connection with the housing, a card reader, operative to read indicia on user cards corresponding to financial accounts, a display, a cash dispenser, and an automated banking machine component. The automated banking machine component is moveable from an operational position to a first service position toward a front housing opening and moveable from the operational position to a second service position toward a read housing opening. A shroud, adapted to at least partially enclose the automated banking machine component, is in operatively supported connection with the housing. The shroud comprises a first alignment tab, formed to align the automated banking machine component in the vertical direction, and a second alignment tab, formed to align the automated banking machine component in a horizontal direction. The method further comprises releasing a latch limiting movement of the component from the operational position, moving the component from the operational position to the service position selected from the first service position and the second service position, servicing the component, moving the component to the operational position, and securing the latch.

In a further exemplary embodiment, a method is provided for servicing an automated banking machine. The method comprises accessing an interior of a housing of an automated banking machine. The automated banking machine includes, in operatively supported connection with the housing, a card reader, operative to read indicia on user cards corresponding to financial accounts, a display, a cash dispenser, a shroud, the shroud adapted to at least partially enclose a first automated banking machine component, a second automated banking machine component, in slideable connection with the housing and in a spaced-apart relation to the shroud, the second automated banking machine component moveable between an operational position adjacent the shroud to a service position toward an opening of the housing, and an ancillary banking machine component, secured between the shroud and the second component. The method further comprises moving the second component from the operational position to the service position, servicing the ancillary automated banking machine component, and moving the second component from the service position to the operational position.

The principles described in connection with these exemplary embodiments may be applied to numerous automated banking machine configurations.

DETAILED DESCRIPTION OF EXEMPLARY EMBODIMENTS

Figure 1:
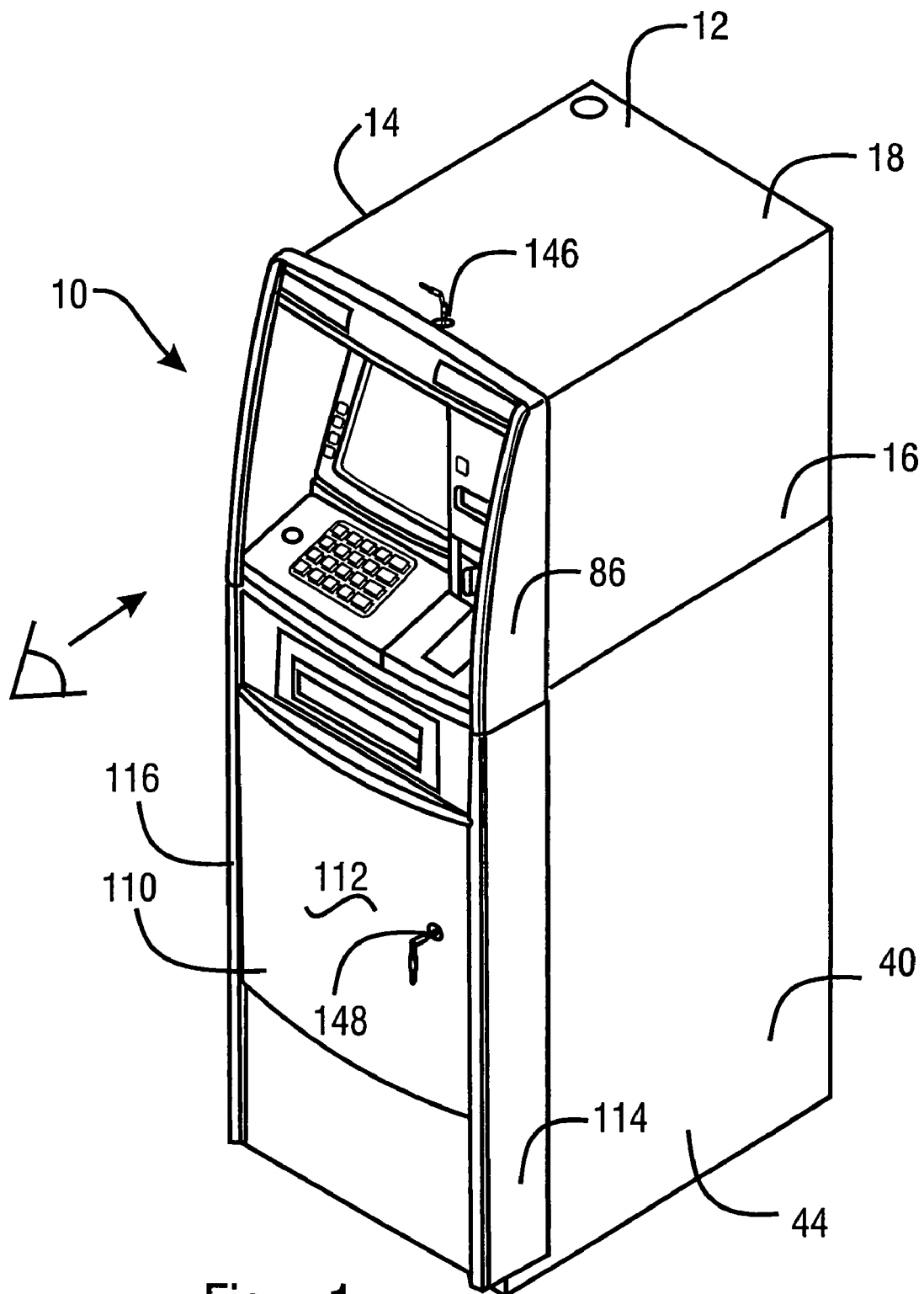
FIG. 1 is an isometric view of an automated banking machine of an exemplary embodiment.
Figure 2:
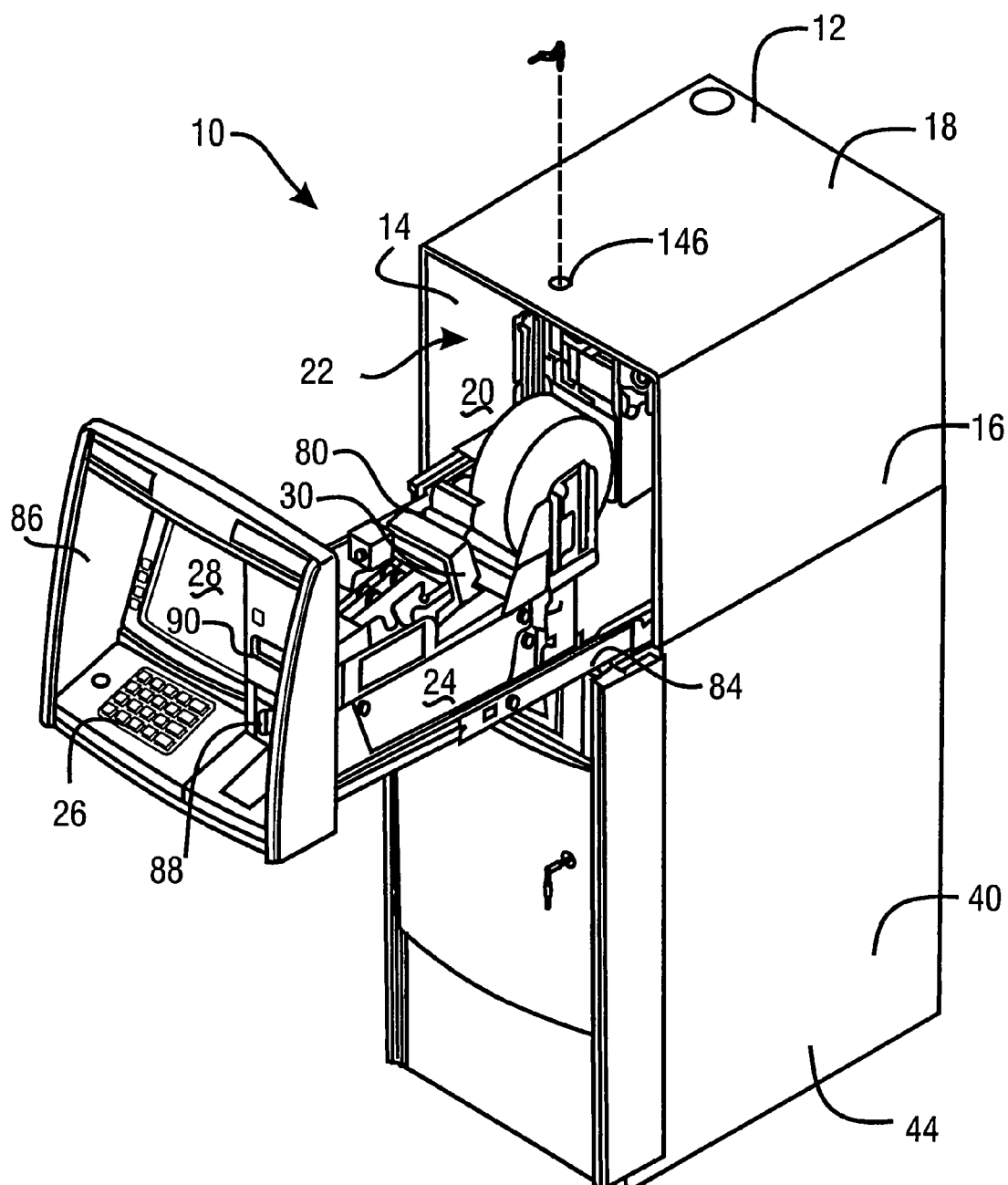
FIG. 2 is an isometric view of the automated banking machine of FIG. 1 with a rollout tray extended.

Referring now to the drawings, and particularly to FIGS. 1-2, there is shown therein an automated banking machine of a first exemplary embodiment, generally indicated 10. In this exemplary embodiment, automated banking machine 10 is an automated teller machine (ATM). ATM 10 includes a top housing 12 having side walls 14 and 16, and top wall 18.

Housing 12 encloses an interior area indicated 20. Housing 12 has a front opening 22. In this exemplary embodiment, the rear of housing 12 is closed by a rear wall 19, shown in FIG. 7. However, in other embodiments, the rear of housing 12 may be accessible through an access door or similar device. Top housing 12 is used to house certain banking machine components such as input and output devices.

Figure 3:
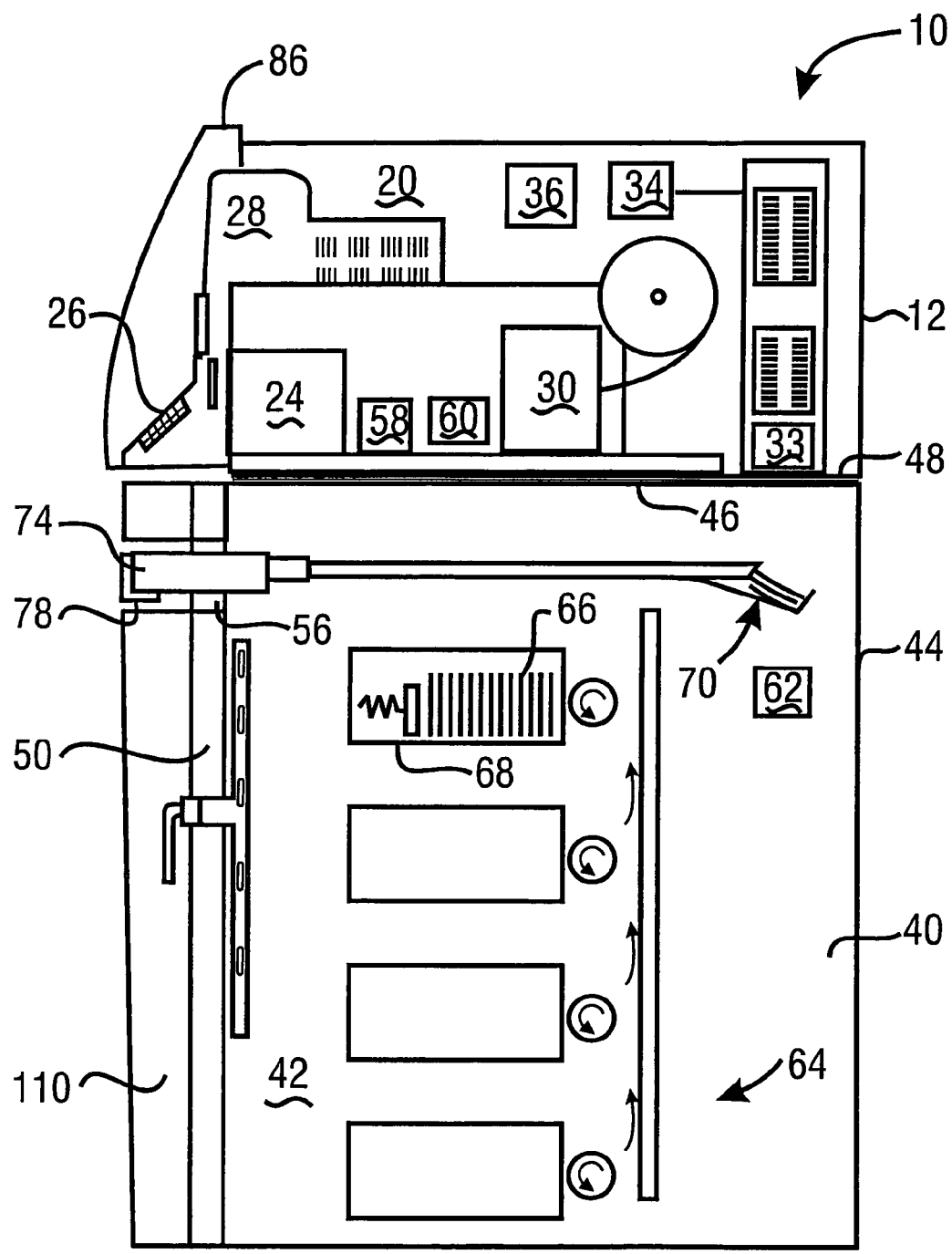
FIG. 3 is a side view of an automated banking machine illustrating various banking machine components.

With reference to FIG. 3, in this exemplary embodiment the input devices include a card reader schematically indicated 24. Card reader 24 is operative to read a customer's card which includes indicia thereon. The indicia may correspond to information about the customer and/or information about a customer's financial account, such as the customer's account number. In some embodiments, the card reader 24 may be a card reader adapted for reading magnetic stripe cards and/or so called "smart cards" which include a programmable memory. Other embodiments may read data from cards wirelessly such as RFID cards. Exemplary embodiments may include features of the type discussed in U.S. Pat. No. 7,118,031 the disclosure of which is incorporated herein by reference.

Another input device in the exemplary embodiment includes input keys 26. Input keys 26 may, in embodiments, be arranged in a keypad or keyboard. Input keys 26 may alternately, or in addition, include function keys or other types of devices for receiving manual inputs. It should be understood that in various embodiments other types of input devices may be used such as biometric readers, speech or voice recognition devices, inductance type readers, IR type readers, and other devices capable of communicating with a person, article or computing device, radio frequency type readers, and other types of devices which are capable of receiving information that identifies a customer and/or their account.

The exemplary embodiment of machine 10 also includes output devices providing outputs to the customer. In the exemplary embodiment machine 10 includes a display 28. Display 28 may include an LCD, CRT or other type display that is capable of providing visible indicia to a customer. In other embodiments, output devices may include devices such as audio speakers, RF transmitters, IR transmitters, or other types of devices that are capable of providing outputs which may be perceived by a user either directly or through use of a computing device, article, or machine. It should be understood that embodiments may also include combined input and output devices such as a touch-screen display which is capable of providing outputs to a user as well as receiving inputs.

The exemplary embodiment of the automated banking machine 10 also includes a receipt printer schematically indicated 30. The receipt printer is operative to print receipts for users reflecting transactions conducted at the machine. Embodiments may also include other types of printing mechanisms such as statement printer mechanisms, ticket printing mechanisms, check printing mechanisms, and other devices that operate to apply indicia to media in the course of performing transactions carried out with the machine.

Automated banking machine 10 further includes one or more processors schematically indicated 33. Processor 33, alternately referred to as a computer or a controller, is in operative connection with at least one memory or data store which is schematically indicated 34. The processor 33 is operative to carry out programmed instructions to achieve operation of the machine in accomplishing transactions. The processor 33 is in operative connection with a plurality of the transaction function devices included in the machine.

The exemplary embodiment includes at least one communications device 36. The communications device 36 may be one or more of a plurality of types of devices that enable the machine to communicate with other systems and devices for purposes of carrying out transactions. For example, communications device 36 may include a modem for communicating messages over a data line or wireless network, with one or more other computers that operate to transfer data representative of the transfer of funds in response to transactions conducted at the machine. Alternately the communications device 36 may include various types of network interfaces, line drivers, or other devices suitable to enable communication between the machine 10 and other computers and systems. Exemplary embodiments may include features like those disclosed in U.S. Pat. No. 7,266,526 the disclosure of which is incorporated herein by reference.

ATM 10 further includes a safe or chest 40 enclosing a secure area 42. Secure area 42 is used in the exemplary embodiment to house critical components and valuable documents. Specifically in the exemplary embodiment secure area 42 is used for housing currency, currency dispensers, currency stackers, and other banking machine components. For purposes of this disclosure a cash dispenser shall include any mechanism that makes currency stored within the machine accessible from outside the machine. Cash dispensers may include features of the type disclosed in U.S. Pat. Nos. 7,261,236; 7,240,829; 7,114,006; 7,140,607 and 6,945,526 the disclosures of which are incorporated herein by reference.

Chest 40 includes a chest housing 44 including a top wall 46 having an upper surface 48 outside of the secure area 42. Top housing 12 is supported on the chest 40 such that the secure area 42 is generally below the interior area 20.

Chest 40 also includes a chest door 50 that is moveably mounted in supporting connection with the housing. Chest door 50, shown in the closed position in FIG. 4 and in an open condition in FIG. 5, is generally closed to secure the contents of the chest 40. In this exemplary embodiment, the chest door 50 is used to close a first opening 52 at a first end 54 of the chest housing 44. In other embodiments the chest opening and door may have other configurations. In the exemplary embodiment, chest door 50 includes a first device opening 56 therethrough and cooperates with mechanisms inside and outside the chest for passing currency or other items between a customer and devices located inside the chest 40.

Referring again to FIG. 3, machine 10 also includes a plurality of sensing devices for sensing various conditions in the machine. These various sensing devices are represented schematically by component 58 for simplicity and to facilitate understanding. It should be understood that a plurality of sensing devices is provided in the machine for sensing and indicating to the processor 33 the status of devices within the machine.

Exemplary automated banking machine 10 further includes a plurality of actuators schematically indicated 60 and 62. The actuators may comprise a plurality of devices such as motors, solenoids, cylinders, rotary actuators, and other types of devices that are operated responsive to the processor 33. It should be understood that numerous components within the automated banking machine are operated by actuators positioned in operative connection therewith. Actuators 60 and 62 are shown to schematically represent such actuators in the machine and to facilitate understanding.

Machine 10 further comprises at least one currency dispenser mechanism 64 housed in secure area 42. The currency dispensing mechanism 64 is operative responsive to the processor 33 to pick currency sheets from a stack of sheets 66 housed in one or more canisters 68. The picked currency sheets may be arranged by a currency stacker mechanism 70 for presentation through a delivery mechanism 74 which operates to present a stack of notes or other documents to a customer.

When chest door 50 is in the closed position, at least an end portion of a sheet delivery mechanism 74 extends through first opening 56 in the chest door 50. In response to operation of the processor 33, when a desired number of currency sheets have been collected in a stack, the stack is moved through delivery mechanism 74.

As the sheets are moved through delivery mechanism 74 toward the first opening 56, the controller 32 operates a suitable actuating device to operate a gate 78 so as to enable the stack of sheets to pass outward through the opening. As a result, the user is enabled to receive the sheets from the machine. After a user is sensed as having removed the stack from the opening, the controller may operate to close the gate 78 so as to minimize the risk of tampering with the machine.

With reference to FIG. 2, in this exemplary embodiment, ATM 10 further includes a rollout tray 80. Rollout tray 80 is moveably mounted in supporting connection with slides 84. The slides 84 enable movement of the rollout tray 80 between the extended position shown in FIG. 2 and a retracted position within the interior area 20 of the top housing 12. Rollout tray 80 in the exemplary embodiment may be similar to that shown in U.S. Pat. No. 6,082,616, the disclosure of which is incorporated by reference as if fully rewritten herein.

Rollout tray 80 may have several upper banking machine components supported thereon including card reader 24, input keys 26, display 28, receipt printer 30, and other components as appropriate for the particular ATM 10.

This exemplary embodiment further includes an upper fascia 86 in supporting connection with rollout tray 80. The upper fascia 86 may include user interface openings such as a card opening 88 through which a customer operating the machine 10 may insert a credit, debit or other card, or a receipt delivery slot 90 through which printed transactions receipts may be delivered to the customer. Rollout tray 80 moveably supports upper fascia 86 relative to the top housing 12 so that upper fascia 86 is movable between a first position covering the front opening and a second position in which the upper fascia is disposed from the front opening 22.

As illustrated in FIG. 1, in the operative condition of ATM 10, the rollout tray 80 is retracted into the interior area 20 of the housing 12. Upper fascia 86 operates to close front opening 22 and provide an attractive appearance for ATM 10, while allowing a customer to input information and receive outputs from ATM 10.

Figure 6:
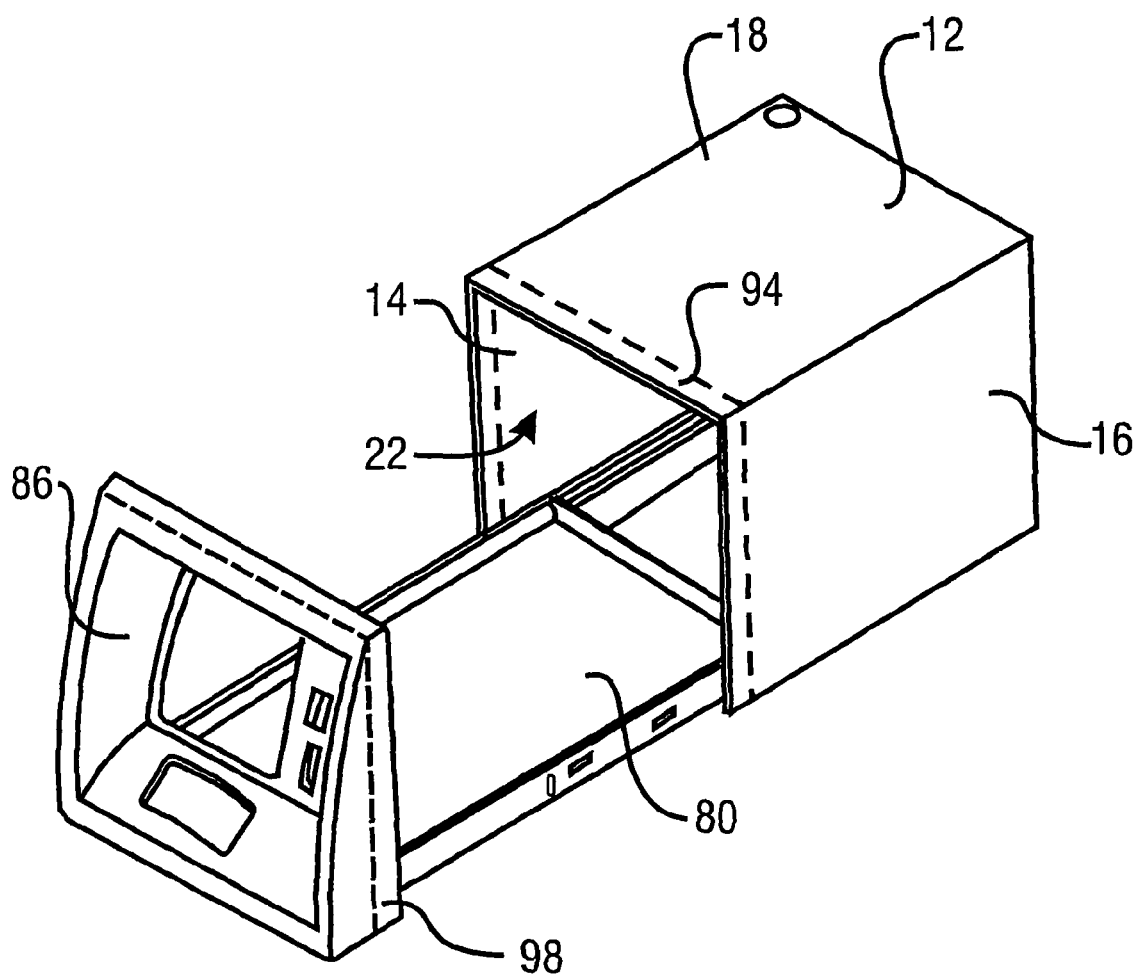
FIG. 6 is an isometric view of a top housing for an automated banking machine supporting a rollout tray in an extended position.

With reference to FIG. 6, in this exemplary embodiment, the forward-most parts of side walls 14 and 16 and top wall 18 of housing 12 define a forward region 94, shown in dashed lines, bounding the front opening 22. In this exemplary embodiment, upper fascia 86 includes a rearwardly extending portion 98, also shown in dashed lines. Rearwardly extending portion 98 is dimensioned to overlie in generally surrounding relation, the forward region 94 when rollout tray 80 is retracted and upper fascia 86 is in the first position. In some embodiments, the rearwardly extending portion may be contoured or tapered so as to extend further inwardly with increasing proximity to the front of the fascia. Such tapered control may engage and help to close and/or align the fascia and the top housing 12.

Figure 7:
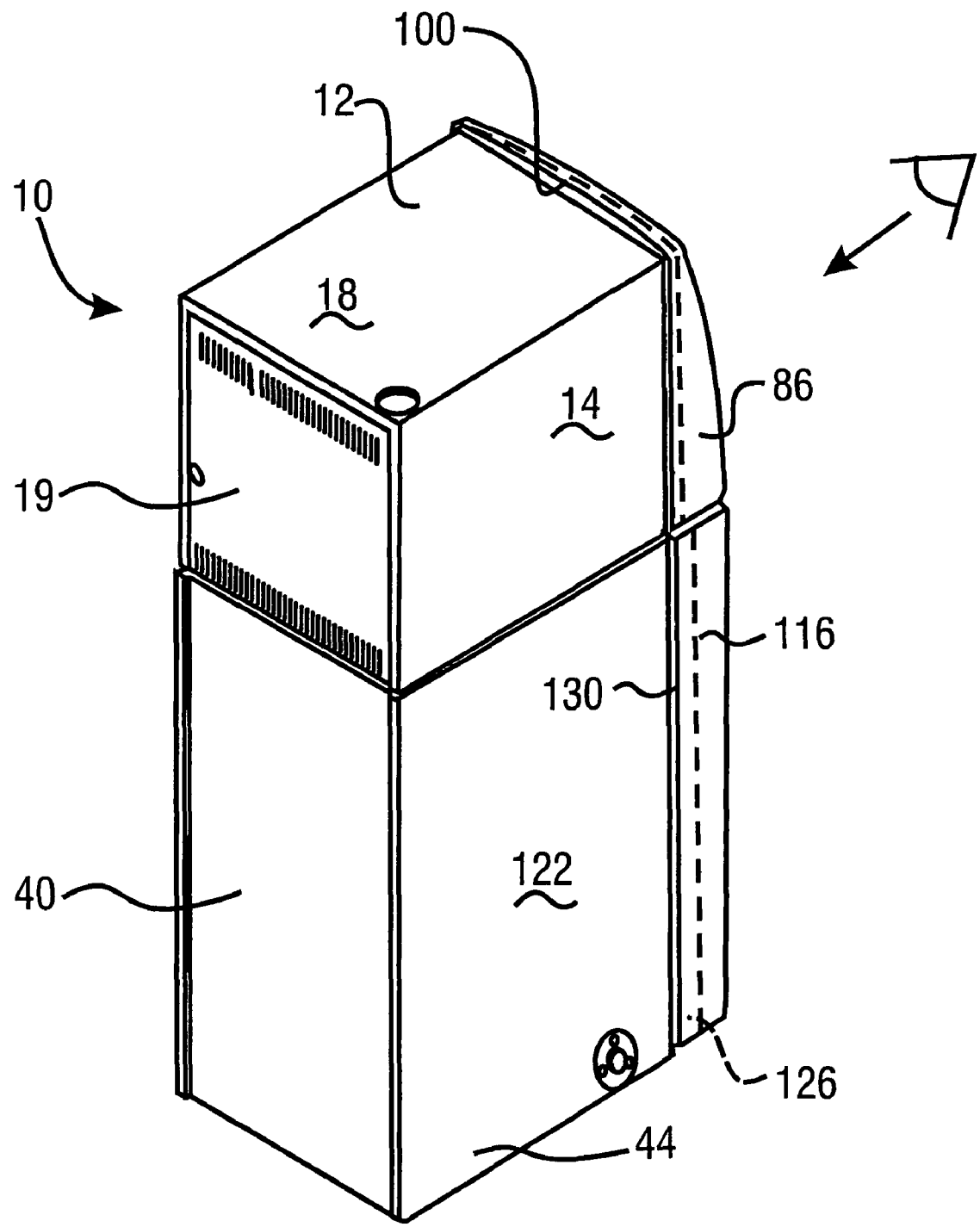
FIG. 7 is an isometric rear view of the automated banking machine of FIG. 1.

With reference to FIG. 7, when ATM 10 is viewed from the rear, there may be a first gap 100 separating the rearwardly extending portion 98 of upper fascia 86 from the top housing 12. In some embodiments it may be desirable that first gap 100 be minimal to prevent unauthorized access to interior area 20. First gap 100 in the exemplary embodiment is not visible when ATM 10 is viewed from the front.

In this exemplary embodiment, the upper fascia 86 is formed of a plastic material and the top housing 12 is formed of sheet metal. Alternately, the extending portion 98 or forward portion 94 shown in FIG. 6, or both, may include resilient materials to provide for engagement and sealing of the housing and the fascia in the closed position. However, other materials may be chosen, and these approaches are exemplary.

Figure 4:
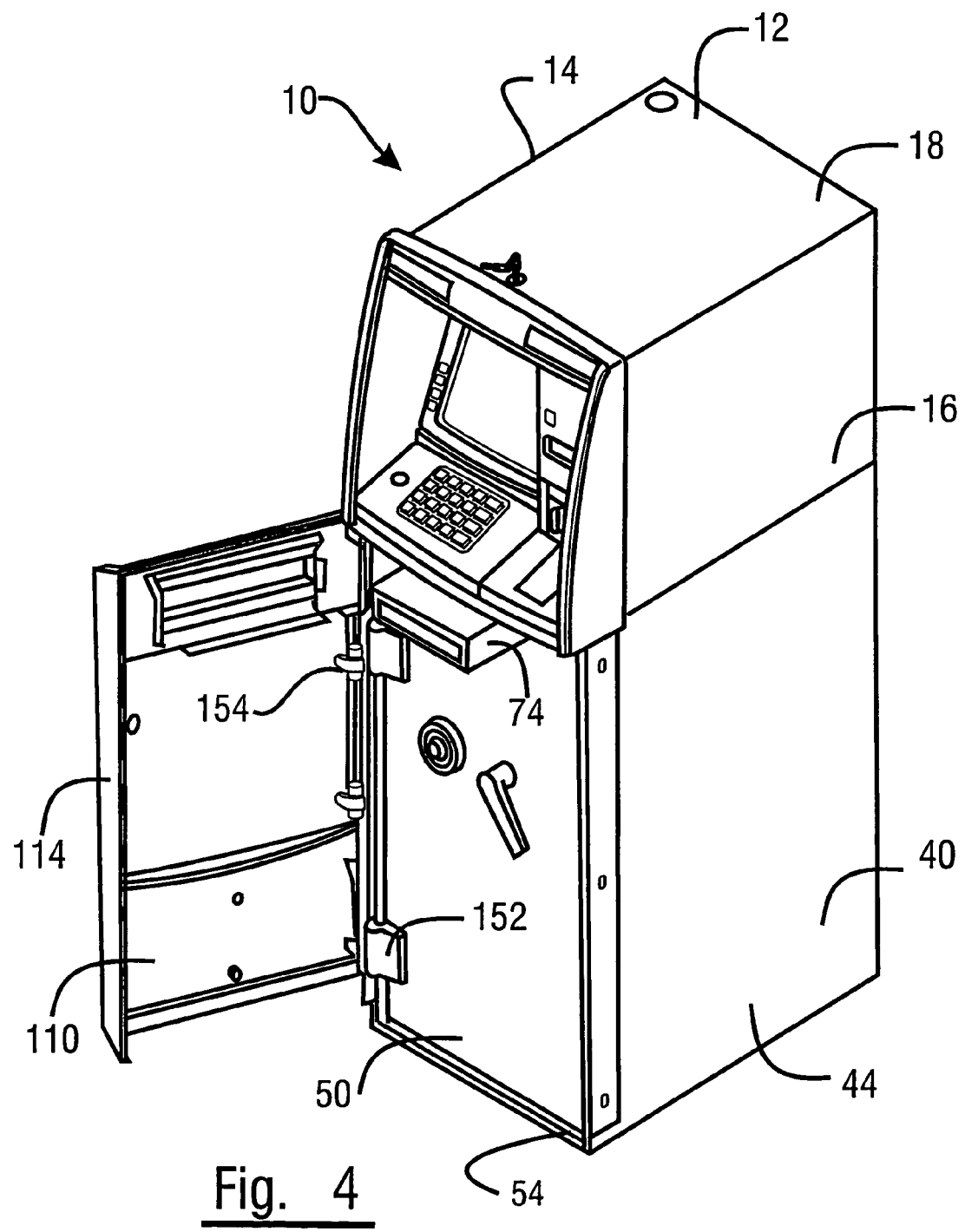
FIG. 4 is an isometric view of the automated banking machine of FIG. 1 with a lower fascia in an accessible position.
Figure 5:
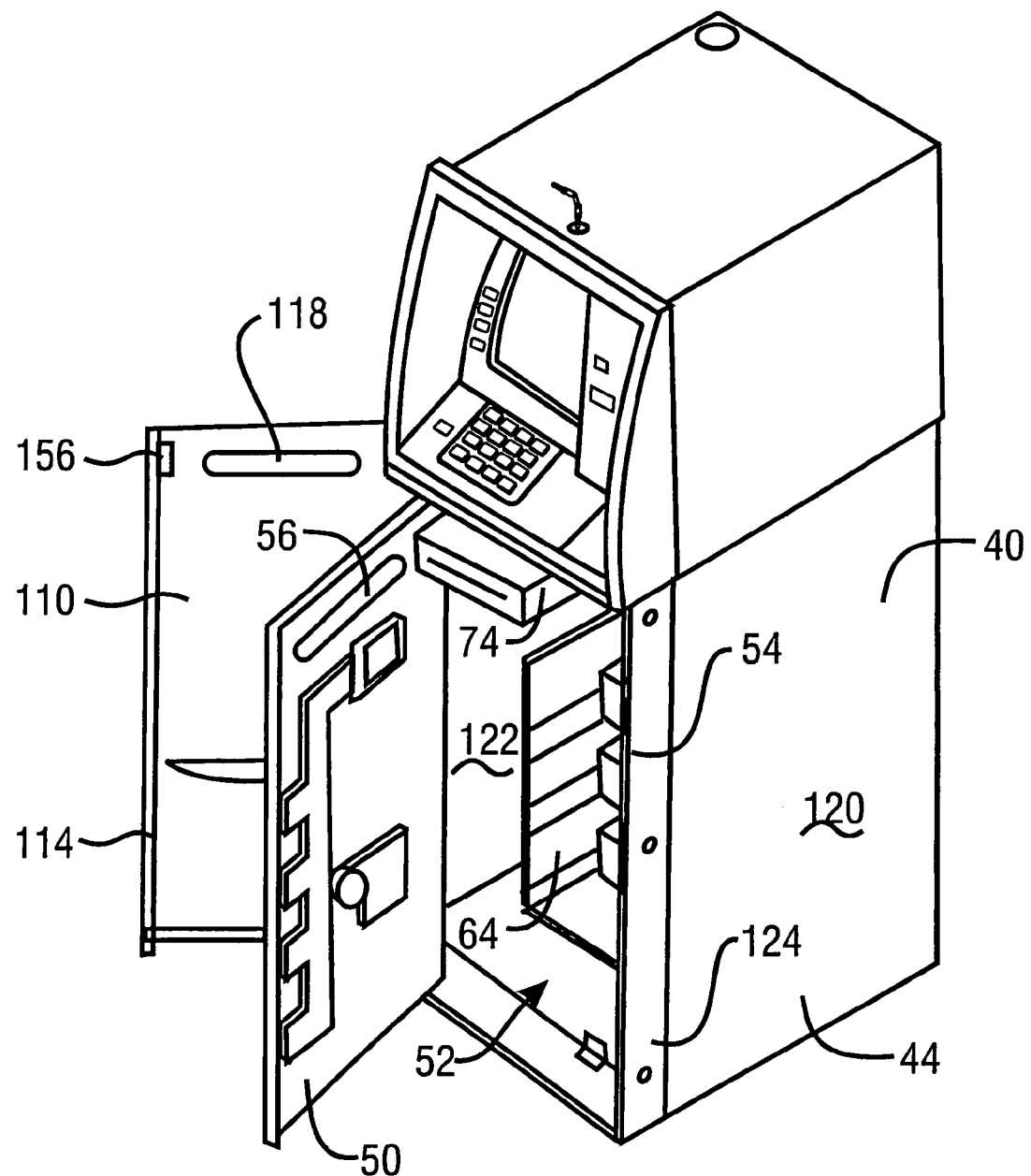
FIG. 5 is an isometric view of the automated banking machine of FIG. 1 with a lower fascia in an accessible position and a chest door in an open position.

With reference to FIGS. 1, 4 and 5, the exemplary embodiment further includes a lower fascia 110 moveably mounted on the chest housing 44. In this exemplary embodiment, lower fascia 110 is operable to move between a covering position as illustrated in FIG. 1, and an accessible position as illustrated in FIGS. 4-5. In other applications, it may be preferable to provide a selectively removable lower fascia, or other approaches to supporting the lower fascia on the chest portion.

The exemplary lower fascia 110 operates to cover the chest 40 to thereby provide a more attractive appearance to ATM 10. In the exemplary embodiment, lower fascia 110 includes a front face 112 and first and second side extensions 114, 116, respectively.

In the exemplary embodiment, illustrated in FIGS. 5 and 7, chest housing 44 includes first and second side walls 120, 122, respectively. First side wall 120 includes a forward portion 124 and second side wall includes a forward portion 126 (shown in phantom in FIG. 7). When the chest door 50 is in the closed position and the lower fascia 110 is in the covering position, the first and second side extensions 114, 116, respectively, overlie forward portions 124, 126.

Thus, when ATM 10 is viewed from the front (see FIG. 1), the lower fascia 110 covers the chest 40 from side to side. When ATM 10 is viewed from the rear (see FIG. 7), a lower gap (not shown) between the first side extension 114 and the first side wall 120 of the chest housing 44 and a lower gap 130 between the second side extension and 116 the second side wall 122 may be visible, although such lower gaps are not viewable from the front of ATM 10. In some applications, it may be desirable to minimize the lower gaps 130.

Figure 8:
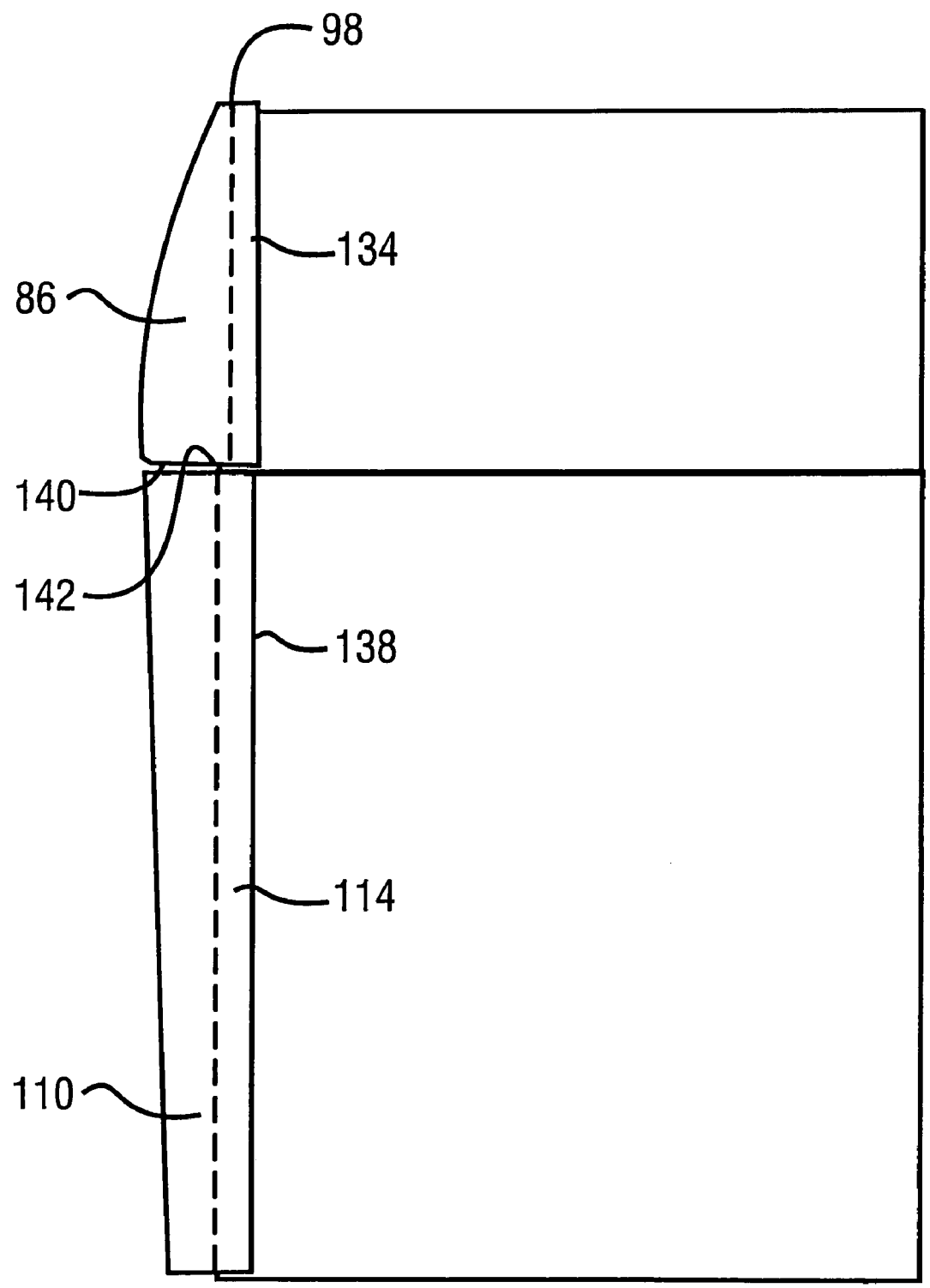
FIG. 8 is a side view of an exemplary embodiment of an automated banking machine illustrating the alignment of an upper fascia and a lower fascia.

As best illustrated in FIG. 8, in the exemplary embodiment, the rearwardly extending portion 98 of upper fascia 86 includes a rearward facing end edge 134. Also, in the exemplary embodiment, first side extension 114 of lower fascia 110 includes rearward facing end edge 138. When viewed from the first side of ATM 10, in the exemplary embodiment, end edge 134 of upper fascia 86 and end edge 138 of lower fascia 110 are substantially vertically aligned along a first side of ATM 10 when the upper fascia 86 is in the first position and the lower fascia 110 is in the covering position.

With continued reference to FIG. 8, in the exemplary embodiment, upper fascia 86 is bounded by a lower surface 140. Lower fascia 110 is bounded by an upper surface 142. In the exemplary embodiment, lower surface 140 is adapted for substantial parallel horizontal alignment with upper surface 142 when the upper fascia 86 is in the first position and the lower fascia 110 is in the covering position. The alignment of the fascia surfaces presents an attractive appearance to ATM 10.

In this exemplary embodiment, the rearwardly extending portion 98 further operates to simplify the manufacture and assembly of the ATM 10. In some previous machines, it was necessary to more precisely control the alignment of the walls of the upper fascia 86 with the perimeter of the front opening. However, in this disclosed exemplary embodiment, because the rearwardly extending portion 98 overlies the forward region 94, the required precision is lessened. Further, in those embodiments which include a tapered engagement, alignment of the top housing 12 and upper fascia 86 is facilitated.

With particular reference to FIG. 5, lower fascia 110 may include an access opening 118 therein. In this exemplary embodiment, access opening 118 in the lower fascia 110 is adapted to be substantially aligned with first device opening 56 in chest door 50 when chest door is closed and lower fascia 110 is in the covering position. In this exemplary embodiment, when the chest door 50 is closed and lower fascia 110 is in the covering position, at least an end portion of sheet delivery mechanism 74 extends in the first device opening 56 in chest door 50 and access opening 118 in lower fascia 110.

As illustrated in FIGS. 1 and 2, in this exemplary embodiment, ATM 10 includes a first locking mechanism 146 for selectively retaining the rollout tray 80 in the retracted position when upper fascia 86 covers the front opening 22. The first locking mechanism may be of the type described in U.S. Pat. No. 6,082,616 previously incorporated herein.

In the exemplary embodiment, ATM 10 also includes a second locking mechanism 148 for selectively securing lower fascia 110 in the covering position.

Figure 9:
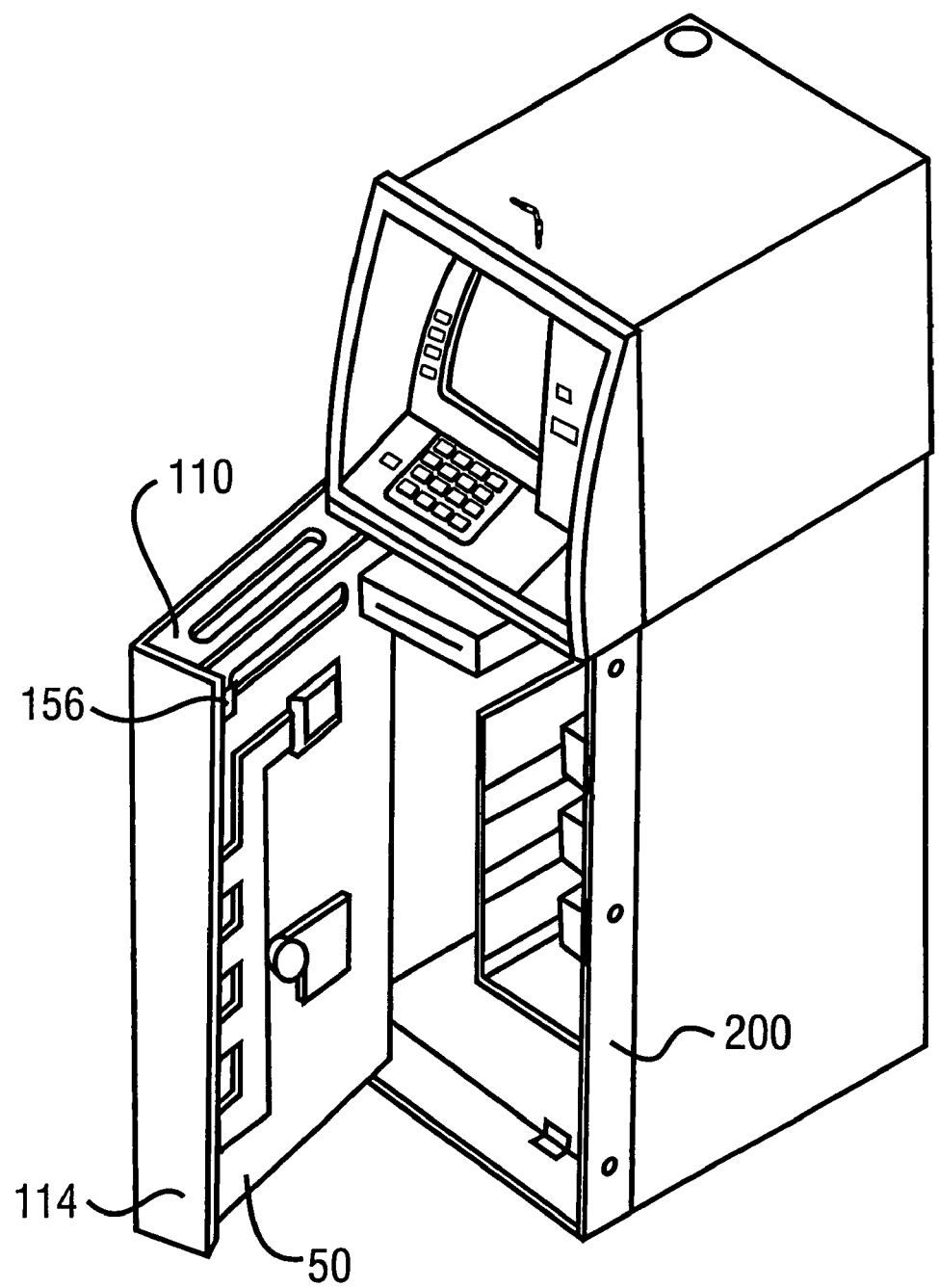
FIG. 9 is an isometric view of an automated banking machine similar to FIG. 5 showing the chest door selectively engaged with the lower fascia.

With particular reference to FIGS. 4, 5 and 9, in another exemplary embodiment ATM 10 may include a top housing 12 as previously described. ATM 10 further includes chest 40 having chest door 50 mounted to the housing 44 by one or more chest door hinge assemblies 152. Lower fascia 110 is moveably mounted to chest housing 44 by one or more fascia hinges 154. In this exemplary embodiment, fascia hinge 154 and chest door hinge assembly 152 are situated on the same side of the chest housing 44 so that lower fascia 110 and chest door 50 pivot generally in the same direction relative to the chest.

From time to time, the banking machine components enclosed within secure enclosure 42 must be accessed for replenishment or other servicing activity. Thus, lower fascia 110 may be selectively moved from a covering position into an accessible position to allow access to chest door 50. Chest door 50 may then be selectively opened.

In this exemplary embodiment, as best seen in FIG. 9, lower fascia 110 is operable to engage the open chest door 50 to prevent its movement back to a closed position. In this exemplary embodiment, lower fascia 110 includes an inwardly directed flange 156 carried on an inner surface at a side opposite the fascia hinge 154. Inwardly directed flange 156 is dimensioned to engage at least a portion of chest door 50 when the lower fascia 110 is in the accessible position and the chest door 50 is in the open position. In the exemplary embodiment, lower fascia 110 is adapted to pivot away from the chest door 50 to at least an extent where the chest door may be disengaged from inwardly directed flange 156. Exemplary embodiments may include features of the type discussed in U.S. Pat. Nos. 7,159,767; 7,152,784; 7,000,830; and 6,871,602 the disclosures of which are incorporated herein by reference.

An exemplary embodiment includes a method for accessing the contents of the secure area for servicing components housed therein or to replenish currency sheets. The method includes placing the lower fascia into an accessible position from a covering position to uncover the chest door; opening the chest door to provide access to the secure area through an opening in the chest housing; and engaging the chest door and the lower fascia to hold the chest door in an open condition. Thus a currency dispenser mechanism or other components may be accessed. Servicing the currency dispenser may include adding or removing currency sheets from operative engagement with the currency dispenser mechanism.

The method may further include engaging the chest door with an inwardly directed flange that is mounted in supporting connection with the lower fascia.

To return the ATM to an operational condition, the method includes moving the lower fascia outwardly relative to the engaged chest door to disengage the chest door; closing the chest door; and repositioning the lower fascia into the covering position.

Repositioning the lower fascia into the covering position includes overlying a first forward portion of the chest housing with a first side extension of the lower fascia and overlying a second forward portion of the chest housing with a second side extension of the lower fascia.

Prior to placing the lower fascia into the accessible position, the method includes unlocking a first locking mechanism operable to selectively retain the lower fascia in a covering position.

Figure 10:
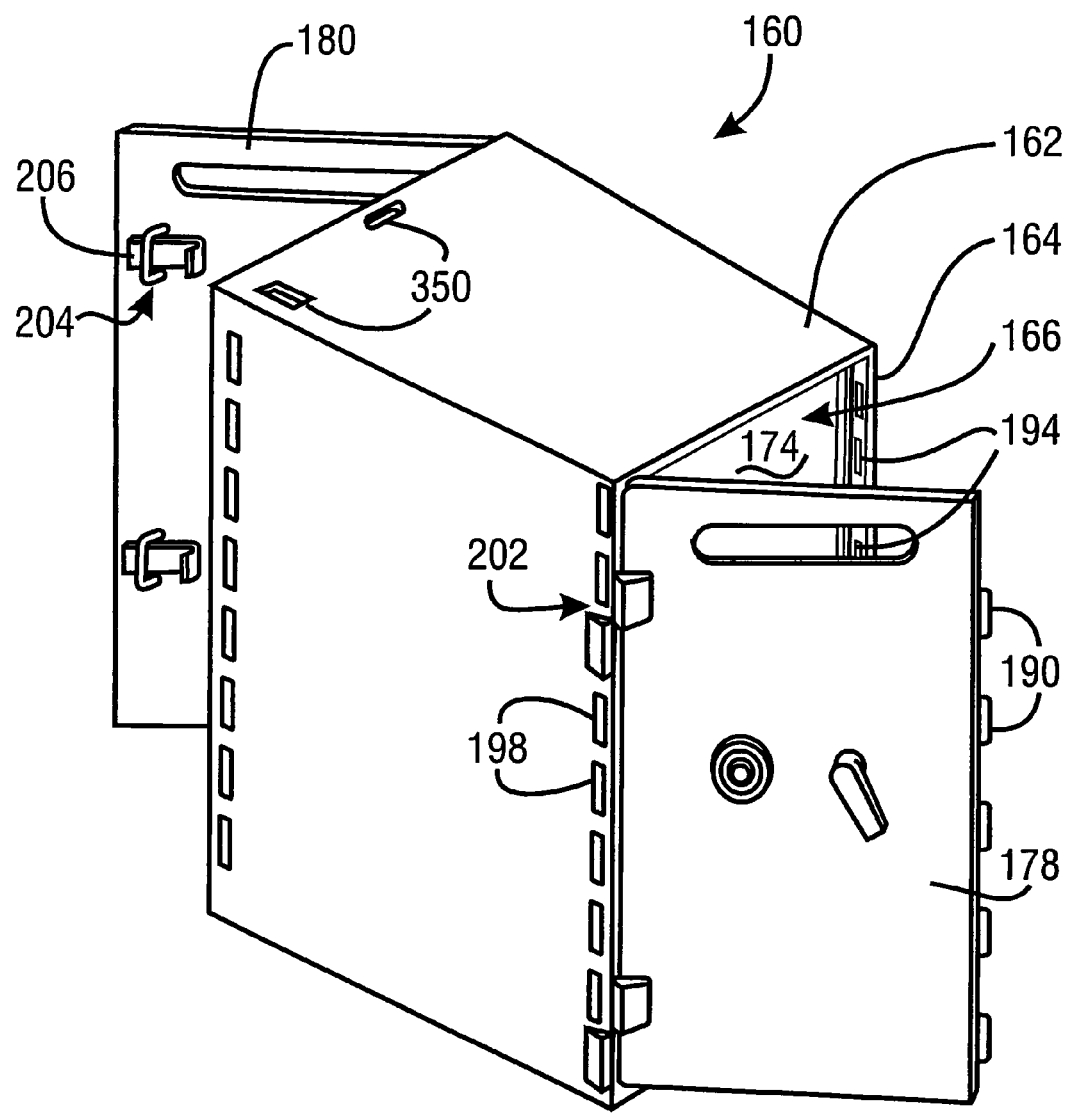
FIG. 10 is an isometric view of an alternate embodiment of a chest for an automated banking machine, as viewed from the front.
Figure 11:
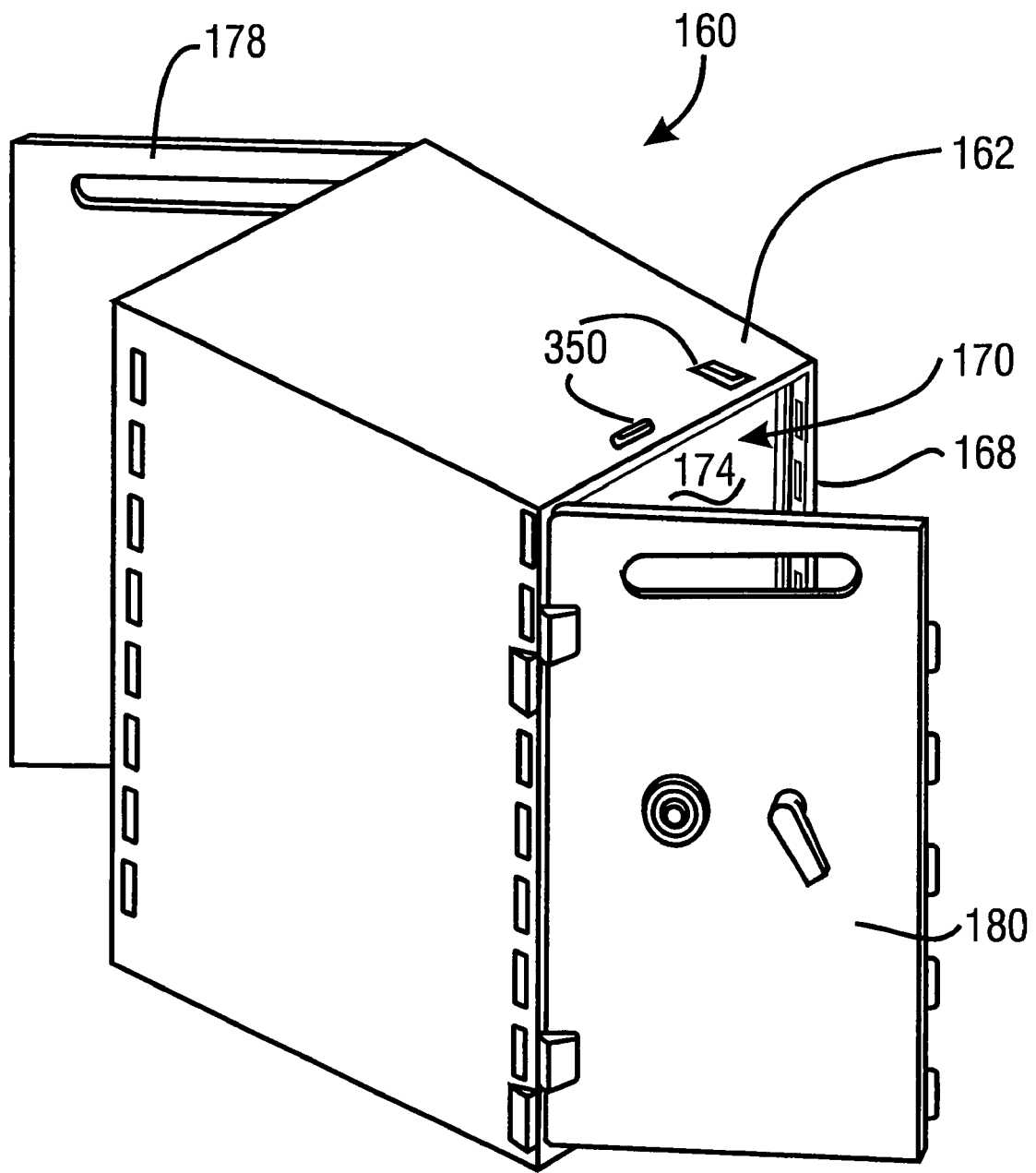
FIG. 11 is an isometric view of the alternate embodiment of the chest shown in FIG. 10, as viewed from the rear.

Some ATMs may be equipped with another exemplary embodiment of a chest or safe 160, as best seen in FIGS. 10-11. Chest 160 includes a chest housing 162 having first end 164 defining a first opening 166 therein and second end 168 defining a second opening 170 therein. The chest of this exemplary embodiment is particularly adapted for applications wherein a common chest housing can be utilized in either "front-load" ATMs or "rear-load" ATMs. By "front-load" ATM it is meant that access to a secure area 174 in an operable machine may be selectively attained from the front of the ATM, which is the same side that customers use to provide input to the machine. By "rear-load" ATM it is meant that access to the secure area 174 in an operable machine may be selectively attained from the rear of the ATM, while customer inputs are provided at the front of the ATM.

In this exemplary embodiment, chest 160 includes a first chest door 178 moveably mounted adjacent a first end 164 of chest housing 162 to selectively close the first opening 166. Chest 160 further includes a second chest door 180 moveably mounted adjacent the second end 168 to selectively close the second opening 170.

In the exemplary embodiment illustrated in FIG. 10, chest 160 is adapted for use in a front load ATM wherein under usual operating conditions, first chest door 178 is selectively movable to open or close first opening 166 to allow access to secure area 174. In this exemplary embodiment, second chest door 180 is adapted to remain closed during usual operation of the ATM, including those times when access to secure area 174 is desired. For purposes of this disclosure, the term "semi-permanently" closed is used to describe a condition of a chest door that closes an opening in the chest housing in a manner that does not readily permit access to the secure area. In this way, a "semi-permanently" closed chest door is not used as the primary means for accessing the chest interior. However, under appropriate conditions the semi-permanently closed chest door can be opened.

In this exemplary embodiment, first chest door 178 is the operable door and second chest door 180 is adapted to be semi-permanently closed. In other embodiments, for instance in rear-load ATMs, it may be desirable to utilize chest 160 as illustrated in FIG. 11 where the second chest door 180 is the operable door while first chest door 178 is adapted to be semi-permanently closed.

Figure 12:
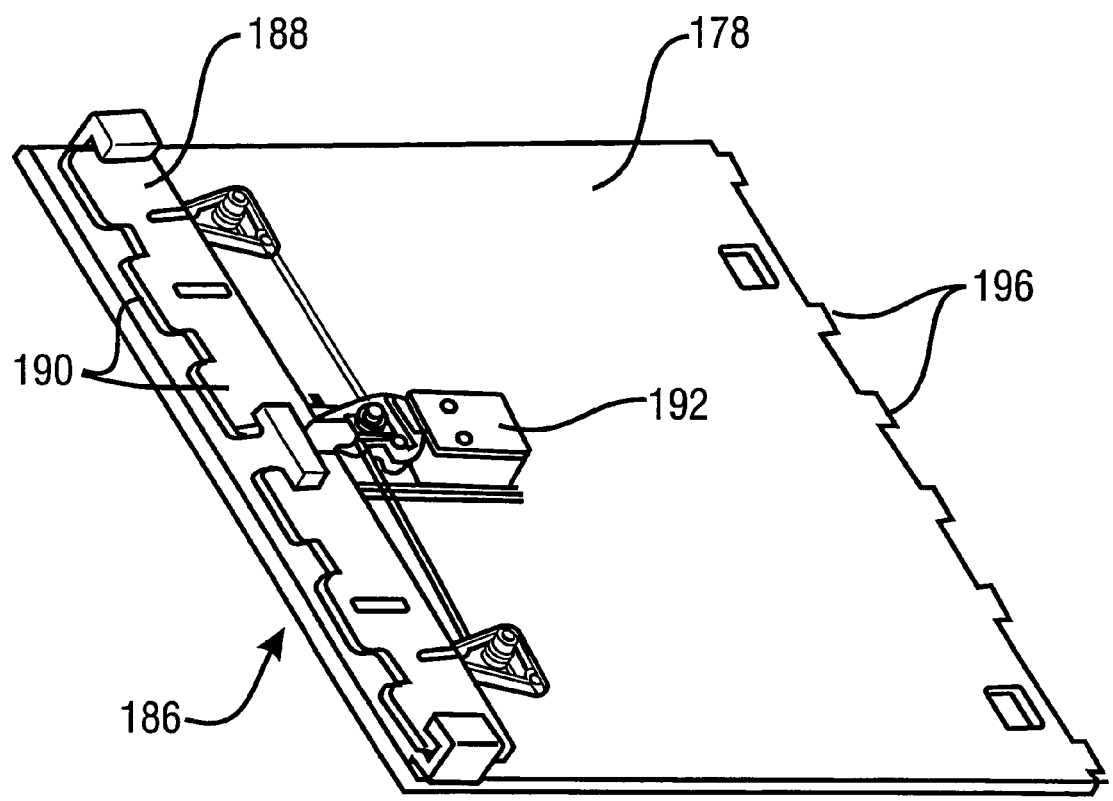
FIG. 12 is an isometric view of a chest door illustrating a locking bolt mechanism.

With particular reference to FIGS. 10 and 12, in the exemplary embodiment, the first chest door 178 is equipped with a suitable locking bolt mechanism generally denoted 186. Locking bolt mechanism 186 is operative to selectively enable securing first chest door 178 in a locked condition. Locking bolt mechanism 186 may be of the type described in U.S. Pat. No. 6,089,168 which is incorporated by reference as if fully rewritten herein. Of course, other suitable bolt works can be utilized to accomplish the objectives.

Locking bolt mechanism 186 of the exemplary embodiment includes a locking bolt 188 which includes a plurality of locking bolt projections 190. Locking bolt 188 is mounted in operatively separated connection with an interior surface of first chest door 178 so as to be slideably movable between an extended position and a retracted position.

First chest door 178 also has a lock 192 mounted thereto. Lock 192 cooperates with locking bolt mechanism 186 so that first chest door 178 is enabled to be changed from a locked condition to an unlocked condition. As shown in FIG. 10, the chest housing 162 includes a plurality of vertically spaced locking bolt apertures 194 which are sized and positioned for accepting the locking bolt projections 190.

It will be appreciated by those skilled in the art that the locking bolt mechanism, because it provides multiple places for engagement with the chest housing, achieves more secure locking of the door in the closed position than a locking bolt mechanism providing a single place for engagement with the chest housing.

In the exemplary embodiment, first chest door 178 includes a plurality of dead bolt projections 196 extending on a hinge side of the door. These dead bolt projections 196 are preferably positioned and sized to be accepted in the dead bolt apertures 198 in housing 162. As will be appreciated, the acceptance of the dead bolt projections 196 into the dead bolt apertures 198 provides enhanced security. In an exemplary embodiment, the dead bolt apertures and the locking bolt apertures are covered by trim pieces 200 (shown in FIG. 9) that extend on the outside of the housing.

With reference to FIG. 10, in the exemplary embodiment, the first chest door 178 is operably connected to the chest housing via one or more first chest hinge assemblies 202. The exemplary chest hinge assembly 202 may be of the type described in U.S. Pat. No. 6,089,168 and/or U.S. Pat. No. 7,156,297 previously incorporated. It will be readily understood that other hinge constructions may be used in other embodiments.

In the exemplary embodiment, the second chest door 180 may be secured in a closed position by a securing mechanism that generally mirrors the locking bolt mechanism 186 and lock 192. Alternately, as illustrated in FIG. 10, second chest door 180 may be "semi-permanently" secured by an alternate securing mechanism 204. The alternate securing mechanism 204 may include a bolt member 206 or other mechanism that is less complex than the locking bolt mechanism and lock previously described. In this exemplary embodiment, routine access to the secure area 174 via second chest door 180 is not necessary during normal operation of the ATM. Thus, the alternate securing mechanism 204 is operable to "semi-permanently" engage the chest door 180. This may be done, for example, by securing the bolt with fasteners or other devices that are only accessible from within the interior of the chest portion. Of course, in some alternative embodiments both chest doors may be equipped with operational locking bolt mechanisms and locks.

The manufacture of an exemplary ATM may be simplified by use of chest 160. A common chest housing may be utilized in applications requiring a front-load ATM or a rear-load ATM. After the housing has been assembled, the positioning of a locking bolt mechanism may be chosen according to the configuration of the chest. Additionally, at a subsequent time, the operational features may be changed so that the initial operational chest door becomes the non-operational door and vice versa. Thus, the manufacturing process is simplified by the versatility of the chest housing.

Of course it will be readily appreciated that ATMs incorporating this exemplary embodiment of chest 160 may include any of the other features described elsewhere.

An exemplary embodiment includes a method for utilizing an ATM that is equipped with a chest having two opposed openings. The chest housing includes a first opening at a first end thereof and a second opening at a second opposed end. The first door is moveably mounted in supporting connection with the chest housing so that the first chest door is operative to selectively close the first opening. A second chest door is moveably mounted in supporting connection with the chest housing so that the second door is operative to semi-permanently close the second opening. At least one lower banking machine component is mounted in supporting connection with the chest housing in the secure area.

In the exemplary method, a first locking bolt mechanism in supporting connection with the first chest door is operated to selectively securely engage the first chest door with the chest housing. A first securing mechanism in supporting connection with the second chest door is operated to semi-permanently securely engage the second chest door with the chest housing.

The method includes accessing at least one lower banking machine component of an ATM through a first opening in a chest housing bounding a secure area; and preventing access to the at least one lower banking machine component through the second opening.

The method further includes replacing the first locking bolt mechanism with a second securing mechanism in supporting connection with the first chest door, wherein the second securing mechanism is operative to semi-permanently securely engage the first chest door with the chest housing; and replacing the first securing mechanism with a second locking bolt mechanism in supporting connection with the second chest door, wherein the second locking bolt mechanism is operative to selectively securely engage the second chest door with the chest housing. Thus, the door chosen as the operative door can be selected and changed.

The exemplary ATM may include a lower fascia that is mounted in supporting connection with the chest housing, wherein the lower fascia is selectively movable between a covering position and an accessible position. The exemplary method may include moving the lower fascia from the covering position to the accessible position prior to accessing the lower banking machine component. Further, the method may include engaging the first chest door with the lower fascia to hold the first door in the open condition.

The at least one lower banking machine component may comprise a currency dispenser mechanism. The exemplary method includes servicing the currency dispenser mechanism after the at least one lower banking machine component is accessed. This may include for example features included in U.S. Pat. Nos. 7,195,237 and/or 7,111,776 the disclosures of which are incorporated herein by reference.

The at least one lower banking machine component may comprise a currency stacker. The exemplary method includes servicing the currency stacker.

Figure 13:
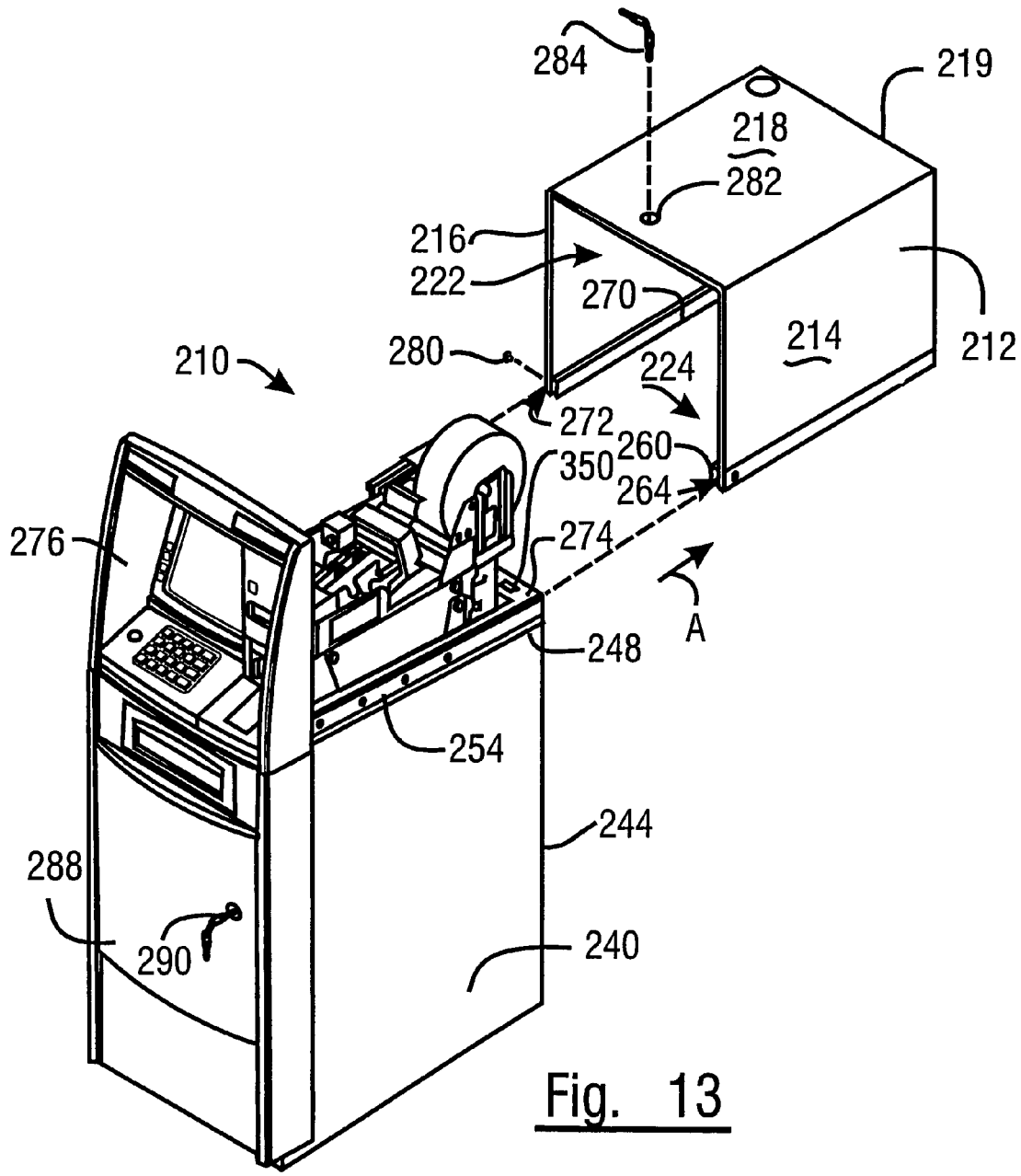
FIG. 13 is an isometric exploded view of an alternate embodiment of an automated banking machine.
Figure 14:
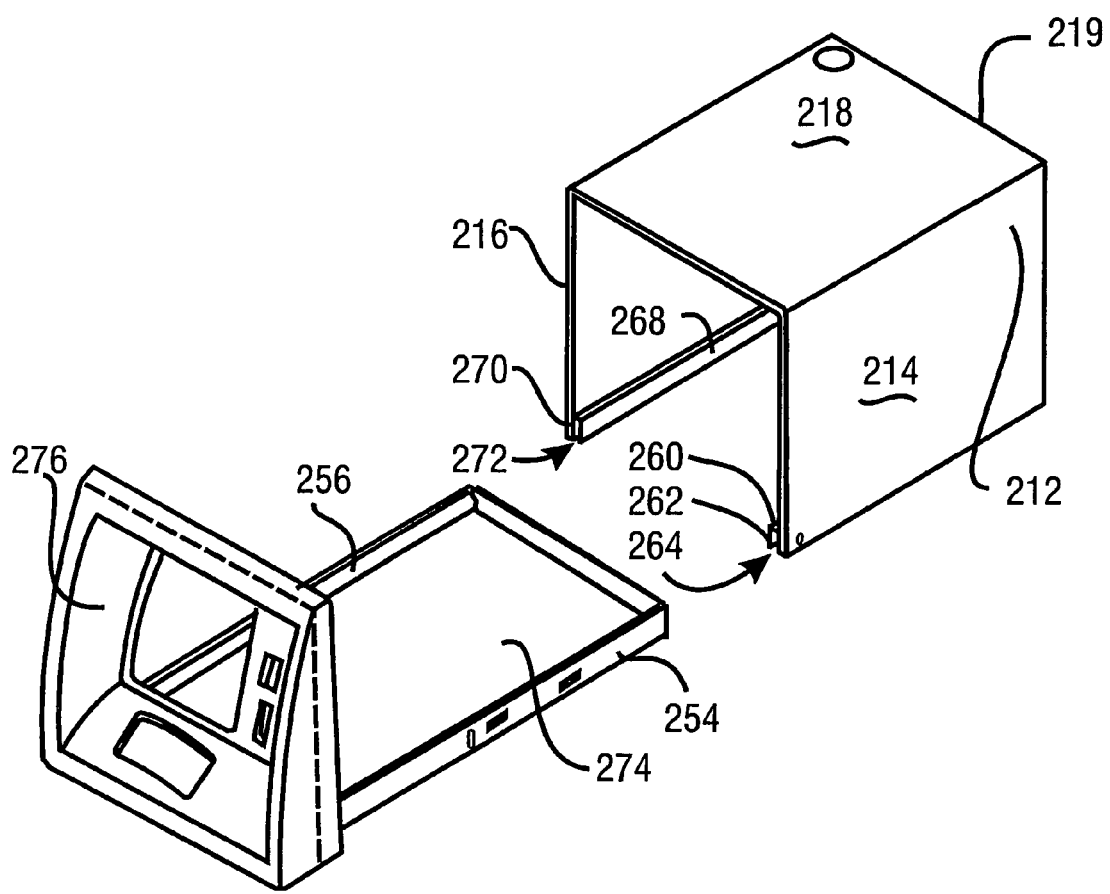
FIG. 14 is an isometric view of a top housing cover, a mounting tray, and an upper fascia of an automated banking machine.
Figure 15:
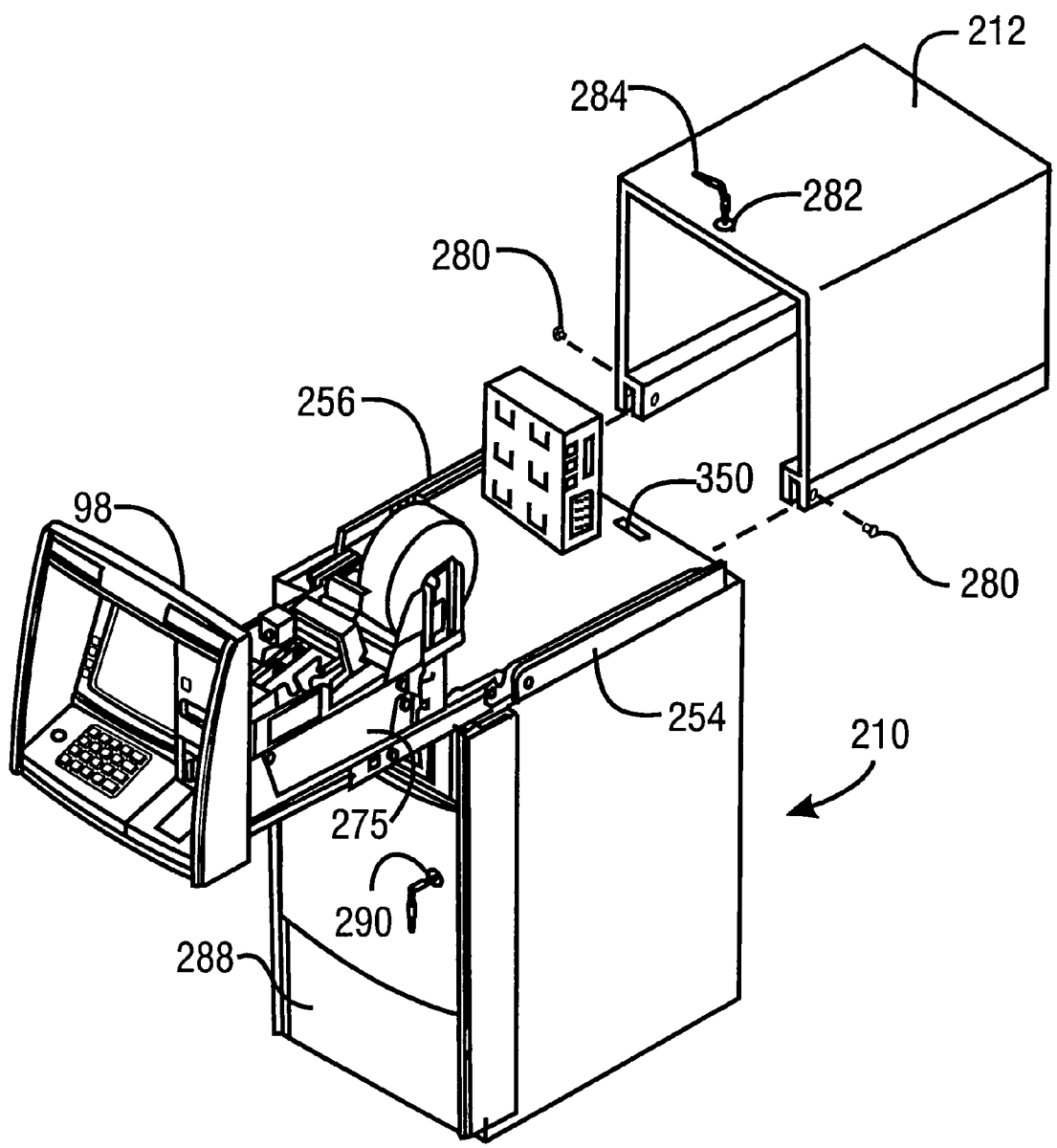
FIG. 15 is an isometric view of an alternate embodiment of an automated banking machine.

Yet another exemplary embodiment of an ATM 210 is illustrated in FIGS. 13-15. ATM 210 includes a top housing cover 212 including first and second side walls 214, 216, top wall 218, and rear wall 219. Top housing cover 212 defines a front opening 222 and a bottom opening 224. In a first (operable) position, top housing cover 212 covers an interior area in which various upper banking machine components such as a display, a receipt printer, a card reader, input keys, a controller, communication device, and others may be disposed.

In this exemplary embodiment, ATM 210 further includes a chest 240 bounding a secure area in a manner similar to that previously described. Chest 240 includes a housing 244 having a top wall 248. Top housing cover 212 is adapted for rearward slidable movement relative to top wall 248 to a second position for service.

In this exemplary embodiment, a first upwardly extending flange member 254 is mounted in supporting connection with top wall 248 along a first side thereof. A second upwardly extending flange member 256 (not shown in this view) is mounted in supporting connection with top wall 248 along a second side thereof.

Supported on the first side wall 214 of top housing cover 212 is a first cooperating channel member 260 having a pair of spaced downwardly extending projections 262 defining a first channel 264 therebetween. Likewise, on the second side wall 216 of top housing cover 212 there is supported a second cooperating channel member 268 having a pair of spaced downwardly extending projections 270 defining a second channel 272 therebetween.

Top housing cover 212 is adapted for slidable movement relative to the top wall 248 by the slidable engagement of the first flange member 254 within first channel 264 and the slidable engagement of the second flange member 256 within second channel 272.

In this exemplary embodiment, ATM 210 includes an upper fascia 276 operable to selectively cover the front opening 222. The top housing cover 212 is adapted for rearward movement relative to the top wall 248 in the direction of arrow A such that rearward displacement of the top housing cover 212 allows access to the upper banking machine components in the interior area, for example, for servicing.

It is contemplated that in exemplary embodiments the positioning of the flange members 254, 256 and the channels 264, 272 be reversed. For example, the top housing cover 212 may support flange members and the mounting tray may support cooperating channel members to accomplish a similar slidable relationship therebetween.

FIG. 14 illustrates an exemplary embodiment wherein the flange members 254, 256 are incorporated into a mounting tray 274 which is operable to receive and support one or more upper banking machine components, which for ease of illustration are not shown in this view. This embodiment allows for ease of assembly of the exemplary ATM 210. The applicable upper banking machine components can be readily mounted onto mounting tray 274, which is mounted in supporting connection with top wall 248 of chest housing 244. Top housing cover 212 may thereafter be positioned by slidable movement of flange members 254, 256 in respective channels 264, 272.

In an alternate exemplary embodiment, illustrated in FIG. 15, ATM 210 may include a rollout tray 275 similar to rollout tray 80 as previously described. Flange members 254, 256 may be mounted in supporting connection with rollout tray 275. Thus, upper banking machine components may be accessed by rearwardly sliding the top housing cover 212, extending the rollout tray 275, or a combination of both.

ATM 210 may further include at least one removable fastener 280 for selectively engaging the top housing cover 212 with at least one flange member 254, 256 to prevent relative slidable movement therebetween. In the exemplary embodiment, first and second fasteners 280 are used to secure the top housing cover 212.

ATM 210 may further include a first locking mechanism 282 to secure the top housing cover to upper fascia 276. In this exemplary embodiment, the locking mechanism is operable in response to a key 284. In the exemplary embodiment illustrated in FIG. 15 it is contemplated that fasteners 280 are covered by a rearwardly extending portion of upper fascia similar to portion 98 shown in FIG. 6. Thus, fasteners 280 are not accessible from outside the ATM until first locking mechanism 282 has been operated to release upper fascia 276 so that the upper fascia 276 can be moved away from top housing cover 212.

In the exemplary embodiment, ATM 210 may include a lower fascia 288 with features similar to a lower fascia previously described. Lower fascia 288 may be secured in the covering position by a second locking mechanism 290.

This exemplary embodiment provides ready access to the upper banking machine components, for example, for servicing or replacing. To access the upper banking machine components, fasteners 280 are removed. It is contemplated that in an exemplary embodiment, the fasteners may not be accessible until after the first locking mechanism 282 is unlocked and the upper fascia is displaced slightly to uncover fasteners 280. In other embodiments, the fasteners may be directly accessed.

The top housing cover 212 may then be moved rearwardly, away from upper fascia 276 so that the interior area is accessible. During servicing, the top housing cover 212 may be selectively positioned so that some portion or none of the upwardly extending flanges 254, 256 remain engaged with the channel members 260, 268, respectively.

In one exemplary embodiment, a method is provided for accessing banking machine components of an ATM. The exemplary method includes supporting the top housing cover in a slidable relationship with the top wall of the chest housing, wherein the top housing cover includes a front opening; selectively rearwardly sliding the top housing cover away from a first position in which an upper fascia covers the front opening; and accessing at least one upper banking machine component that is mounted in supporting connection with the top wall of the chest housing.

The exemplary method further includes removing fasteners that may be used to selectively secure the top housing cover in the first position.

The exemplary method further includes operating a locking mechanism to release the top housing cover and the upper fascia.

The exemplary method further includes accessing an upper banking machine component for servicing. The at least one upper banking machine component may be a display that is accessed for servicing.

In one embodiment the ATM includes side flange members mounted in supporting connection with a top wall of a chest housing and cooperative channel members mounted in supporting connection with the top housing cover. In this exemplary embodiment, the method further includes slideably engaging a first flange member with a first channel of a first channel member.

Figure 16:
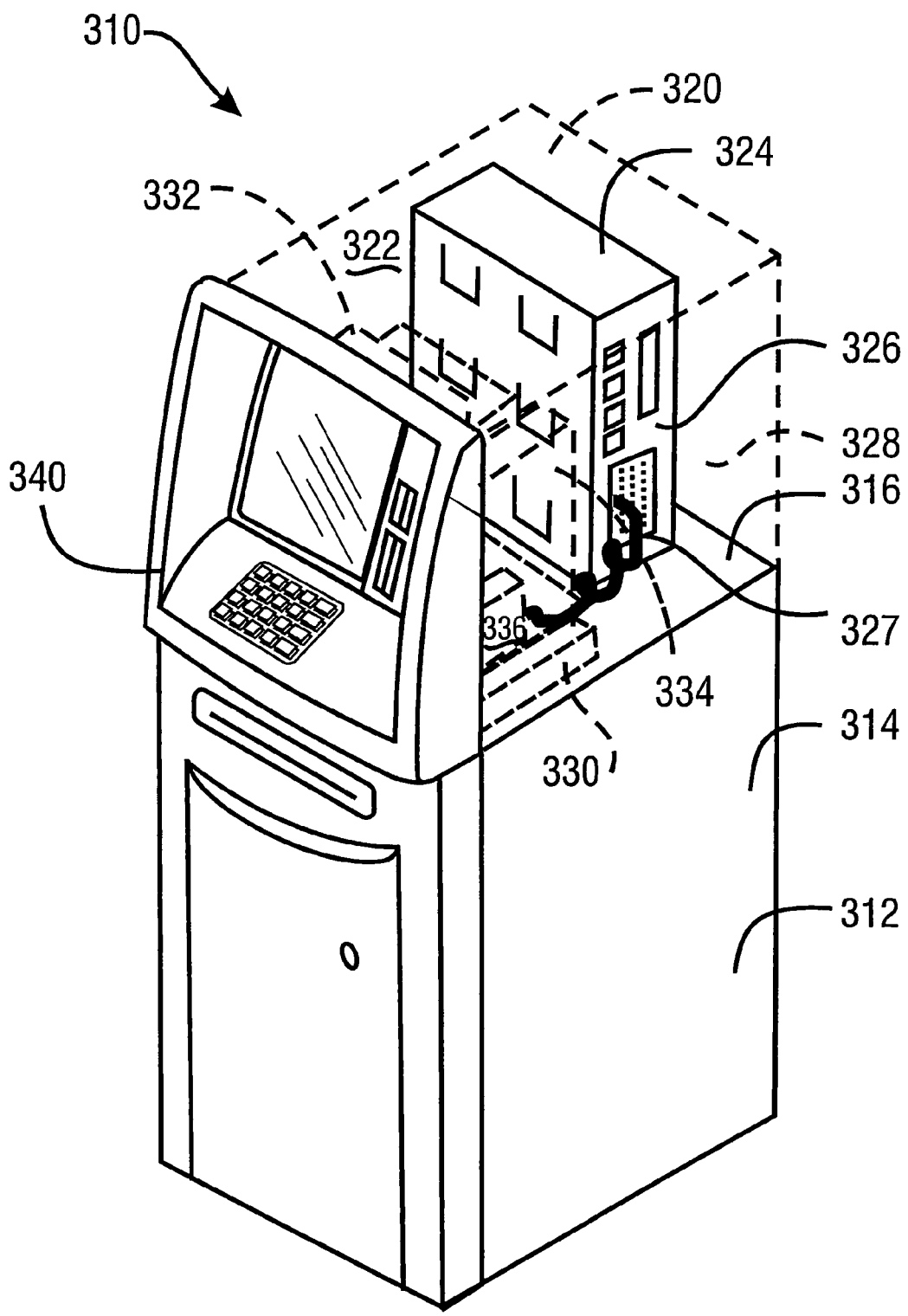
FIG. 16 is an isometric view, partly in phantom, of an alternate exemplary embodiment of an automated banking machine in an operational condition.
Figure 17:
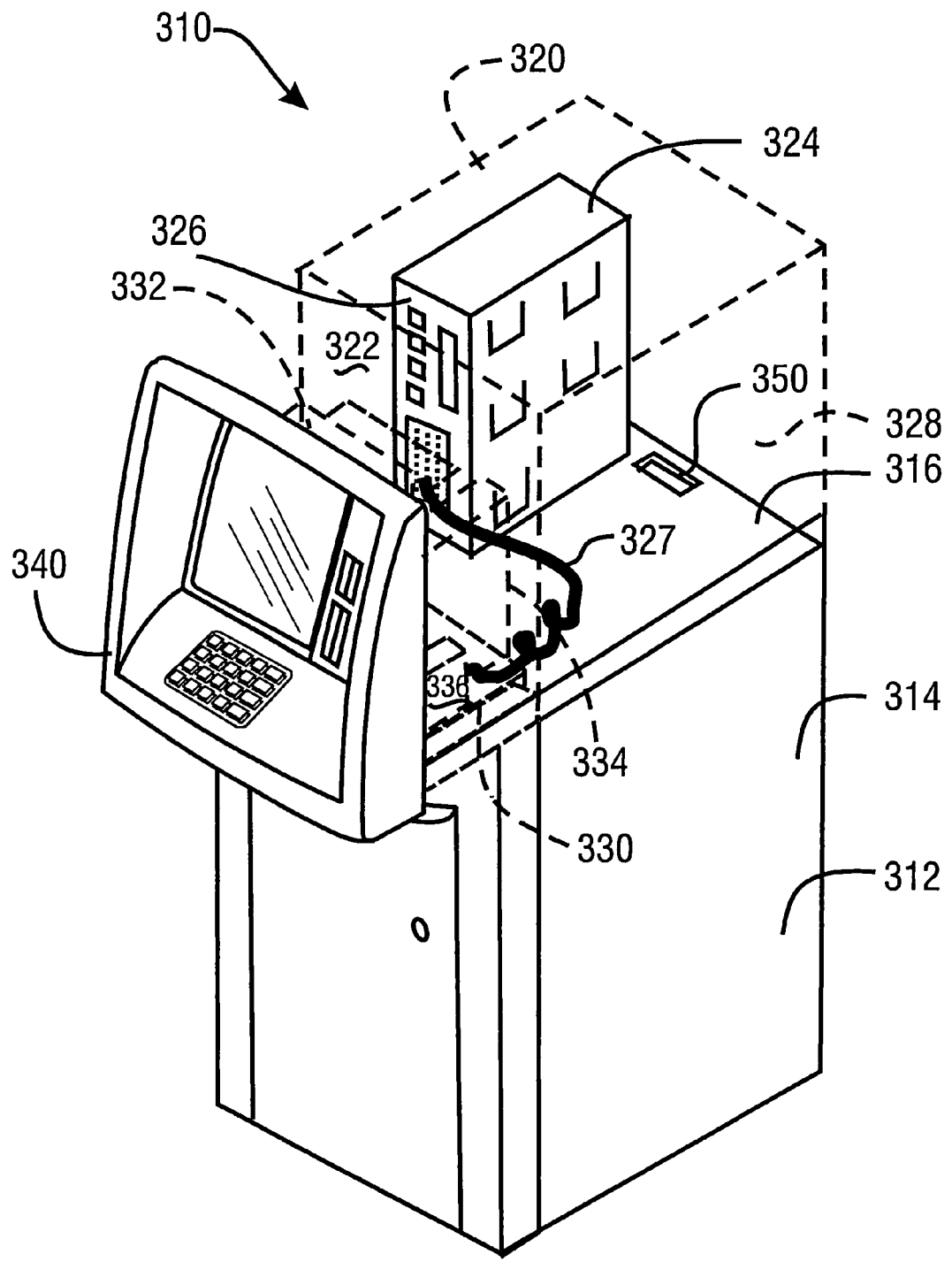
FIG. 17 is an isometric view, partly in phantom, of the automated banking machine of FIG. 16 in a serviceable condition.

In another exemplary embodiment, illustrated in FIGS. 16 and 17, ATM 310 may include a chest 312 having a chest housing 314 including top wall 316. As in previously described embodiments, chest housing 314 bounds a secure area which holds lower banking machine components including a currency dispenser mechanism which may be similar to mechanism 64 shown in FIG. 3. ATM 310 further includes a top housing 320 (shown in phantom) bounding an interior area 322.

In this exemplary embodiment, ATM 310 includes a processor case 324 that houses the primary ATM processor. The processor may be an Intel Pentium (PL type) processor. Of course, in some embodiments the case may house multiple processor or no processors at all. The ATM processor causes operation of the various devices and mechanisms in the ATM.

In this exemplary embodiment, processor case 324 is in supporting connection with top wall 316 of chest housing 314. Processor case 324 includes a first functional side 326 that is operable to establish connections, such as through cable 327, from the various banking machine components. Other processor components, including but not limited to circuit cards having various functions, additional processors, drives (CD, DVD, floppy), power supplies, memory, or encryption cards, may be carried on or within processor case 324. Such components may also be accessed, removed and/or replaced and routine maintenance performed through access to the functional side of the processor case.

In order to minimize the space occupied by ATM 310, it is advantageous to orient processor case 324 of the exemplary embodiment so that the first functional side 326 is substantially parallel to a first side wall 328 (shown in phantom) of top housing 320. However, in order to easily access first functional side 326 for servicing or connecting cables, it is advantageous to orient processor case 324 so that the first functional side 326 is substantially perpendicular to the first side wall 328, facing the front opening of the ATM. In order to accomplish both these purposes, the processor case 324 of the exemplary embodiment is rotationally supported in connection with the top wall 316 of the chest housing. The processor case 324 is selectively rotationally movable between an operational position, shown in FIG. 17, wherein the first functional side 326 is substantially parallel to the first side wall 328, and a service position, shown in FIG. 16, wherein the first functional side 326 is substantially perpendicular to the first side wall 328.

In this exemplary embodiment, a rollout tray 330 is supported on the top wall 316 of the chest housing 314. As in earlier described exemplary embodiments, the rollout tray 330 is selectively movable between a retracted position wherein the rollout tray 330 is within the interior area 322, and an extended position wherein the rollout tray 330 extends outwardly from the interior area through a front opening in the top housing 320. In the exemplary embodiment, various upper banking machine components such as display 332, receipt printer 334, and card reader 336 are supported on rollout tray 330. Also, an upper fascia 340 may be mounted in supporting connection with rollout tray 330. As in other described embodiments, when the rollout tray is in the retracted position, the upper fascia 340 covers the front opening in the top housing.

In the exemplary embodiment, when rollout tray 330 is in the retracted position, as illustrated in FIG. 16, the processor case 324 is prevented from rotating from the operational position to the service position. When the rollout tray 330 is in the extended position, as illustrated in FIG. 17, there is enough clearance in the interior area 322 to permit the processor case 324 to be rotated into the service position. Thus, when the rollout tray 330 is in the extended position, the upper banking machine components supported thereon are readily accessible for service. Likewise, the cable connections and any processor components carried on the processor case are accessible for service.

In a method for servicing banking machine components of an ATM, a rollout tray 80 mounted in supporting connection with a top housing 320 is extended from a retracted position so that the rollout tray extends through a front opening in the top housing. The method includes disengaging any locking mechanisms that operate to retain the rollout tray in the retracted position.

A processor case 324 disposed in an interior area bounded by the top housing may be rotated from an operational position to a service position. At least one processor component mounted in supporting connection with the processor case may be accessed for servicing. After servicing of the processor component is complete, the processor case may be rotationally returned to the operational position from the service position. Thereafter, the rollout tray may be repositioned into the retracted position.

The step of servicing the processor component may include connecting or disconnecting cables or connections, adding or replacing components such as circuit cards, performing diagnostic tests and other functions to facilitate operation of the ATM.

Prior to repositioning the rollout tray, other banking machine components may be serviced while the rollout tray is extended. For example, a display, card reader, and receipt printer assembly are readily accessible for service. The service can include routine maintenance, replacement of non-working components, addition of other banking machine components, and the like. Connections with the processor can be readily made while the rollout tray is in the extended position and the processor case is in the service position.

The ATM may include a slidable top housing cover as earlier described. The service method includes the step of rearwardly sliding the top housing cover. After the servicing of banking machine components is completed, the method includes returning the top housing cover to an operational position.

During servicing of the ATM, the lower banking machine components may also be accessed for servicing. The service method includes disengaging any locking mechanisms that retain the lower fascia in a covering position. The lower fascia may thereafter be moved into the accessible position. The locking bolt mechanism that securely engages the chest door with the chest housing may be disengaged so that the chest door may be placed in the open position.

An exemplary method further includes the step of engaging the chest door with the lower fascia when the chest door is in the open position and the lower fascia is in the accessible position in order to retain the door in the open position.

The lower banking machine components, such as currency stacker, currency dispenser mechanism, and currency delivery mechanism (as shown in FIG. 3). An exemplary service method includes performing routine maintenance, replenishing currency, removing sheets, disengaging sheets from the currency dispenser mechanism, replacing components and the like.

The ATM can include connections and/or cables that extend between the processor case and lower banking machine components that are generally housed within the secure chest. The chest housing may include various openings 350 through the walls to accommodate the connections and/or cables (FIGS. 10-11 and 17). When the processor case is in the service position, the connections can be readily established, maintained and/or changed.

An exemplary method of constructing an ATM apparatus is provided. The exemplary method includes mounting a top housing in supporting connection with a chest adapted for use in an automated banking machine apparatus. A first chest door is operable to selectively close a first opening in the chest housing.

The method further includes mounting an upper fascia in supporting connection with the top housing and mounting a lower fascia in movable supporting connection with the chest housing.

The upper fascia and the top housing are selectively positioned relative each other so that a front opening in the top housing is selectively covered by the upper fascia, and wherein a rearwardly extending portion of the upper fascia overlies a forward region of the top housing.

The lower fascia is selectively positioned in a covering position relative a chest door wherein a first side extension of the lower fascia overlies a first forward portion of the chest housing and wherein a second side extension of the lower fascia overlies a second forward portion of the chest housing.

In an exemplary method, a lower edge surface of the upper fascia is placed in substantially parallel alignment with an upper edge surface of the lower fascia and an end edge of a rearwardly extending portion of the upper fascia is substantially vertically aligned with an end edge of a first side extension of the lower fascia at a first side of the ATM.

In an exemplary method, a second chest door is moveably mounted in supporting connection with the chest housing to operably close a second opening in the chest housing. A first locking bolt mechanism may be mounted to the first chest door and an alternate securing mechanism may be mounted to the second chest door.

In an exemplary method, a processor case is mounted in supporting rotational connection with a top wall of the chest housing wherein the processor case is selectively movable between an operational position and a service position, and wherein the processor case houses at least one processor.

In an exemplary method, at least one upper banking machine component is mounted in supporting connection with a rollout tray which is mounted in movable supporting connection with the chest housing, wherein the rollout tray is selectively movable between a retracted position wherein the rollout tray is within an interior area, and an extended position wherein the rollout tray extends outwardly from the interior area through the front opening in the top housing.

The exemplary method includes selectively placing the rollout tray in the extended position, selectively rotating the processor case into the service position, and establishing an operable connection between the at least one upper banking machine component and the at least one processor.

In an exemplary method, the lower fascia is equipped with an inwardly extending flange operative to selectively engage the chest door when the lower fascia is in the accessible position and the chest door is in the open position.

Figure 18:
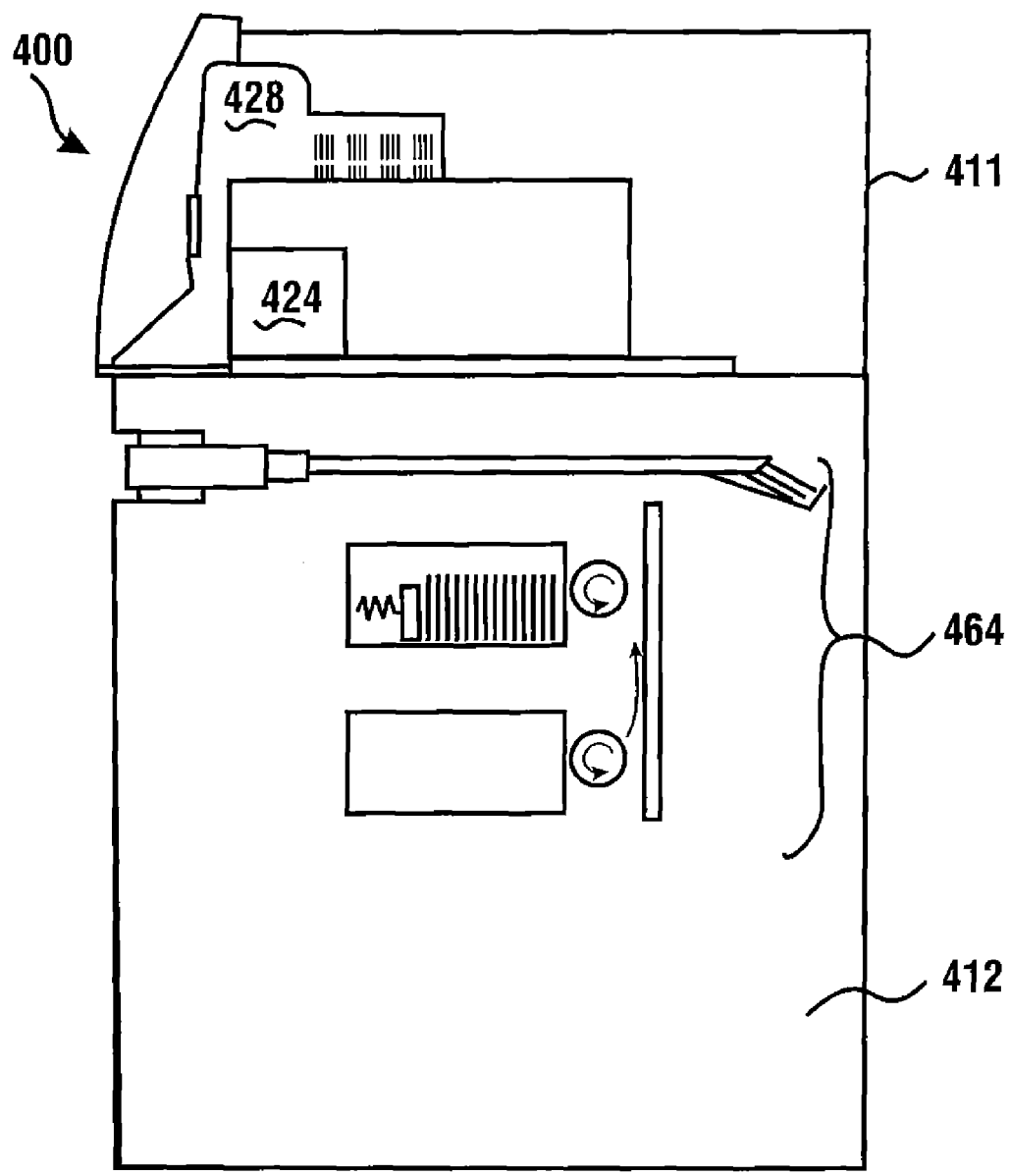
FIG. 18 is a side view of an automated banking machine illustrating various exemplary banking machine components.

Turning now to FIG. 18, there is shown therein an automated banking machine of a further exemplary embodiment, generally indicated as 400. In this exemplary embodiment, the automated banking machine 400 is an automated teller machine (ATM). The ATM includes a top housing 411 mounted in supporting connection with a chest portion 412. A card reader 424, operative to read indicia on user cards corresponding to financial accounts, is in operatively-supported connection with the top housing 411. A display 428 is also in operatively-supported connection with the top housing 411. Further, a cash dispenser 464 extends in the chest portion.

Figure 19:
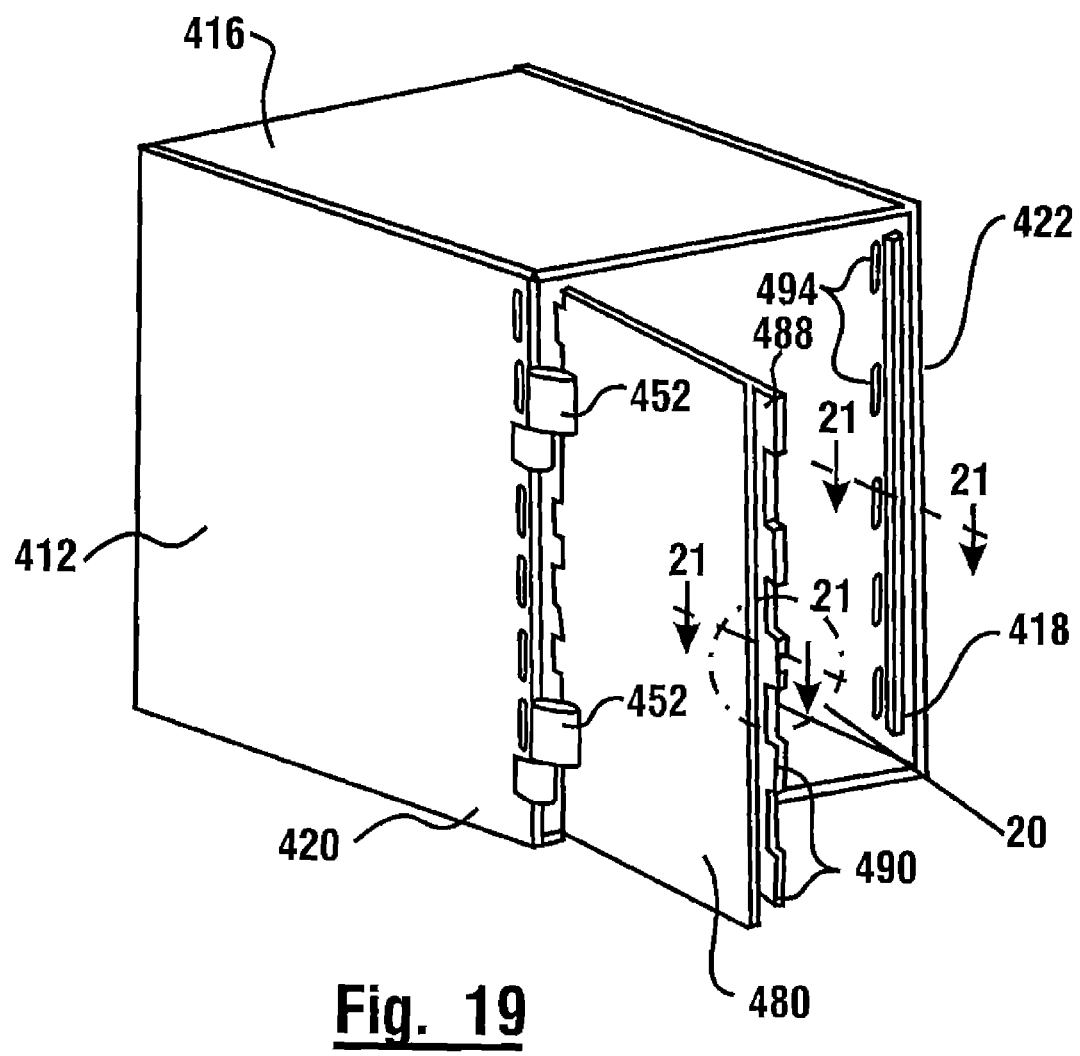
FIG. 19 is an isometric view of an automated banking machine chest illustrating various exemplary chest components.

Turning now to FIG. 19, the exemplary chest 412 includes a first sidewall 420, a second sidewall 422, and a top wall 416. The second sidewall 422 includes a striker plate 418 operatively attached thereto and at least one locking bolt aperture 494. While the exemplary striker plate 418 illustrated in FIG. 19 is an elongated plate that extends in the interior of the chest portion, in other embodiments, short sections may also be employed to serve a similar purpose. A chest door 480 is moveably mounted in supporting connection with the first sidewall 420 on hinges 452. While two hinges 452 are shown in FIG. 19, those skilled in the art will appreciate that other numbers of hinges may be successfully employed. The chest door 480 includes a locking bolt 488 moveably mounted in operatively supported connection with an interior surface thereof. The locking bolt 488 includes at least one locking bolt projection 490 which is configured to extend interiorly behind the inner surface of the striker plate and engage the at least one locking bolt aperture 494. As will be appreciated by those skilled in the art, one, two, or many locking bolt projections 490 and corresponding locking bolt apertures 494 may be employed. Further, in some exemplary embodiments the locking bolt may hold the door closed by extending outward behind the striker plate without engaging apertures in the side wall. With the exemplary chest door 480 in the closed position, the locking bolt 488 may be moved into position to engage the locking bolt projections 490 with the locking bolt apertures 494, thereby securing the chest door 480. Shown in FIGS. 3, 5, 9, and 12 are further details of an exemplary locking bolt mechanism.

Figure 20:
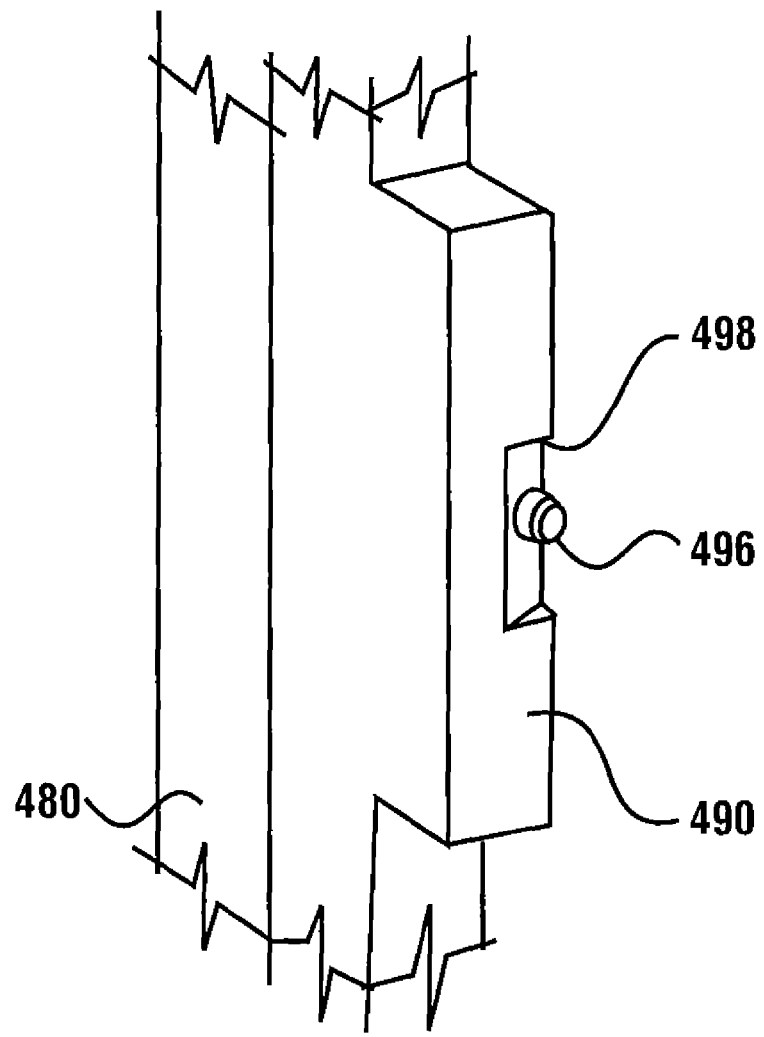
FIG. 20 is an enlarged partial isometric view of a portion of a locking bolt denoted by —20— in FIG. 19.
Figure 21:
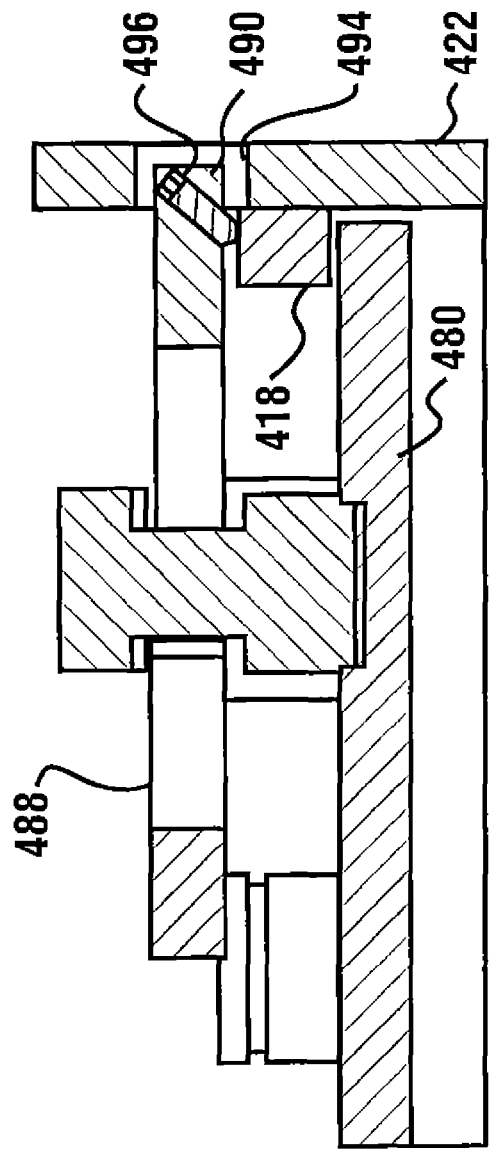
FIG. 21 is a partial cross-section taken along the lines 21-21 of FIG. 19 illustrating a portion of an aligner.
Figure 22:
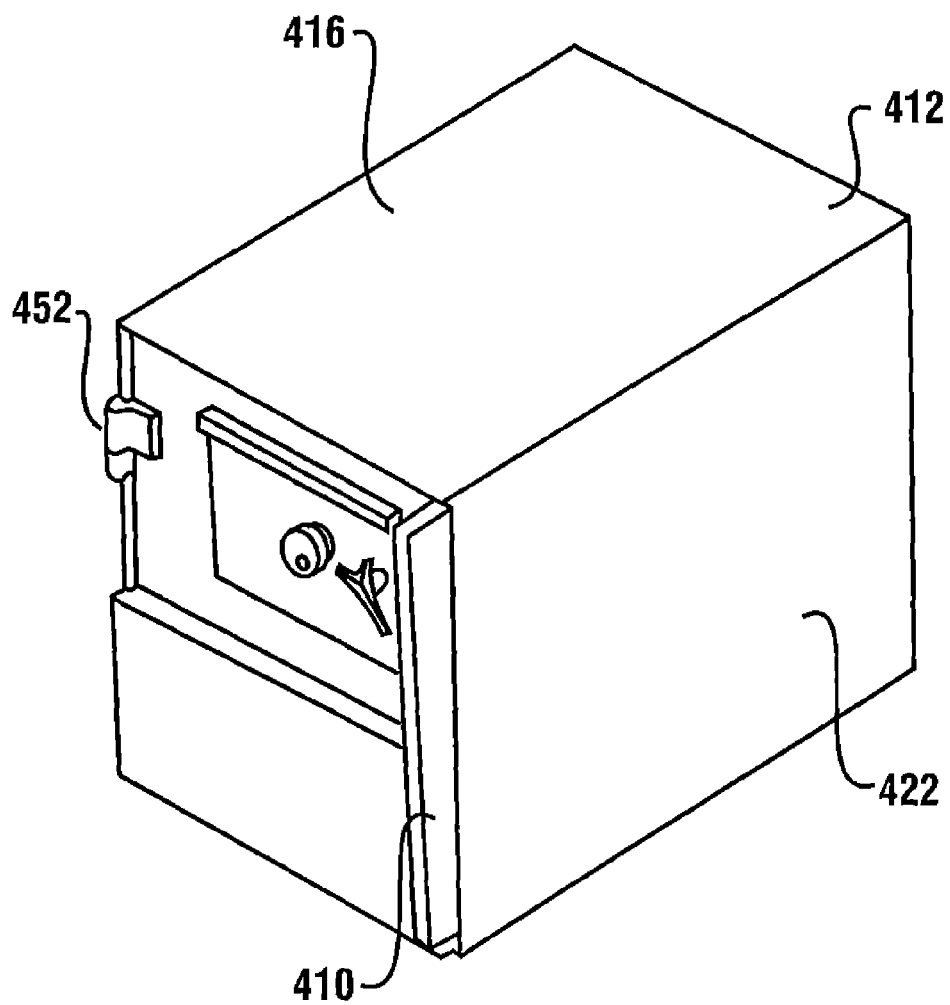
FIG. 22 is an isometric view of an automated banking machine chest illustrating the positioning of trim fascia.

Turning now to FIGS. 20 and 21, the details of an exemplary aligner 496 are shown. The exemplary aligner 496 illustrated in FIGS. 20 and 21 comprises a set screw. As shown in FIG. 21, the aligner 496 has male threads which mate with female threads formed in an opening in the locking bolt 488. As shown in FIGS. 20 and 21, the exemplary aligner 496 is operably connected with the locking bolt projection portion 490 of the locking bolt 488. Such an exemplary configuration enables a servicer, if desired, to access the aligner 496 from the exterior of the chest 412 through the locking bolt aperture 494. This may be done by engaging the aligner with an Allen wrench, screw driver, or other suitable tool that is extended in the aperture. As can be understood from FIG. 21, turning in the aligner 496 so it moves toward the striker plate 418 has the effect of drawing the interior side chest door 480 toward the striker plate 418, thereby aligning the chest door 480 and eliminating or reducing outward play in the chest door 480 when locked. In an exemplary condition, the chest door 480 is secured against the striker plate 418 and relative movement on the hinges 452 of the chest door 480, when the locking bolt is extended, is reduced. Additionally, alignment between a fascia trim 410 (FIG. 22) and the chest sidewall 422 may also be improved. Further, the aligner 496 may be operably connected with the locking bolt projection 490 portion of the locking bolt 488. Still further, the locking bolt projection 490 may include a groove 498 (FIG. 20) which improves access to adjust the aligner 496.

While an exemplary aligner 496 may include a set screw, or other rotatable member, other configurations may be employed to enable the aligner 496 to relatively move the chest door 480 and the striker plate 418. A ratchet mechanism comprising a set of teeth and a pawl, for example, may be employed. The aligner 496 may also be spring-loaded and such spring loading may be in combination with the various adjustment mechanisms. To facilitate operation, an end of the aligner 496 which contacts the striker plate 418 may be rounded (FIG. 21) or beveled. Of course, these approaches are exemplary.

In other exemplary embodiments, the aligner may be oriented so as to be accessible through another opening in the chest wall, other than the aperture that engages the bolt. While in the exemplary embodiment the aligner is adjusted by engaging a back face of the striker plate, to move the inside surface of the chest door toward the front face of the striker plate, in other embodiments other approaches may be used. For example, in some embodiments the aligner may be moved to engage another component other than a face of the striker plate. In still other embodiments the locking bolt may not extend in an aperture in the side wall of the chest portion but may only extend behind an inner face of the striker plate or other structure in the chest portion, to keep the door from being opened when the locking bolt is extended. In such cases, a suitable opening in the side wall of the chest may be provided for a tool to engage the aligner. In still other embodiments, an aligner that is threaded in the striker plate and accessible from outside the chest through an opening may be used. Of course, these approaches are exemplary.

It should be understood that for purposes of this disclosure an aligner shall be deemed to include one or more selectively movable members that can be moved to selectively position a banking machine door relative to a face of a striker or similar structure when a locking bolt is extended. It should be understood that the structures discussed herein are exemplary and in other embodiments other approaches may be used.

In an exemplary method, when a lock operatively connected with the door is unlocked, the locking bolt 488 is moved from the locked position (FIG. 21, for example) to the unlocked position (shown in exemplary fashion in FIG. 5). The chest door 480 is moved from a closed position (FIG. 21, for example) to the open position (FIG. 19). With access to the interior of the chest, the servicer services any of a variety of serviceable components housed within the chest 412. In addition a servicer may replenish cash, remove deposits or engage in other service activity. The chest door 480 can then be moved to the closed position, the locking bolt 488 is moved to the locked, extended position, and the aligner 496 adjusted to align the chest door 480 with the striker plate 418. While the aligner 496 may be adjusted subsequent to closing and extending the locking bolt on the chest door 480, it may also be adjusted prior to such movement. For example, the aligner 496 may be adjusted prior to such movement to ensure a snug fit between the chest door 480 and the striker plate 418. As the locking bolt 488 is moved to the locked position, the aligner 496 slides over the striker plate 496 to urge the chest door 480 toward the front face of the striker plate 418. The lock on the door can be locked to hold the locking bolt in the extended position. It should be understood that in the exemplary embodiment the aligner can be adjusted regardless of the condition of the lock.

In a further exemplary method, a top housing is mounted in supporting connection with a chest adapted for use in an automated banking machine. The chest includes at least a portion of a currency dispenser extending therein; a first sidewall; a second sidewall, the second sidewall including a striker plate and a locking bolt aperture; a chest door moveably mounted in supporting connection with the first sidewall; a locking bolt moveably mounted in supported connection with the interior surface of the chest door, the locking bolt having at least one locking bolt projection configured to engage at least one locking bolt aperture, wherein when the chest door is in a closed position, the locking bolt is moveable between an unlocked position, wherein the locking bolt projection is not engaged with the locking bolt aperture, and a locked position, wherein the locking bolt projection is engaged with the locking bolt aperture; and an aligner operably connected with the locking bolt, wherein the aligner is adjustable to relatively position the chest door and the outer face of the striker plate. A card reader is mounted in operatively-supported connection with the top housing, wherein the card reader is operative to read indicia on user cards corresponding to financial accounts. A display is mounted in operatively supported connection with the top housing. The aligner is adjusted whereby when the chest door is in the closed position and the locking bolt is in the locked position, the inner face chest door is held closely adjacent the outer face of the striker plate. As can be appreciated, assuring the chest door in the closed position is closely proximate the striker plate, with very limited play, reduces the risk that a tool can be used by a criminal to cut or pry the chest open.

In a further exemplary method, the aligner includes a set screw and the step of adjusting further comprises turning the aligner by engaging it with a tool such as an Allen wrench, screwdriver or similar tool that can be extended in an opening to engage the set screw.

In a further exemplary method, the aligner and the locking bolt cooperate to form a ratchet and the step of adjusting further comprises depressing the aligner so it moves inward and stays in such inward position.

Figure 23:
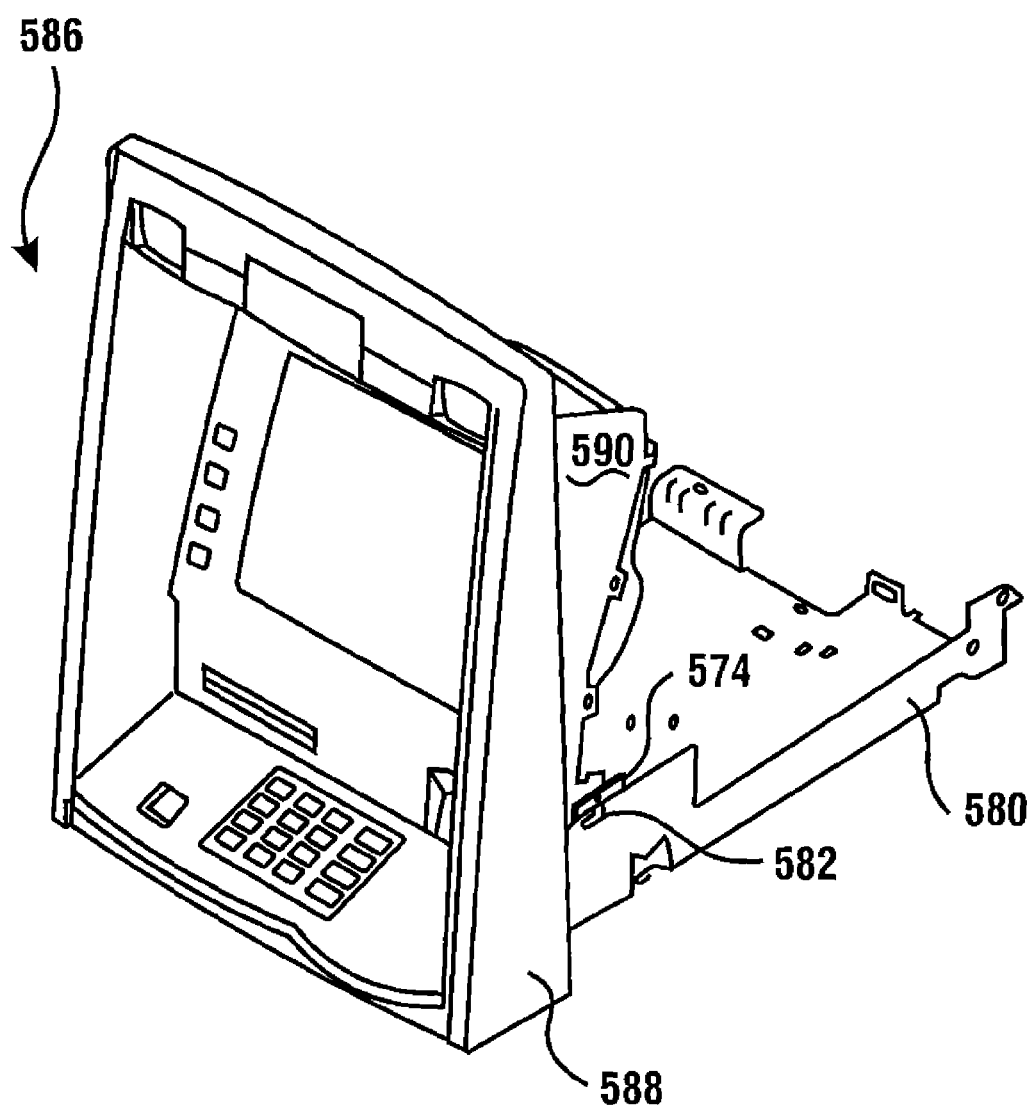
FIG. 23 is an isometric view of a portion of an exemplary automated banking machine illustrating a fascia assembly and a support.

Turning now to FIG. 23, there is shown therein a portion of an automated banking machine of a further exemplary embodiment. (See FIG. 1 for a general exemplary embodiment of an automated banking machine.) In this exemplary embodiment, a fascia assembly 586 comprises a fascia cover 588 operatively connected to a fascia frame 590. While the fascia cover 588 and fascia frame 590 may be discussed and exist as separate elements, it is to be understood the fascia cover 588 and the fascia frame 590 may be of a single-piece construction. Also shown in FIG. 23 is a support 580. The support 580 may comprise a tray, which tray may further support automated banking machine components such as, by way of example only, a display 28 (e.g., FIG. 2), a card reader 24 (e.g., FIG. 2), a receipt printer 30 (e.g., FIG. 2), and a cash dispenser or portions thereof 64 (e.g., FIG. 3). The support 580 may comprise slides 84 (e.g., FIG. 2) either in combination with a tray or separately. The fascia assembly 586 is supported, at least in part, by the support 580. The support 580 is further supportively connected to the housing 12 (e.g., FIG. 2) and/or the chest 40 (e.g., FIG. 2).

Figure 24:
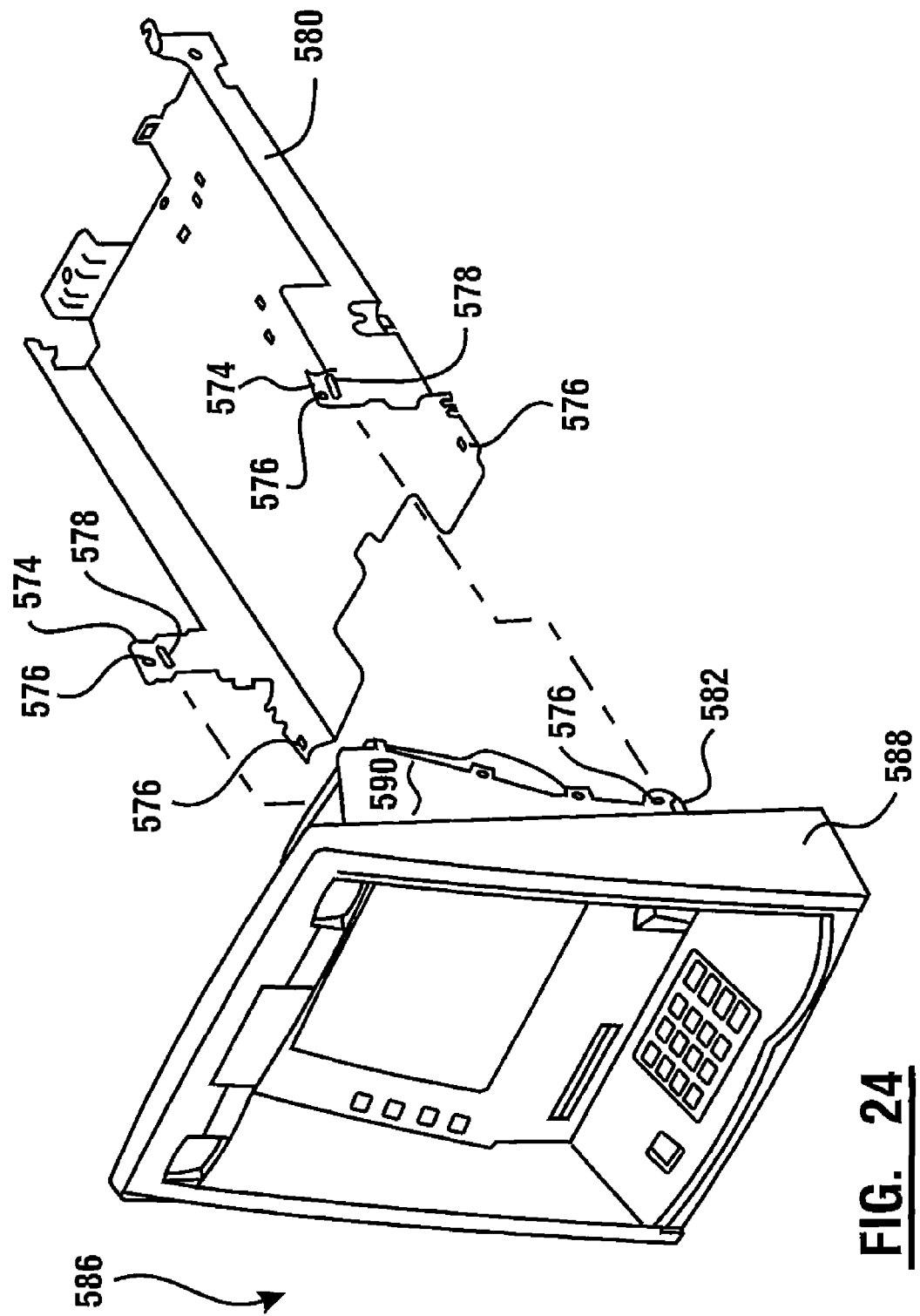
FIG. 24 is an exploded isometric view of a portion of the exemplary automated banking machine of FIG. 23 illustrating the fascia assembly and the support.

Turning now to FIG. 24, there is illustrated an exploded isometric view of the exemplary fascia assembly 586 and exemplary support 580 of FIG. 23 further illustrating the exemplary features. The fascia frame 588 comprises at least one hook 582 and may further comprise two or more hooks 582 (not shown) in spaced-apart relation. The support 580 comprises at least one slot 578 and may further comprise two or more slots 578. The at least one hook 582 and the at least one slot 578 are formed to enable the at least one hook 582 and the at least one slot 578 to engage and thereby at least partially secure the fascia assembly 586 to the support 580. It is to be understood that either the fascia frame 590 or the support 580 may comprise a hook 582 and the other of the fascia frame 590 or the support 580 comprise a slot 578.

Figure 25:
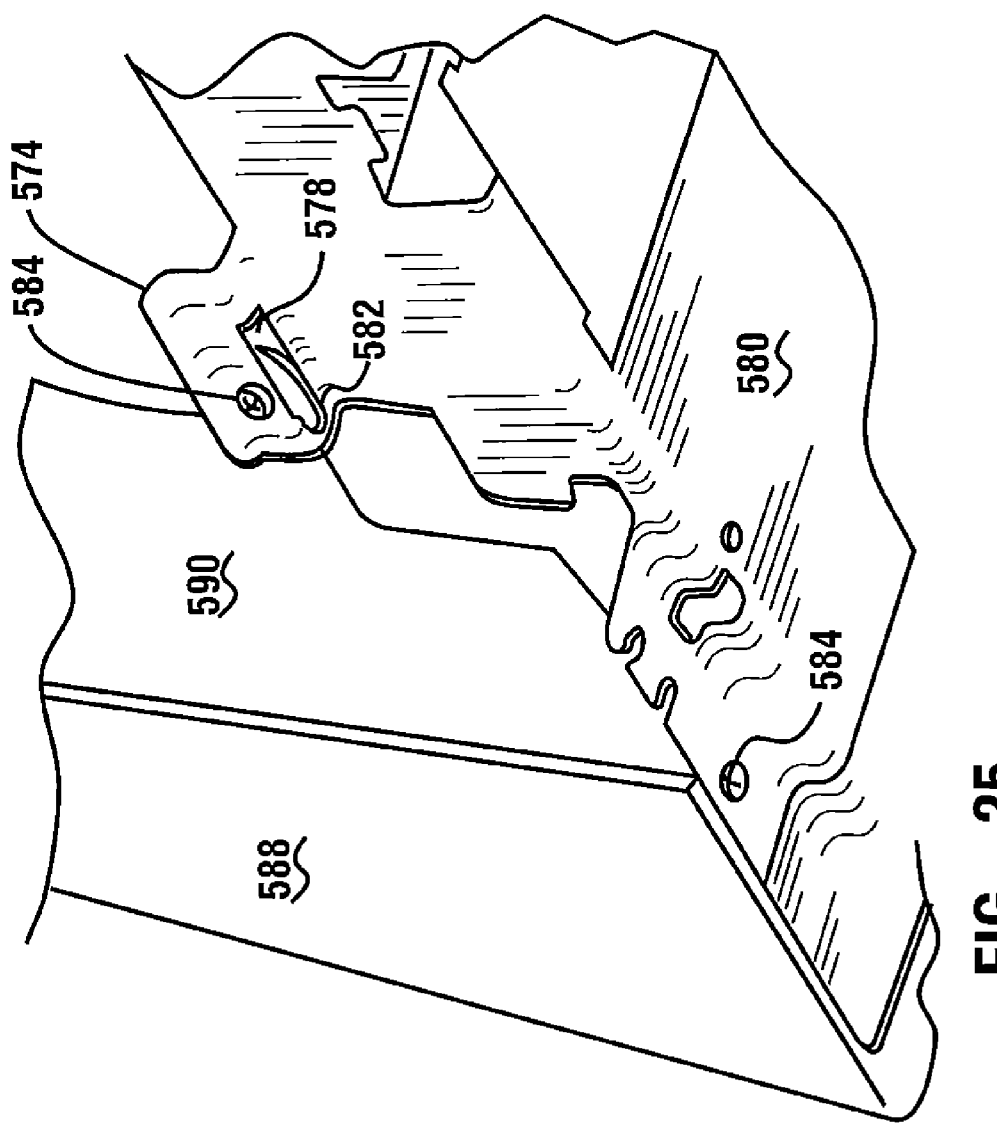
FIG. 25 is an isometric view of a portion of an exemplary automated banking machine illustrating portions of a fascia assembly and a support.
Figure 26:
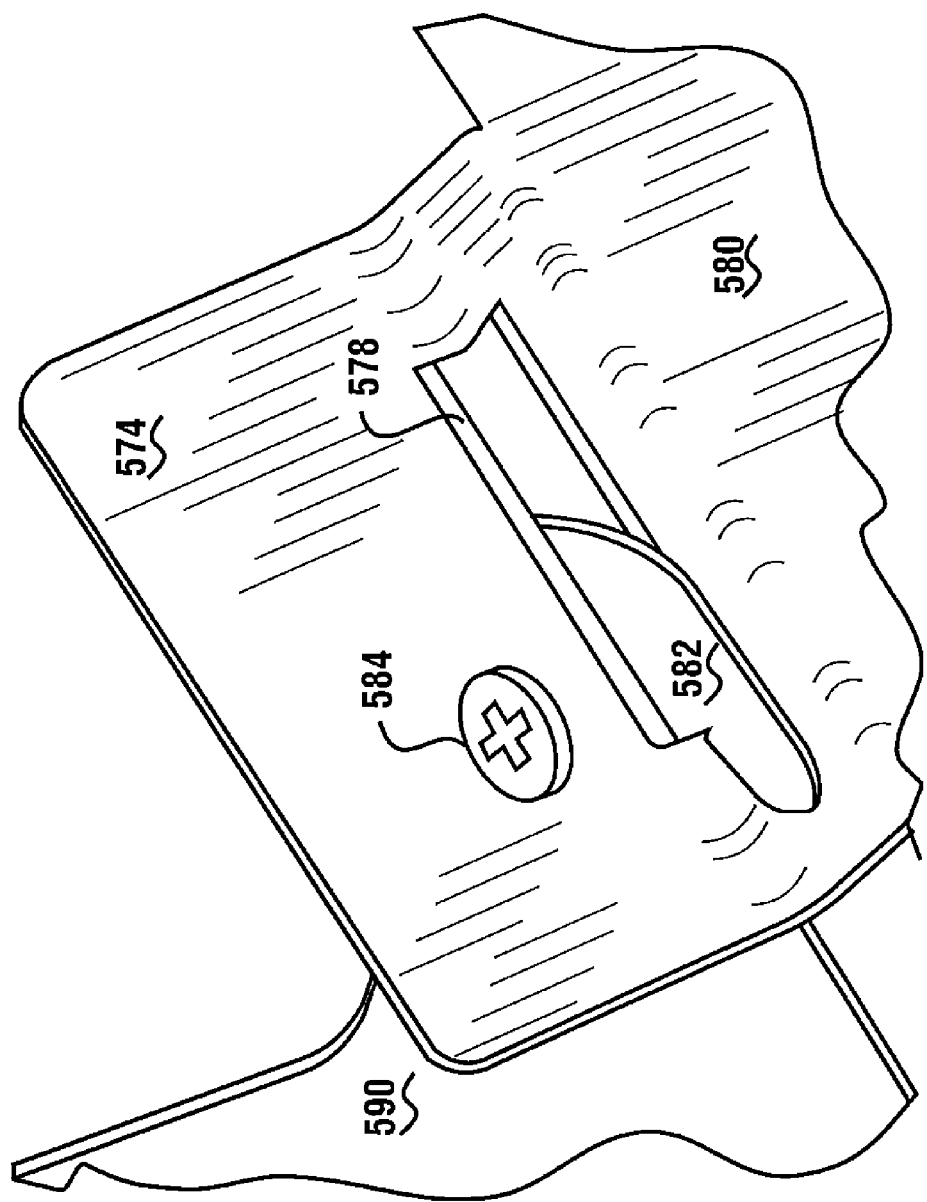
FIG. 26 is an isometric view of a portion of an exemplary automated banking machine illustrating portions of a fascia assembly and a support.

Turning now to Figures and 25 and 26, and with reference to FIG. 24, the details of the engagement of the hook 582 and the slot 578 may be further understood. As the hook 582 is engaged with the slot 578, the fascia assembly 586 becomes at least partially supported by the support 580. As such, the fascia assembly 586 may be initially engaged and further secured by a single person. Further, the fascia assembly 586 may be unsecured and disengaged by a single person. As best seen in FIGS. 25 and 26, the hook 582 may be offset from the slot 578 and thus provide a positive engagement between the hook 582 and the slot 578. To further secure the fascia assembly 586 to the support 580, one or more fasteners 584 may be utilized. By way of example only, as shown in FIGS. 25 and 26, a screw 584 may engage screw holes 576 in the fascia frame 590 and in the support 580.

The support 580 may further comprise one or more tabs 574 which may serve to guide the one or more hooks 582 into the one or more slots 578. As with the hooks 582 and the slots 578, it is to be understood that either the fascia frame 590 or the support 580 may comprise one or more tabs 574.

In an exemplary method, referring also to FIGS. 2, 3, and 23-26, the method comprises mounting a housing 12 in supporting connection with a chest 40 adapted for use in an automated banking machine 10, the housing 12 comprising an interior 20 and at least one opening 22 into the interior 20. The method comprises installing a card reader 24 in operatively supported connection with the housing 12, wherein the card reader 24 is operative to read indicia on user cards corresponding to financial accounts. The method comprises installing a display 28 in operatively supported connection with the housing 12. The method comprises installing a cash dispenser 64 in operatively supported connection with the housing 12. The method comprises installing a printer 30 in operatively supported connection with the housing 12 and operative to print information corresponding to financial accounts and financial transactions. It is understood the card reader 24, the display 28, the cash dispenser 64, and the printer 30 may be mounted onto various elements of the automated banking machine 10, including, but not limited to, a support 580 which may comprise a tray. The method comprises installing the support 580 in operatively supported connection with the housing 12, the support 580 moveable between a position substantially within the interior area 20 of the housing 12 and a position wherein at least a portion of the support 580 is extended through the housing opening 20. (Best understood by reference to FIG. 2.) The method comprises mounting a fascia assembly 586 to the support 580, the fascia assembly 586 comprising a fascia frame 590 and a fascia cover 588 in operatively supported connection with the fascia frame 590. At least one of the fascia frame 590 and the support 580 comprises at least a first hook 582 and the other comprises at least a first slot 578, and the at least first hook 582 and the at least first slot 578 formed to engage each other. The method comprises engaging the at least first hook 582 with the at least first slot 578.

The method further comprises moving the at least first hook 582 to an offset position relative to the at least first slot 578. (Best seen in FIGS. 25 and 26.) The method further comprises securing the fascia assembly 586 to the support 580 with, for example, a fastener 584 such as a screw. The method further comprises moving the fascia assembly 586 to a secure closed position adjacent the housing opening 22. (Best seen in FIG. 1.)

In a further exemplary method, the method comprises moving a fascia assembly 586 in operatively-supported connection with a housing 12 of an automated banking machine 10 from a secure closed position adjacent an opening 22 to an interior 20 of the housing 12 to a released away position away from the opening 22. (Best seen in FIGS. 1 and 2.) The automated banking machine 10 comprises a card reader 24 in operatively supported connection with the housing 12 and operative to read indicia corresponding to financial accounts on user cards; a display 28 in operatively supported connection with the housing 12; a printer 30 in operatively supported connection with the housing 12 and operative to print information corresponding to financial accounts and financial transactions; a cash dispenser 64 in operatively supported connection with the housing 12; and a support 580 in operatively supported connection with the housing 12, the support 580 moveable between a position substantially within the interior 20 of the housing 12 and a position wherein at least a portion of the support 580 is extended through the housing opening 22. (Best seen in FIGS. 1 and 2.) The fascia assembly 586 comprises a fascia frame 590 and a fascia cover 588 in operatively supported connection with the fascia frame 590. At least one of the fascia frame 590 and the support 580 comprises at least a first hook 582 and the other comprises at least a first slot 578, the at least first hook 582 and the at least first slot 578 formed to engage each other. The method comprises disengaging the at least first hook 582 from the at least first slot 578. The method comprises servicing at least one of a serviceable automated banking machine component. Such serviceable automated banking machine components include, for example, the card reader 24, the display 28, the printer 30, and the cash dispenser 64. The method comprises engaging the at least first hook 582 with the at least first slot 578. The method comprises moving the fascia assembly 586 from the released away position from the opening 22 to the secure closed position adjacent the opening 22. (Best seen in FIGS. 1 and 2.)

The fascia assembly 586 may be secured to the support 580 with one or more fasteners 584 and the method further comprises releasing the one or more fasteners 584 securing the fascia assembly 586 to the support 580. The method further comprises securing the one or more fasteners 584 securing the fascia assembly 586 to the support 580.

Figure 27:
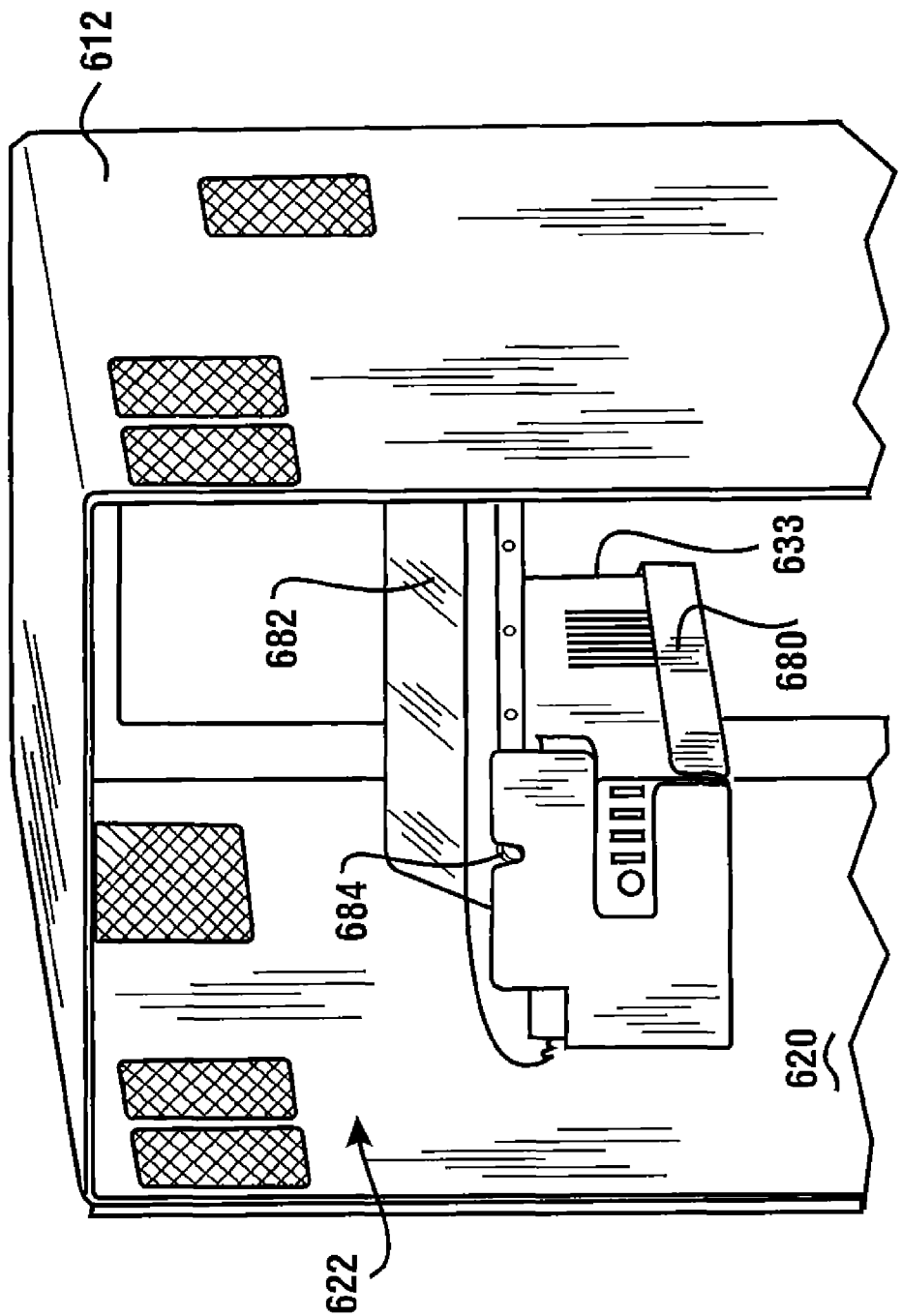
FIG. 27 is an isometric view of a portion of an exemplary automated banking machine illustrating a component mounting within a top housing.
Figure 28:
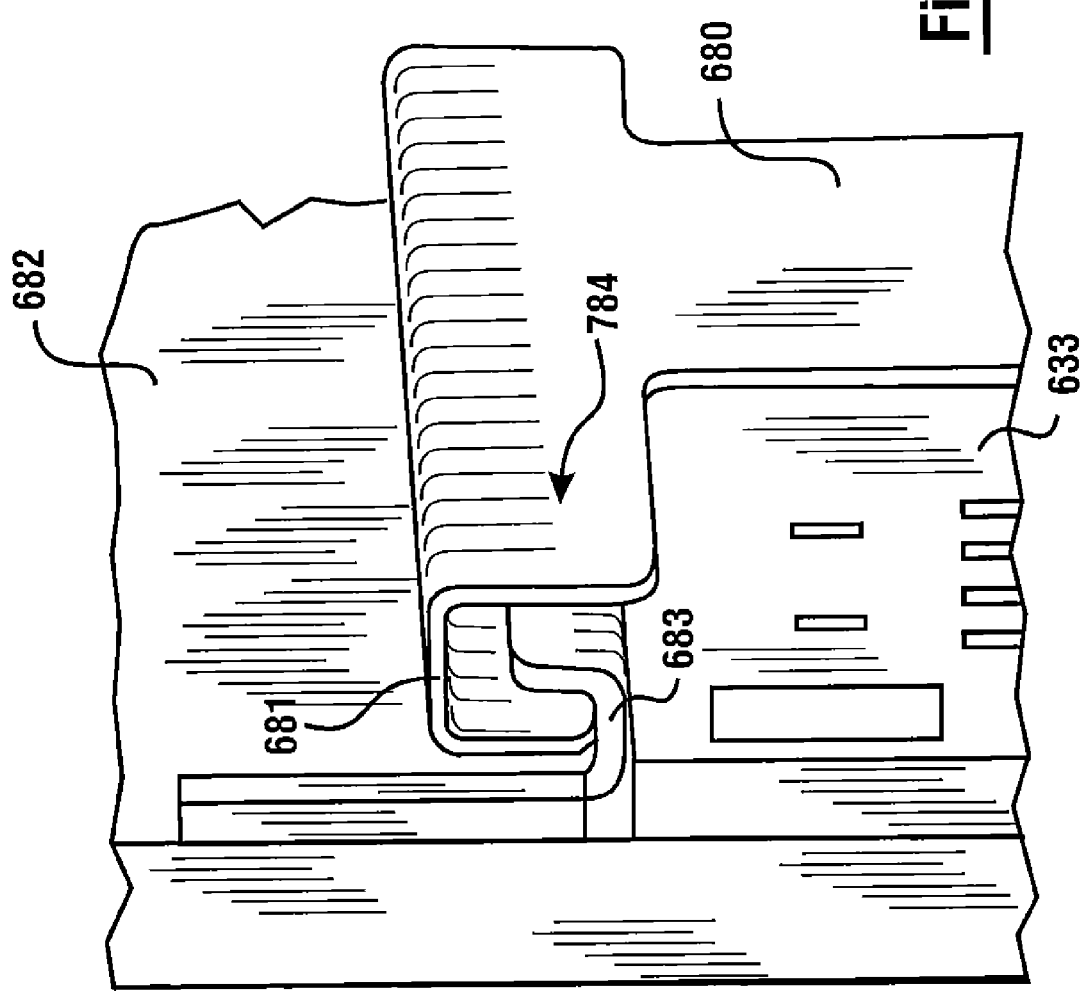
FIG. 28 is a detailed isometric view of a pivot connection of a component mounting and support bracket.
Figure 30:
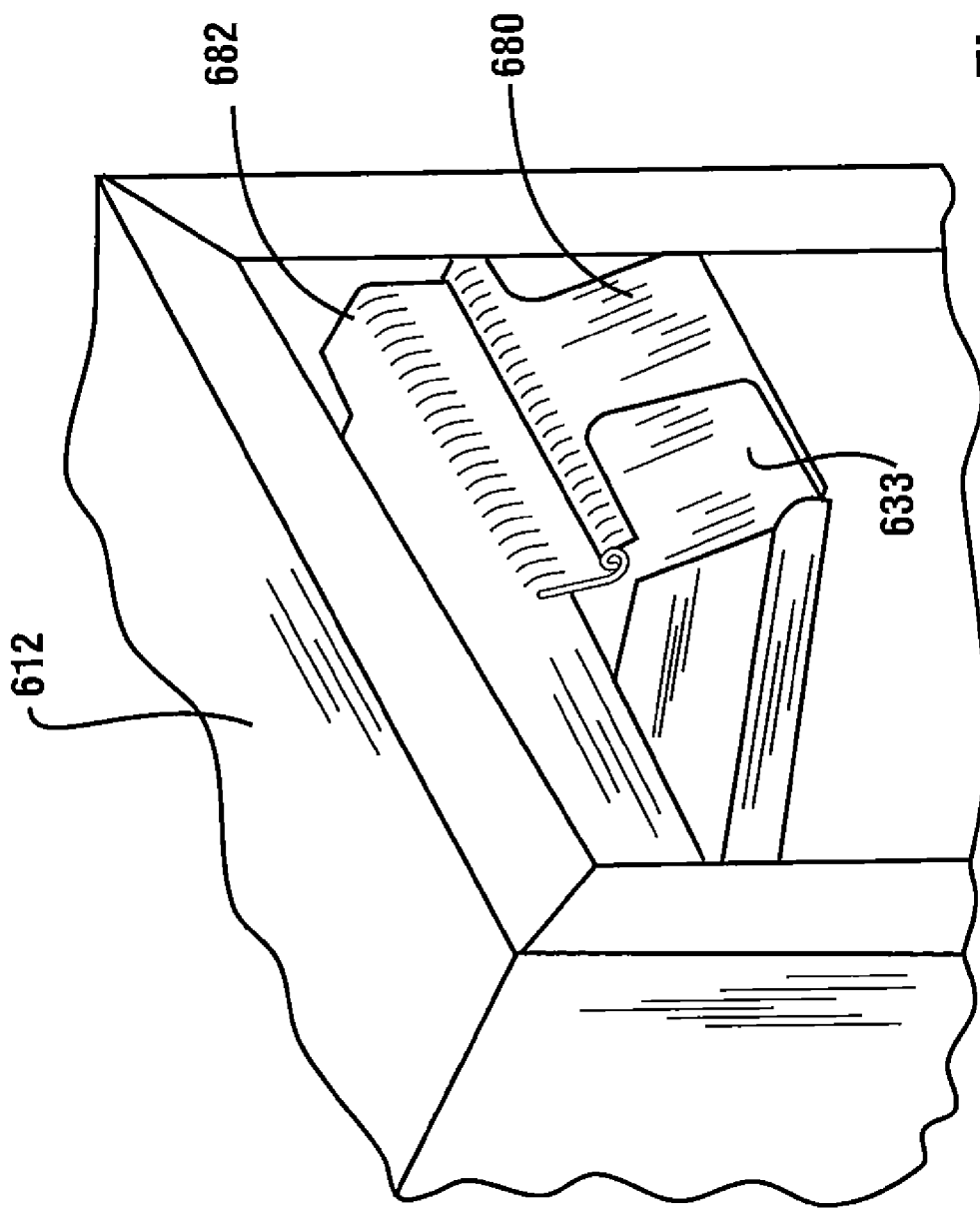
FIG. 30 is a detailed isometric view of a pivot connection of a component mounting and support bracket with the component pivoted downward.

Turning now to FIG. 27, a component 633 which in the exemplary embodiment comprises a processor case, is shown supported in the interior 620 of a housing 612 of an automated banking machine 10 (shown generally in FIG. 3). Attached to the housing 612 is a support bracket 682 to which a component support 680 is mounted. The component 633 is mounted on the component support 680. The component support of the exemplary embodiment comprises a tray, plate, shelf or bracket structure or structures operative to provide vertical support for a component within the housing. In the exemplary embodiment the component support comprises a support tray. As shown in exemplary fashion in FIG. 30, the component 633 is pivotally mounted to the housing 612 by a pivot 784 formed by the support bracket 682 and the component support 680. The pivot enables supported rotational movement about a generally horizontally extending axis. The detail of the exemplary pivot 784, illustrated in FIG. 28, shows a downwardly facing component support lip 681 combining in operative engaged relation with an upwardly facing support bracket lip 683 to form the pivot 784. As can be seen, the component 633, is thereby pivotally supported within the housing 612. Helping secure the component 633 and the component support 680 in place in this exemplary embodiment is a releasable screw 684 at a front end of the component 633 although other releasable securing means may be utilized. In the exemplary embodiment the screw 684 need not be removed to release the component support 680 so it may not be moved. As shown in FIG. 27, when the screw 684 is sufficiently tightened, it will engage the walls bounding a slot through which the screw extends and the component 633 will remain secured in place. In such an arrangement, the screw 684 need only be loosened sufficiently to enable the friction of the adjacent wall surfaces to be overcome and the component 633 may be pivoted downward. As will be appreciated by those skilled in the art, other effective releasable means may be employed instead of a screw 684.

Figure 29:
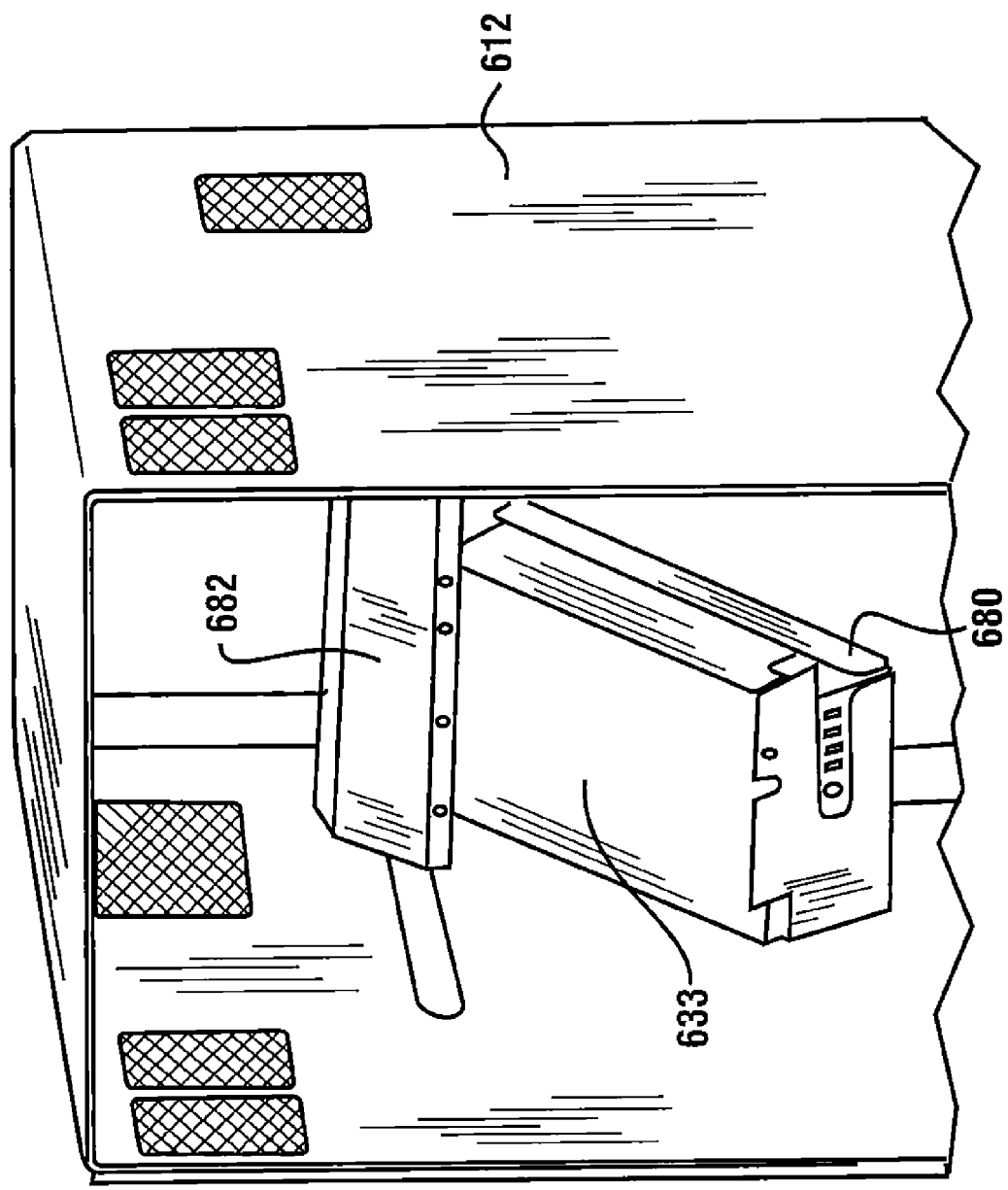
FIG. 29 is an isometric view of a component mounted on a component mounting rotated downward.
Figure 36:
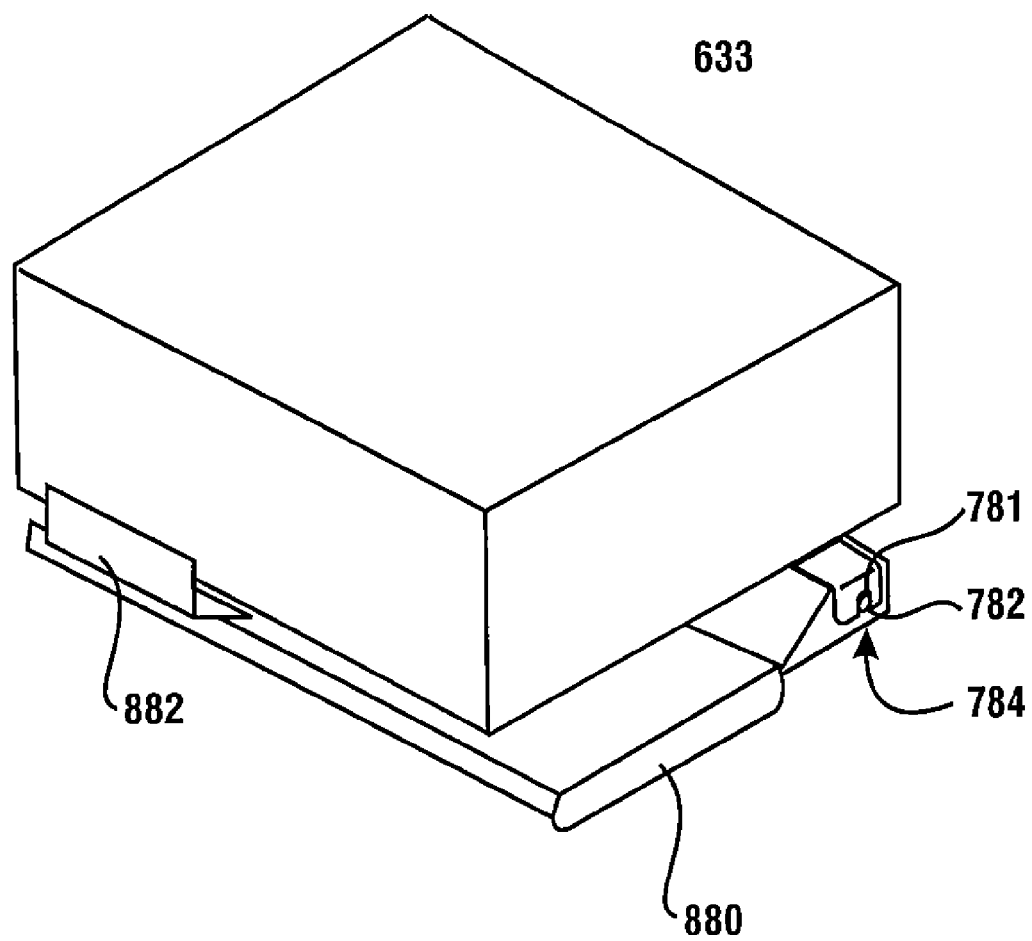
FIG. 36 is a further isometric view of the component mounting shown in FIG. 35.
Figure 37:
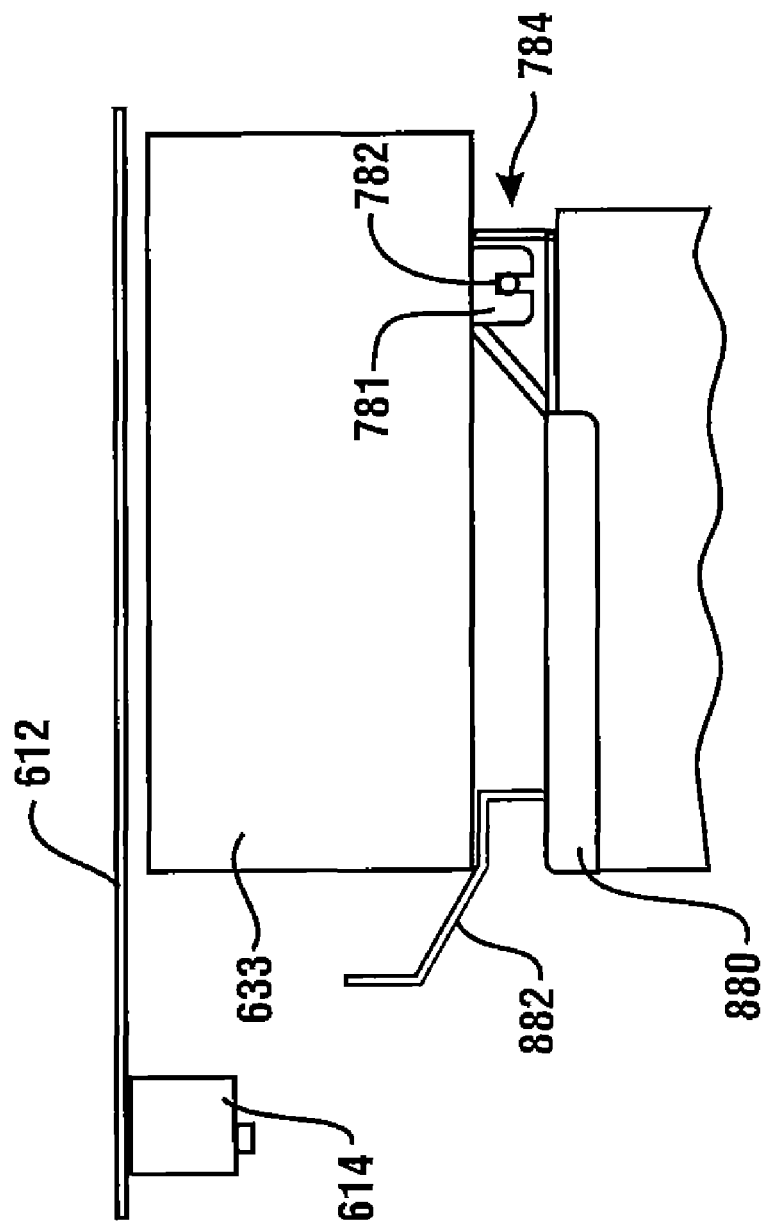
FIG. 37 is a side elevation view of the component mounting shown in FIG. 35.

FIG. 27 shows the component 633 in an operational position secured by both the pivot 784 and the screw 684. FIG. 29 shows the component 633 disposed rotationally downward in a service position. In the service position the component extends at an acute angle relative to the horizontal, operative position. As shown in FIG. 29, the component 633 is more accessible in the service position. For example when the component is a processor case, in the downwardly rotated position, the top of the case may be removed or the interior area otherwise made accessible to enable visual and/or manual access to circuit cards and other items housed therein. The component 633 may be serviced in place or, optionally, be removed from the interior area of the machine housing for service. The component 633 may be separated from the component support 680 or the component 633 and the component support 680 may be removed together in attached relation. It is to be understood that a separate support bracket 682 need not be attached to the housing 612 to enjoy the benefits of the described structure. The housing 612 may be formed to include, for example, a support bracket lip 683. Likewise, the component 633 need not be mounted on a component support 680, but, for example, the component 633 may be formed to include a component support lip 681. While a combination of a support bracket lip 683 and a component support lip 681 is shown, those skilled in the art will appreciate that other pivot combinations may be employed. As shown in FIGS. 36 and 37, for example, a pin 782 and socket 781 may be used. And, as shown in FIGS. 36 and 37, the pin 782 may be in operatively fixed connection with a support bracket 880 and the socket 781 may be in operatively fixed connection with the component 633 to effect the desired pivotally operative support.

Figure 38:
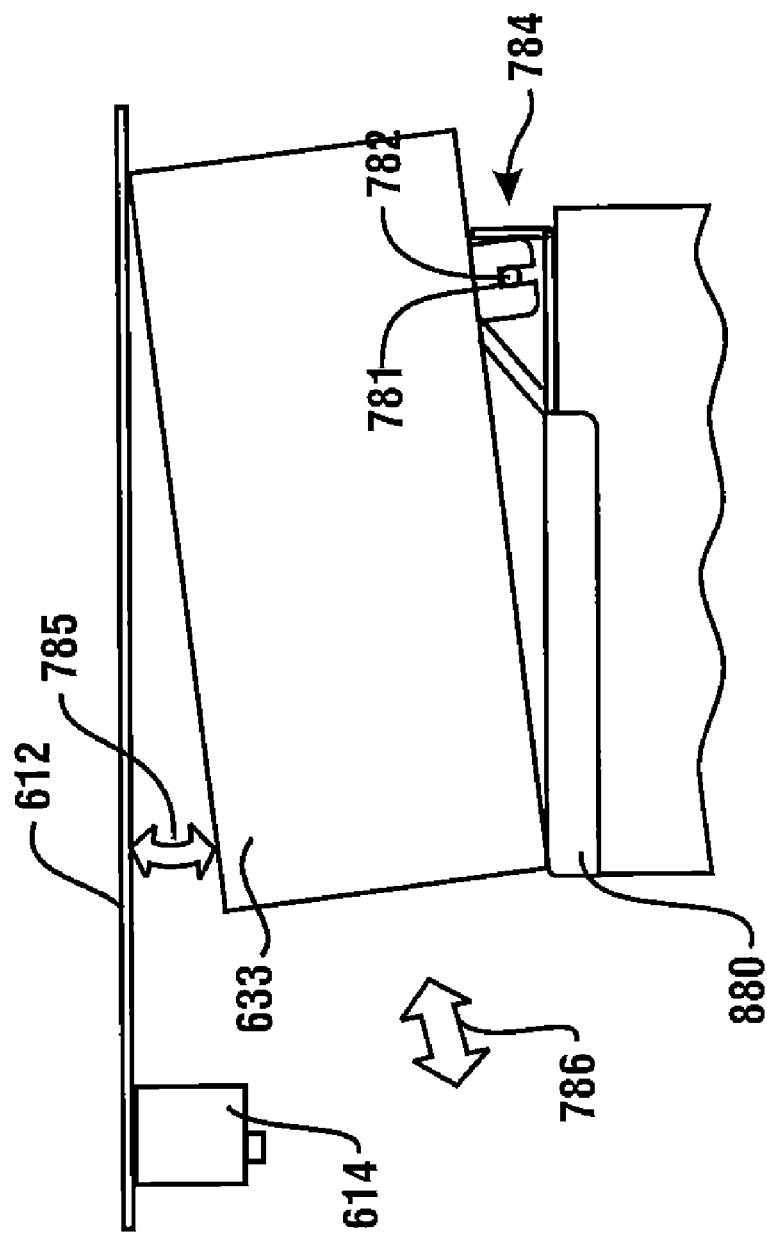
FIG. 38 is a side elevation view of the component mounting shown in FIG. 37 with the component pivoted downward.

FIGS. 35-38 illustrate an exemplary releasable angular support 882 which secures and helps elevate and level the component 633. As shown in FIG. 37, the angular support 882 is shaped to raise the front end of the component 633 by being interposed between the component 633 and a support bracket 880 while the component 633 is in pivotal support at the back end with the pivot 784. As shown in FIG. 38, by pivoting downward, the component 633 is placed in a position to be serviced directly or removed from the housing 612 and avoiding possible obstructions 614. Pivot direction arrow 785 and slide direction arrow 786 illustrate movements of the component 633 relative to the housing 612. In addition, in this exemplary embodiment the component 633 may be disengaged at the pivot 784 and removed from the interior area of housing 612.

Figure 31:
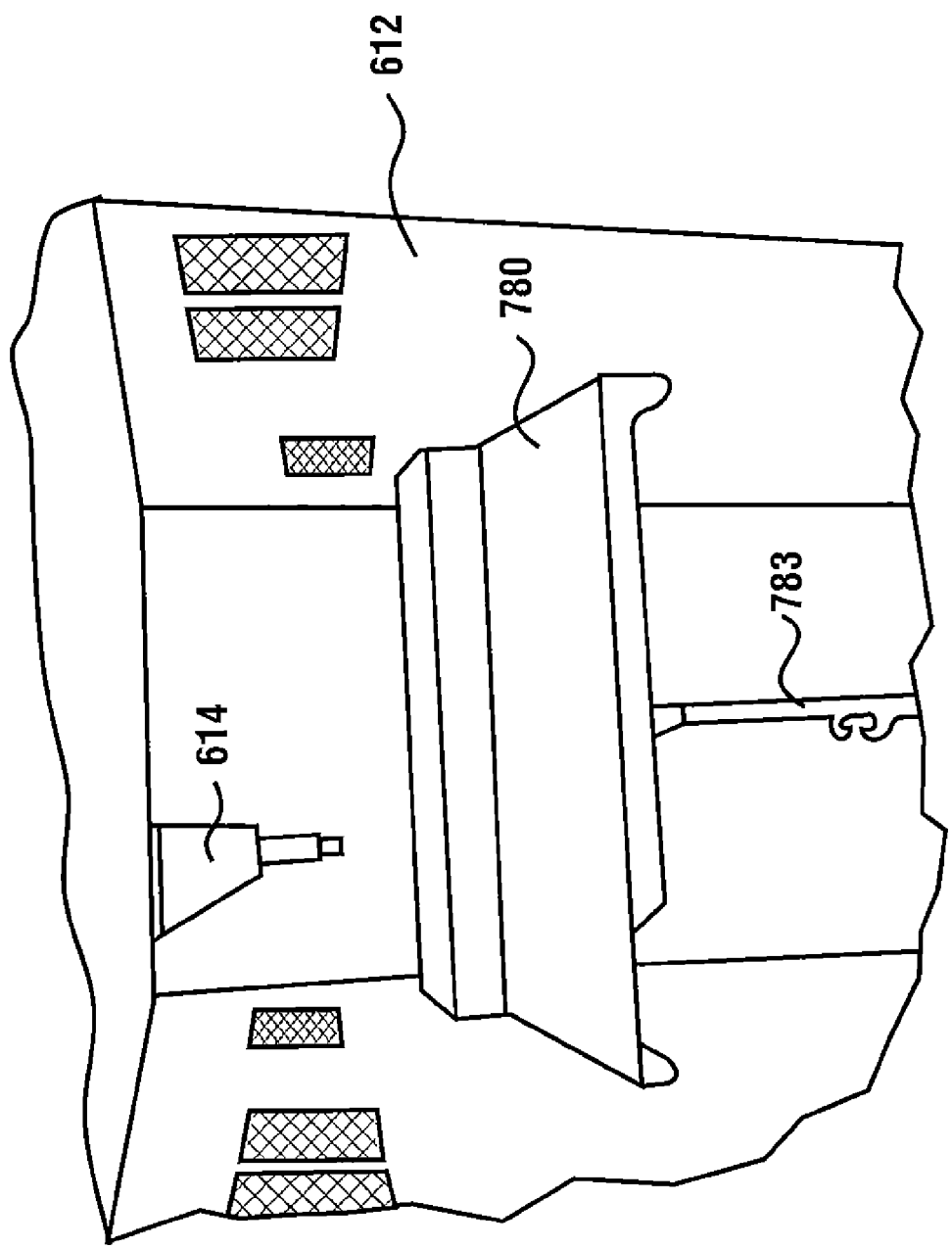
FIG. 31 is a perspective view of an exemplary component support within a top housing.
Figure 32:
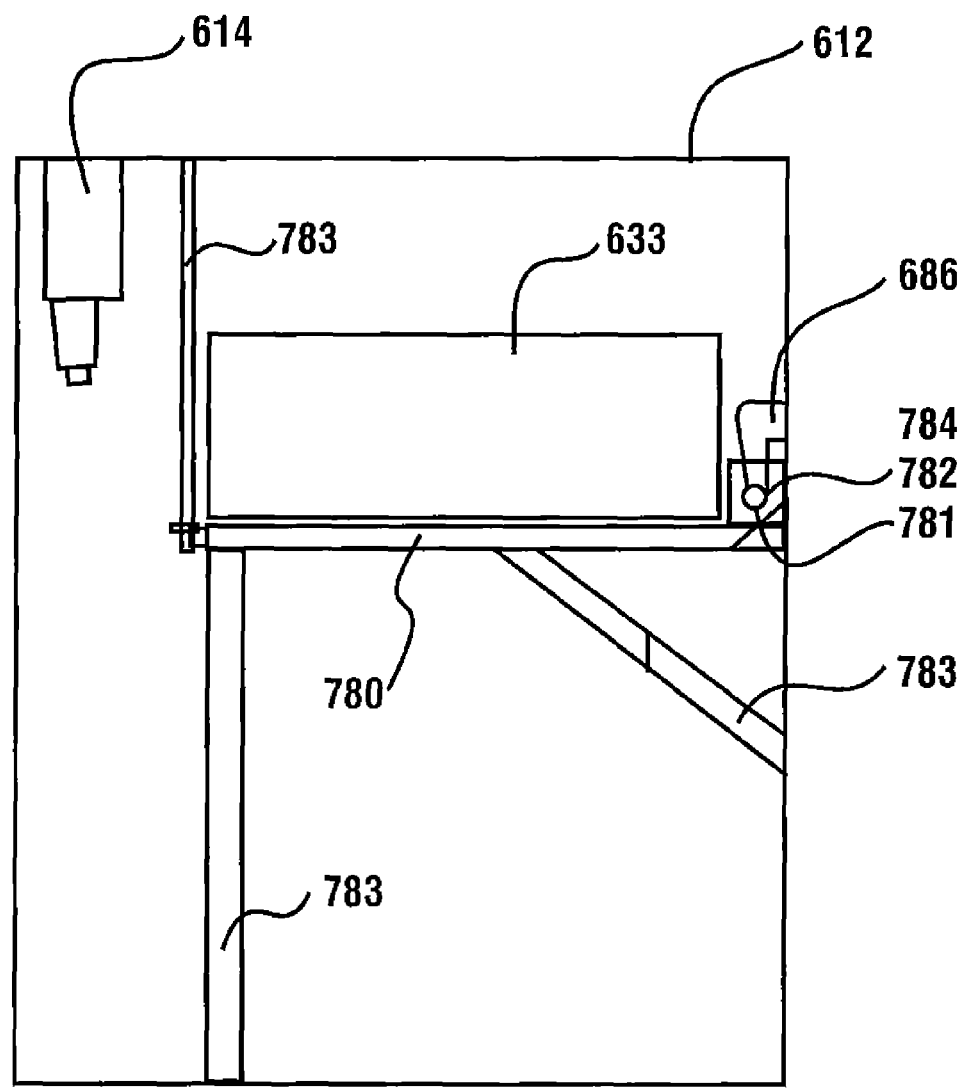
FIG. 32 is a side elevation cutaway schematic view of an exemplary component mounting within a top housing.
Figure 33:
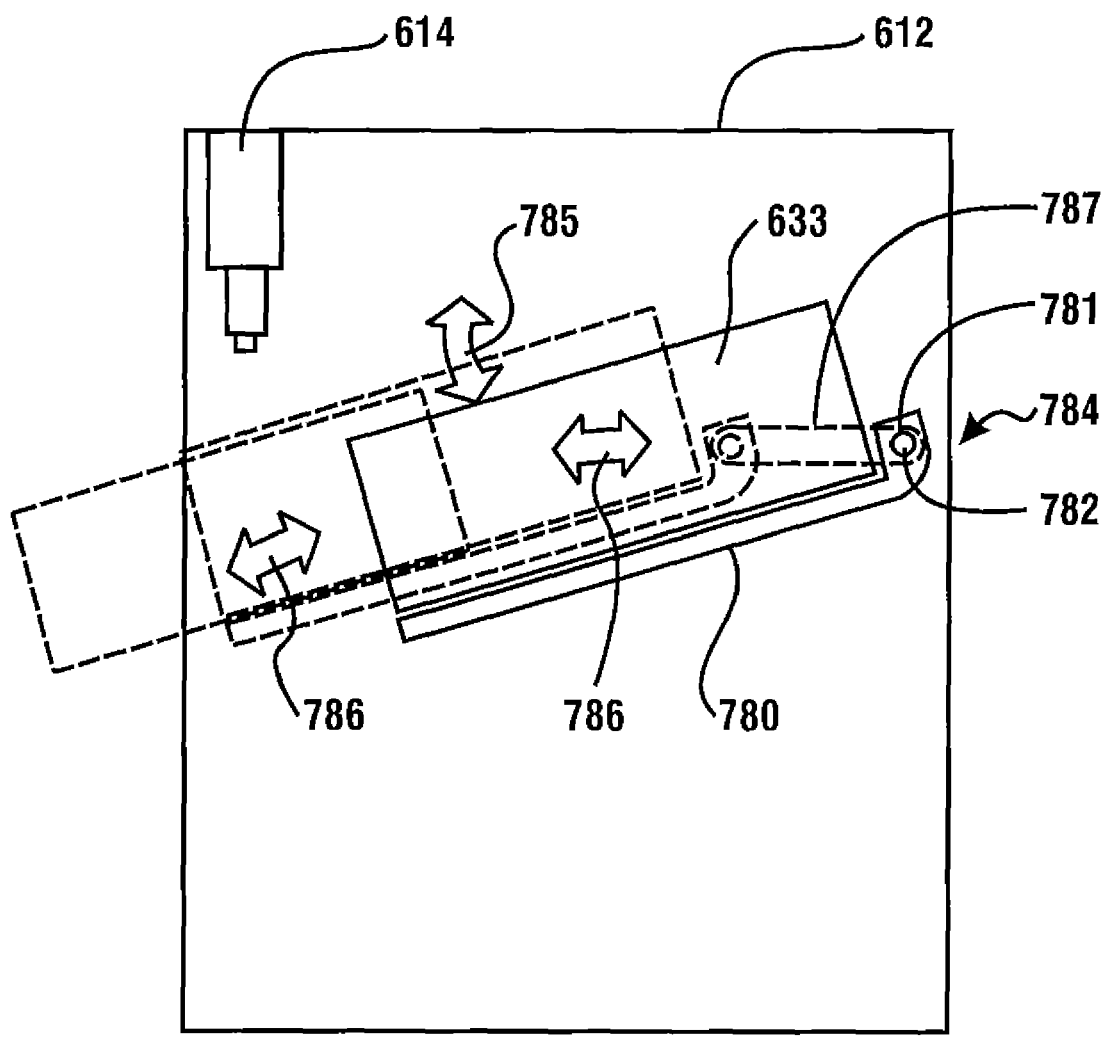
FIG. 33 is a side elevation cutaway view of an exemplary component mounting within a top housing illustrating pivoting and sliding motions of a component.
Figure 34:
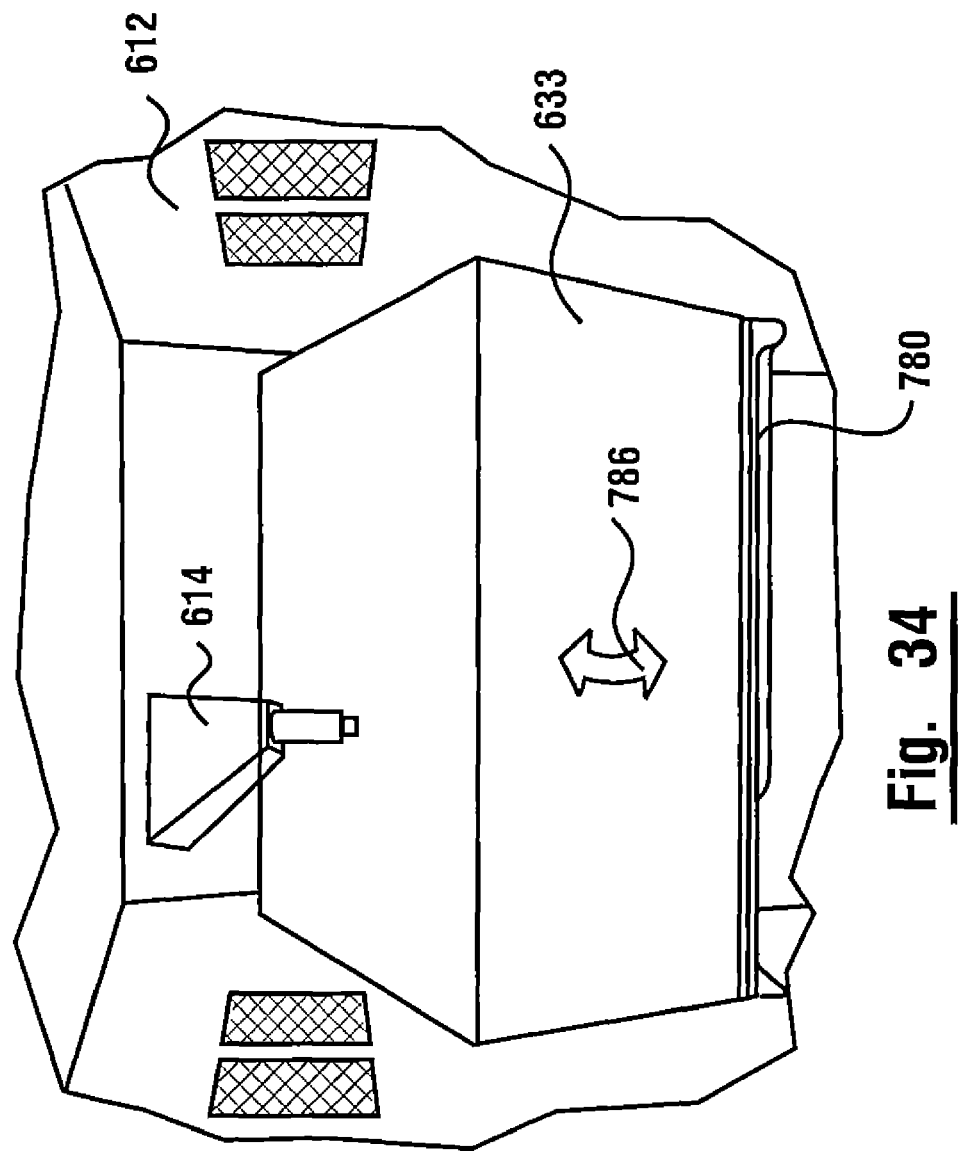
FIG. 34 is a perspective view of a component mounting illustrating the component rotated downward and showing a slideable motion of the component.
Figure 35:
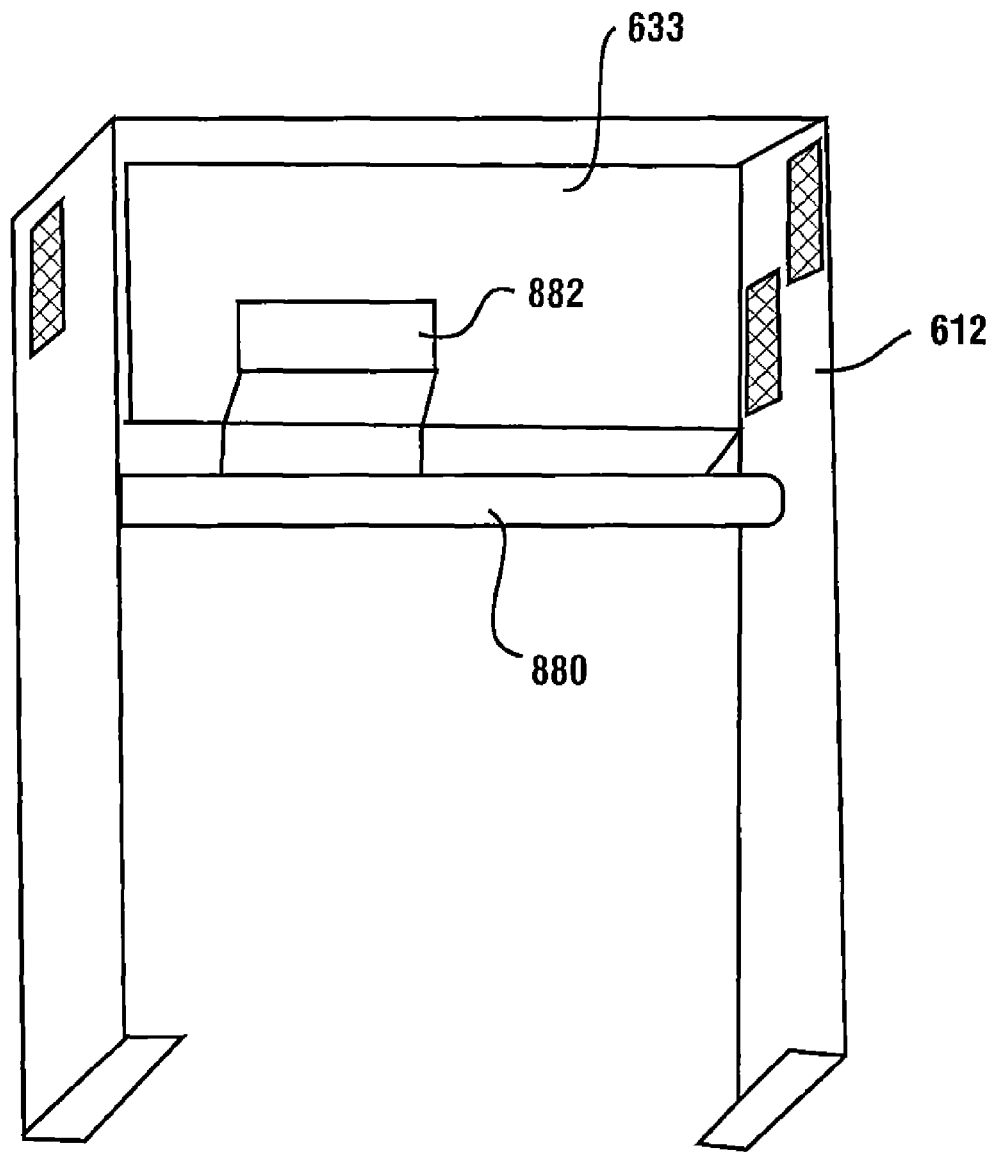
FIG. 35 is an isometric view of a further exemplary component mounting.

Turning now to FIG. 31, a further exemplary embodiment shows a housing 612 which includes an obstruction 614 which may be, for example, a bracket for a fascia 86 (FIG. 1). As can be seen in FIG. 32, in this exemplary embodiment straight-out removal or servicing in place of the component 633 may be difficult. By allowing the component 633 to drop down from the operative position as shown in FIGS. 33 and 34, improved access to the component 633 is afforded. This may include for example when the component is a processor case, removal of the top, which enables access to and replacement of circuit cards and other components therein. In some situations the top may be releasably held to the case through fasteners, which fasteners become more readily accessible for release or removal in the service position. The exemplary component support 780 may be releasably supported by a support 783. As shown in FIGS. 31 and 32, numerous configurations of the support 783 are possible.

Focusing now on FIG. 33, a pair of tracks 787 (shown in phantom) which are alternatively referred to as pivoting links may be provided to provide further movement of the component 633. For example, the tracks 787 may be operatively in connection with the housing 612 and also comprise the pivot socket 781. The pivot pin 782 extends into the track 787 and enables the component 633 to be moved in a direction outward from the housing guided by the tracks 787. As will be appreciated by those skilled in the art, in some embodiments the pin 782 may be connected with the housing 612 and the track 787 connected to the component 633. As shown, the component 633 may be supported on a component support 780 and a support bracket 686 attached to the housing 612 (FIG. 32). Of course these approaches are exemplary and in other embodiments other approaches may be used.

An exemplary embodiment includes a method for manufacturing an automated banking machine. The method includes mounting a housing in supporting connection with a chest adapted for use in an automated banking machine; installing, in operatively supported connection with the housing, a card reader, a display, a cash dispenser, a printer, and the automated banking machine component which in this exemplary embodiment comprises a processor case housing at least one computer processor. The component is installed to pivot about a horizontal axis relative to the housing. For example, the component is installed to be moved from a operational position to a service position where the component is more easily serviced. The exemplary component is further secured at a portion of the component spaced from the pivot axis to limit pivotal movement of the component. (FIG. 27, e.g.)

In an exemplary embodiment, the component which is installed comprises a processor case which may house at least one processor. The processor case may include a movable and/or removable side, which when moved or removed provides access to circuit cards, processors and other items within the processor case. In exemplary embodiments the top of the processor case is held in place with removable fasteners that become accessible for removal when the processor case is moved from the operating position to a service position. In a further exemplary embodiment, means for enabling the component to slide relative to the housing is provided. (FIG. 33, e.g.) This may include, for example, a support surface, tracks or slides for example. Thus, the component may be pivoted from the operational position to a service position and further slideably moved such that at least a portion of the component extends from the housing.

In a further exemplary embodiment, the method comprises securing a support bracket in operative connection with the housing, the support bracket comprising a first pivot element. For example, the first pivot element may comprise an upwardly facing lip FIG. 28), a pivot pin, and/or a pivot socket. The method further comprises installing a component support in pivotal supported connection with the support bracket, the component support comprising a second pivot element. For example, the second pivot element may comprise a downwardly facing lip (FIG. 28), a pivot socket, and/or a pivot pin. The first pivot element and the second pivot element then operatively combine to provide the pivotally supported connection for the component. The component is installed in supported connection on the component support. In a further exemplary embodiment, a pair of tracks are installed to enable the component to be slideably moved relative to the housing. For example, the tracks may be secured to the housing and comprise a pivot socket. As installed, pivot pins of the component support operate in combination with the track pivot socket to provide the pivotally supported connection for the component. (FIG. 33, e.g.) As will be appreciated by those skilled in the art, in exemplary embodiments the track pivot socket may be attached to the component support and the pivot pins may be attached to the housing. In a further exemplary embodiment, the component is slideably installed onto the component support through, for example, bayonet slides or a slideable support tray. (FIG. 33, e.g.)

A further exemplary embodiment includes a method for servicing an automated banking machine. The method comprises accessing an interior area of a housing of an automated banking machine. This may be done by unlocking a lock and then opening a door or cover that closes an opening to an interior area of the housing. In operatively supported connection with the housing are a card reader, a display, a cash dispenser, and an automated banking machine component which comprises a processor case. The exemplary automated banking machine component is at least partially within the housing interior and in horizontally pivotally supported first connection with the housing and in releasably supported connection with the housing. (FIG. 27, e.g.) The method further comprises releasing the component second connection. In an exemplary embodiment, the step of releasing the component second connection comprises loosening a screw or other one or more fasteners. This enables the component to pivot downward from an operative position to a first service position. (FIG. 29, e.g.) The exemplary method further comprises servicing the component, pivoting the component from the first service position to the operational position, and securing the second connection. As will be appreciated by those skilled in the art, servicing may involve numerous activities, including, by way of example only, for some components routine maintenance, adding components, testing components repairing, replacing entire components or portions thereof, adjusting, cleaning, lubricating, and removing or replenishing consumables.

In a further exemplary embodiment, the component is a processor case comprising a processor and circuit cards. In this exemplary embodiment the method further comprises, while servicing the component, removing a portion of the processor case, such as circuit cards, servicing elements within the processor case, and replacing the portion of the processor case. This may include for example, removing a top or top panel from the processor case to provide access to the interior of the processor case through the top thereof. Removing the top or panel may include removing screws or other fasteners which releasably hold the top thereof to the case.

Since in some situations it may be desirable to remove the component from the housing for further servicing, in a further exemplary embodiment, the method comprises disconnecting the component first connection such as disconnecting one or more electrical connectors, and removing the component from the housing interior. This may include lifting the component from the pivotal connection with the housing so as to disengage the component and housing, and then removing the component from the housing interior area. Subsequent to servicing the component outside the housing, the component is placed in supporting connection within the housing interior and the first connection reconnected.

In a further exemplary embodiment, the component is supported on a component support, the housing comprises a first pivot element, the component support comprises a second pivot element, and the first pivot element and the second pivot element operatively engage and combine to provide the pivotally supported first connection of the component with the housing. The method further comprises removing the component from the component support, and, subsequent to servicing the component, placing the component back on the component support.

In a further exemplary embodiment, the housing further comprises a support bracket operatively connected thereto and the support bracket comprises a first pivot element. The component such as a processor case is supported on a component support and the component support comprises a second pivot element. The first pivot element and the second pivot element operatively engage and combine to provide the pivotally supported first connection of the component with the housing. The method further comprises removing the component from supported connection with the component support and, subsequent to servicing the component outside the machine housing, placing the component on the component support.

In a further exemplary embodiment, the machine housing further comprises a support bracket secured thereto and the support bracket comprises a first pivot element. The component is supported on a component support and the component support comprises a second pivot element. The first pivot element and the second pivot element operatively combine to provide the pivotally supported first connection of the component with the housing. The method further comprises removing the component support with the component from the housing. Subsequent to servicing, the component support with the component are pivotally placed onto the support bracket.

It may be desirable to move the component toward the opening of the housing after pivoting the component from the operational position to the first service position. In a further exemplary embodiment, a pair of tracks are provided in operative connection with the pivot. (FIG. 33, e.g.) The tracks enable the component, after being pivoted from the operational position to the first service position, to be moved toward the opening of the housing along the track. The exemplary method further comprises moving the component along the tracks from the first service position to a second service position. After servicing, the component is moved from the second service position to the operational position.

It may be further desirable to slideably support the component on a component support. (FIG. 33, e.g.) In a further exemplary embodiment, the method comprises sliding the component relative to the component support.

Figure 39:
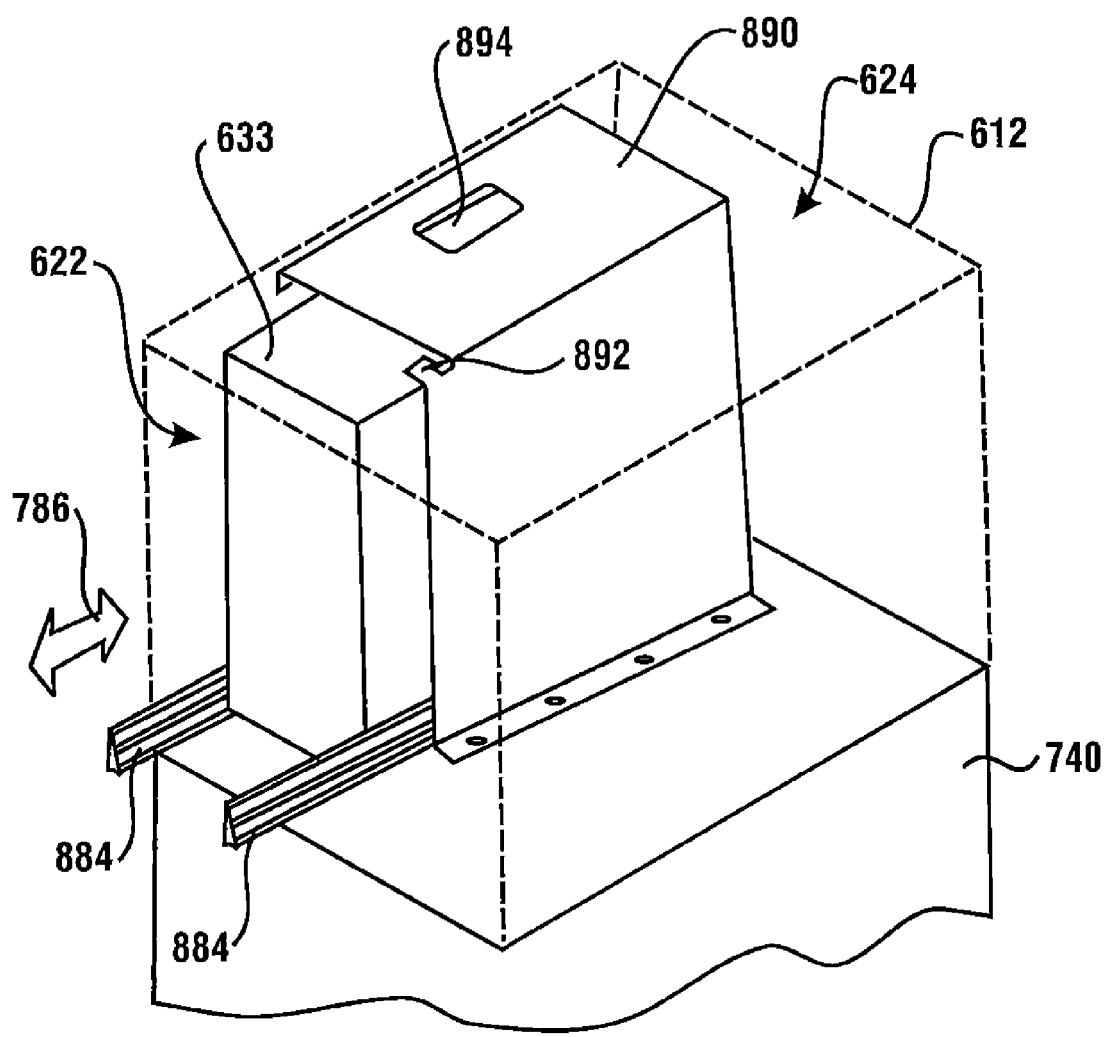
FIG. 39 is an isometric view of an exemplary component mounting illustrating a shroud partially enclosing a component.

Turning now to FIGS. 39-42, illustrated is a portion of an exemplary automated banking machine 10 (shown generally in FIG. 3). In operatively supported connection with a housing 612 (shown in phantom) is an automated banking machine component 633. The housing 612 comprises a front opening 622 and a rear opening 624. The automated banking machine 10 further comprises a shroud 890 in operatively supported connection with the housing 612. The shroud 890 is adapted to at least partially enclose the automated banking machine component 633. The shroud 890 comprises in operative connection therewith a first alignment tab 892 configured to align the automated banking machine component 633 in the vertical direction. As can be seen in FIG. 39, the first alignment tab 892 also functions to at least partially secure the component 633 in place. The exemplary shroud further comprises in operative connection therewith a second alignment tab 894 configured to align the component in a first horizontal direction. As can be seen in FIG. 39, the exemplary second alignment tab 894 also functions to at least partially secure the component 633 in place.

Figure 40:
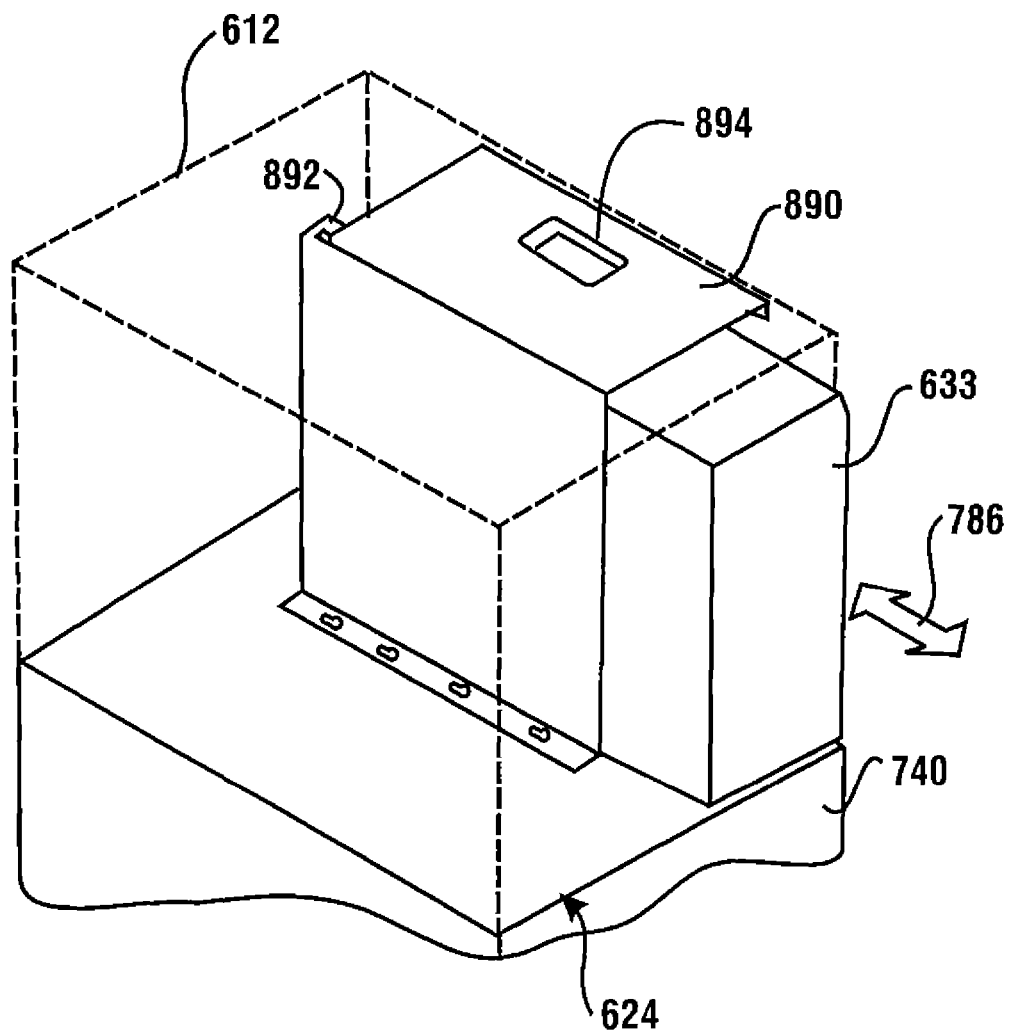
FIG. 40 is an isometric view of the component mounting shown in FIG. 39 illustrating movement of the component from within the shroud.
Figure 41:
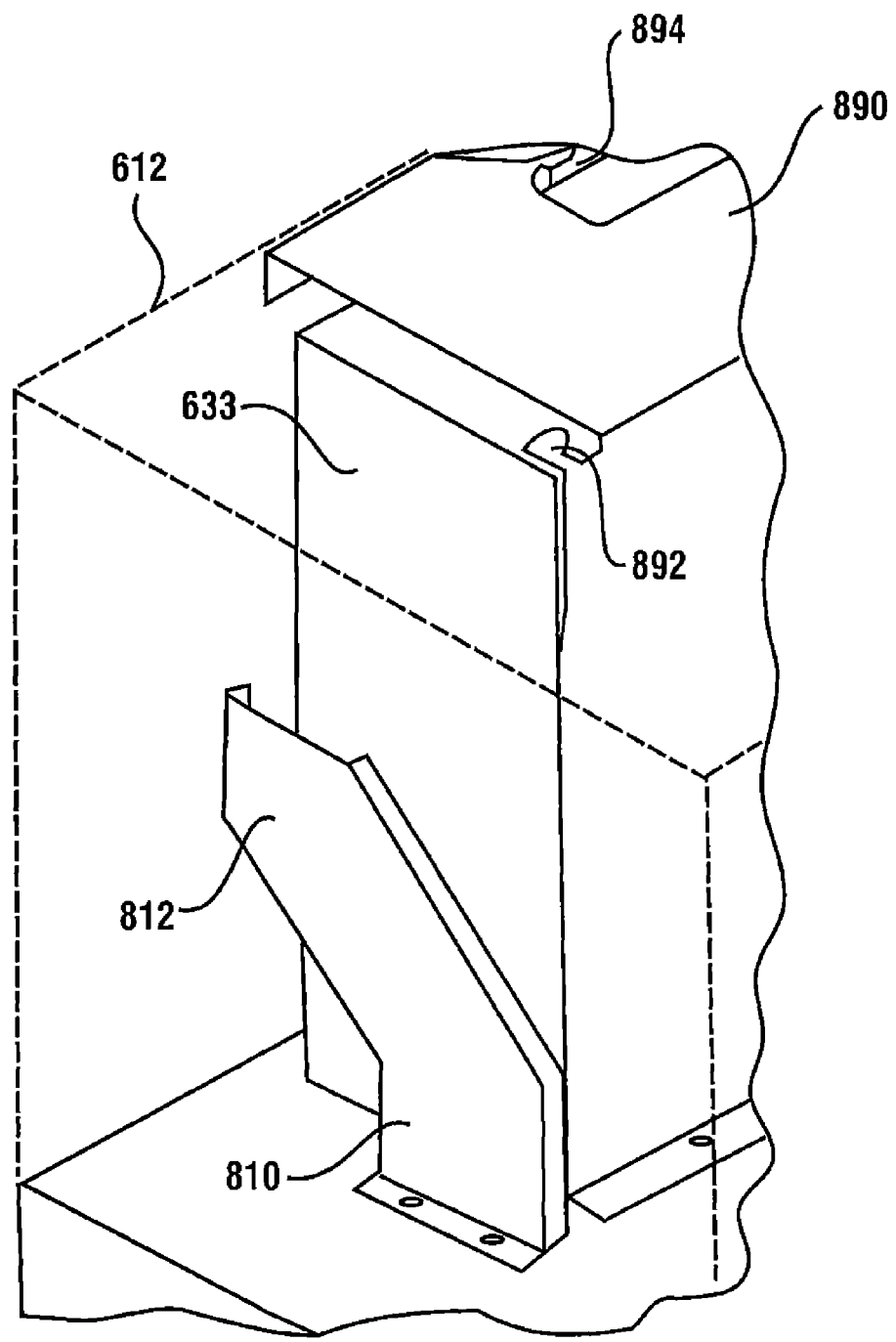
FIG. 41 is an isometric view of an exemplary component mounting illustrating a plenum component retainer.
Figure 42:
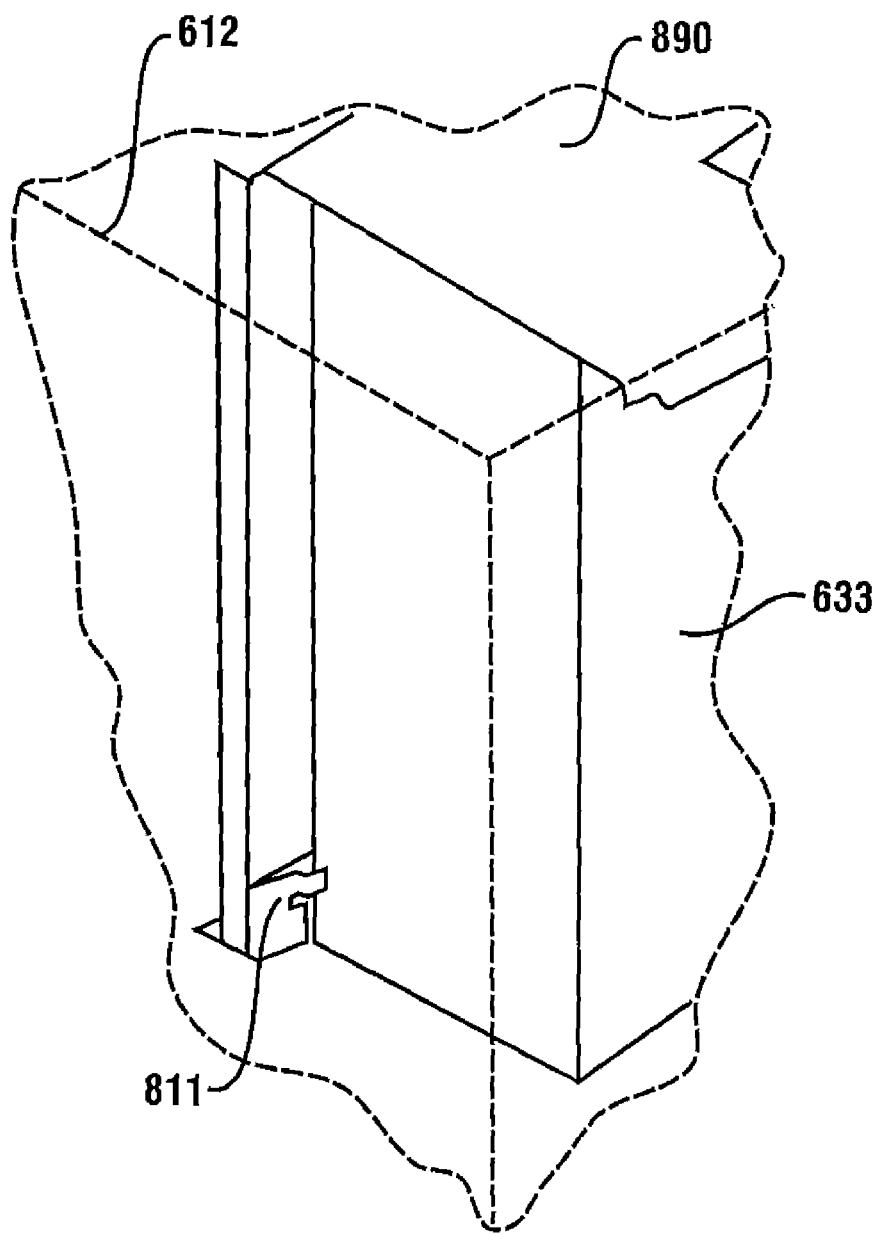
FIG. 42 is an isometric view of an exemplary component mounting illustrating a further component retainer.

As shown in FIGS. 39 and 40 by direction arrow 786, the component 633 may be moveable toward the front opening 622 and the rear opening 624 of the housing 612. In a further exemplary embodiment, the component 633 is moveable from an operational position to a first service position toward the front opening 622 of the housing 612 and moveable from the operational position to a second service position toward the rear opening 624 of the housing 612. Mounting the component 633 on bayonet slides 884 or a slideable support tray (FIG. 47), for example, enables the component 633 to more readily move in the directions of the direction arrow 786. As it may be desirable to further limit movement of the component 633, the component 633 may be retained, for example, by a retainer 810 comprising, for example a processor air exhaust plenum 812 (FIG. 41) or a spring-loaded finger 811 (FIG. 42). In an exemplary embodiment, the automated banking machine component 633 comprises a processor case and the processor case houses at least one processor.

Figure 43:
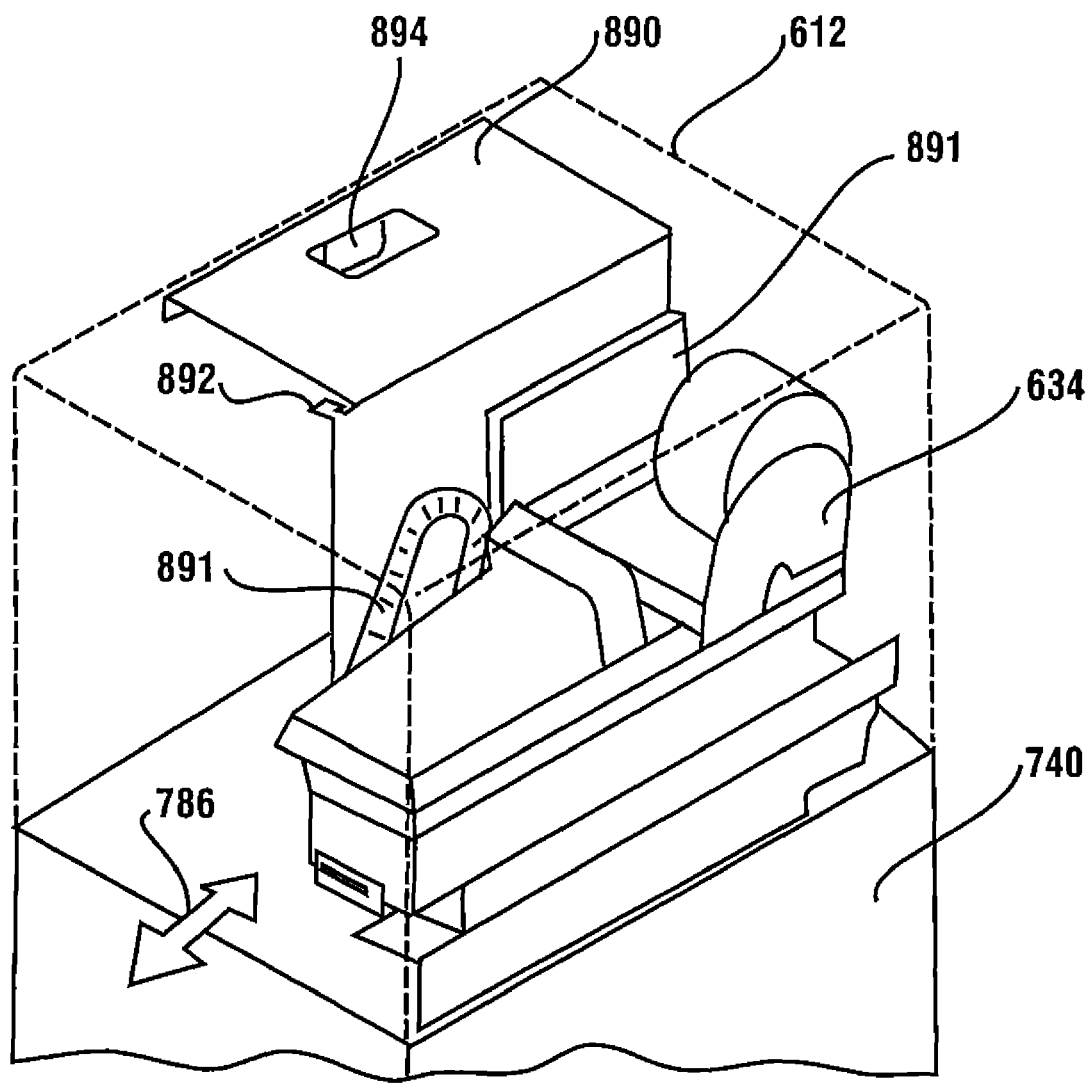
FIG. 43 is an isometric view of an exemplary component mounting illustrating a second component with ancillary components mounted on the shroud.
Figure 44:
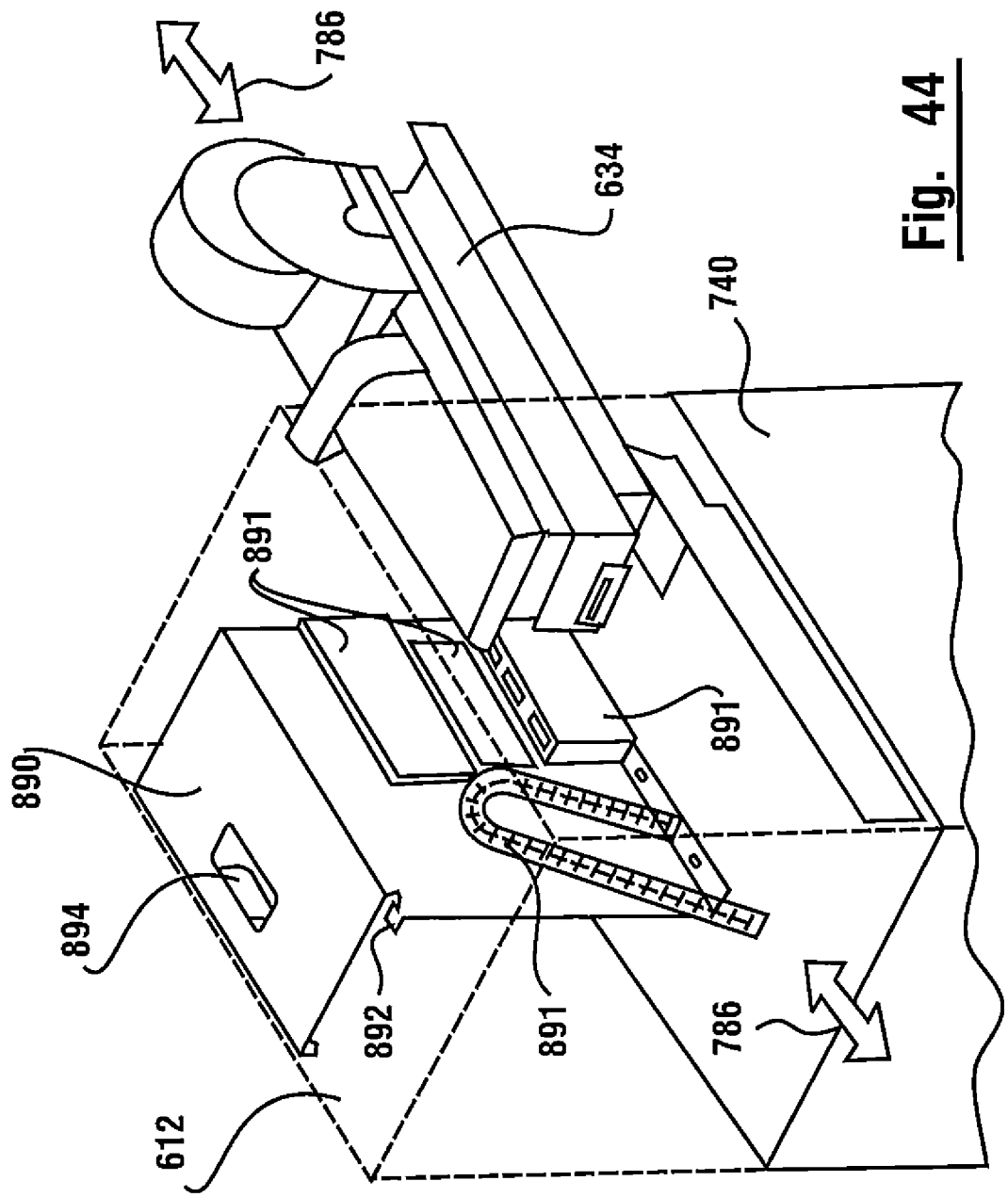
FIG. 44 is an isometric view of the component mounting of FIG. 43 showing the second component moved to a position to expose the ancillary components.
Figure 45:
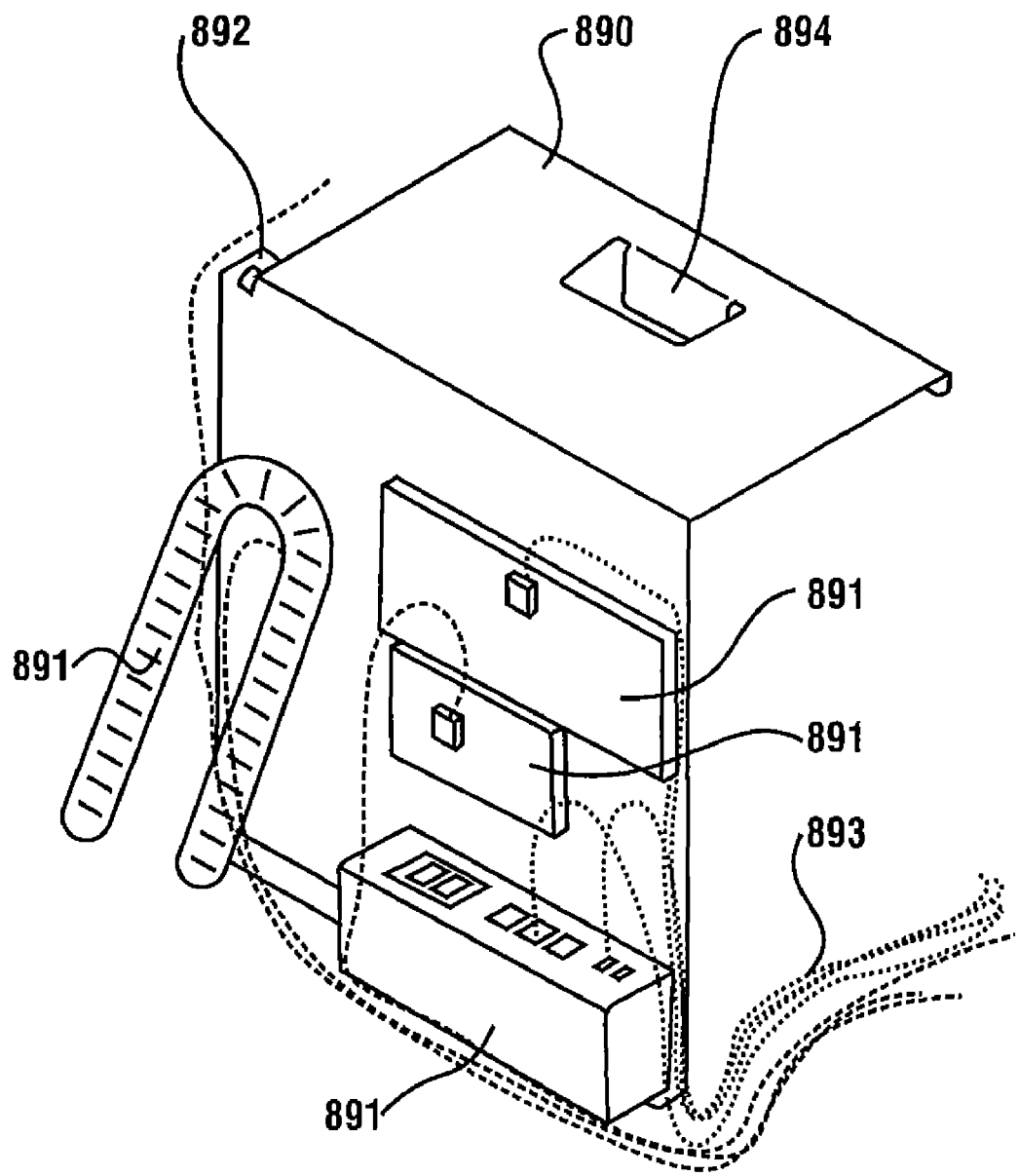
FIG. 45 is an isometric view of the ancillary components.
Figure 46:
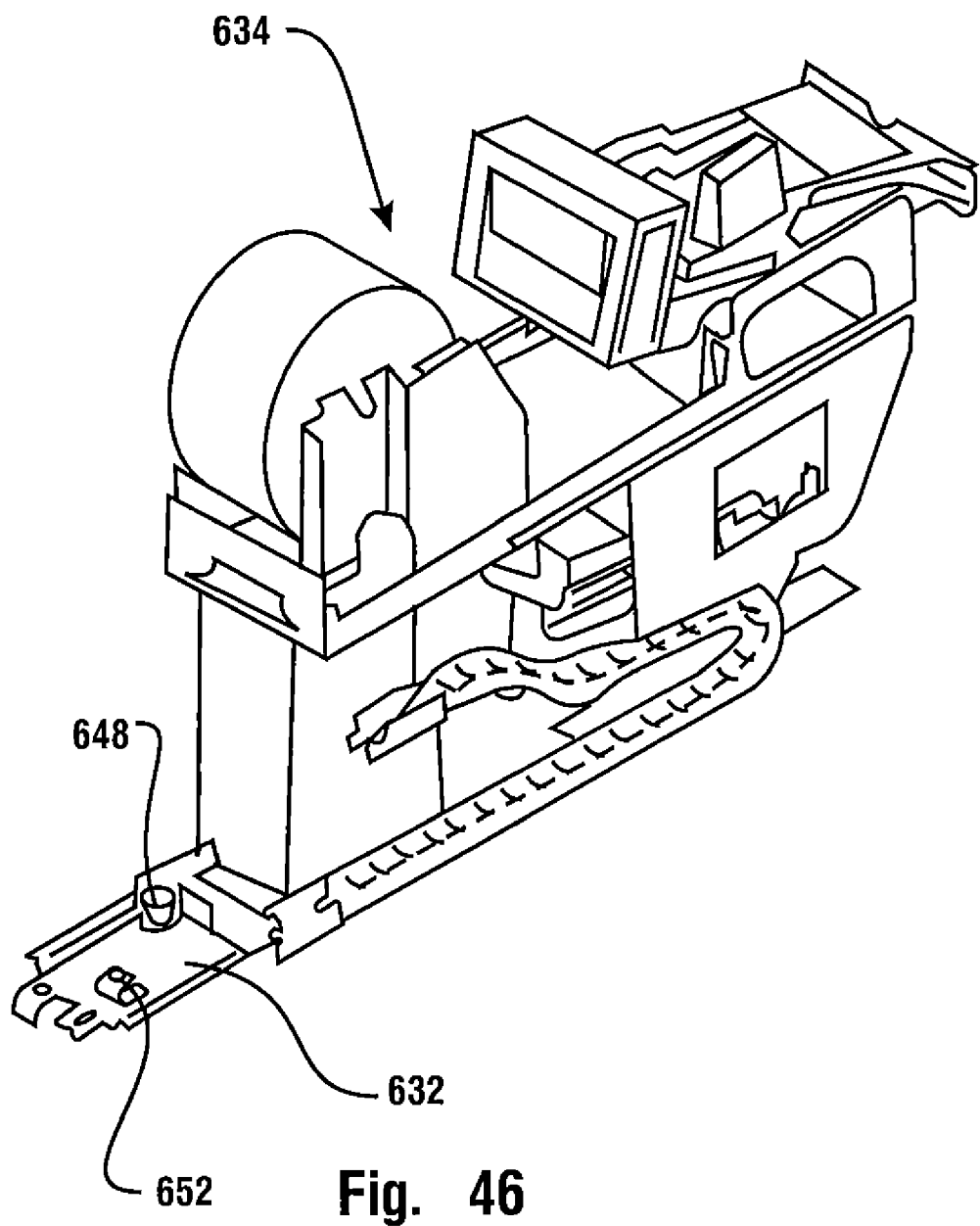
FIG. 46 is an isometric view of the second component mounted on a slideable support tray.
Figure 47:
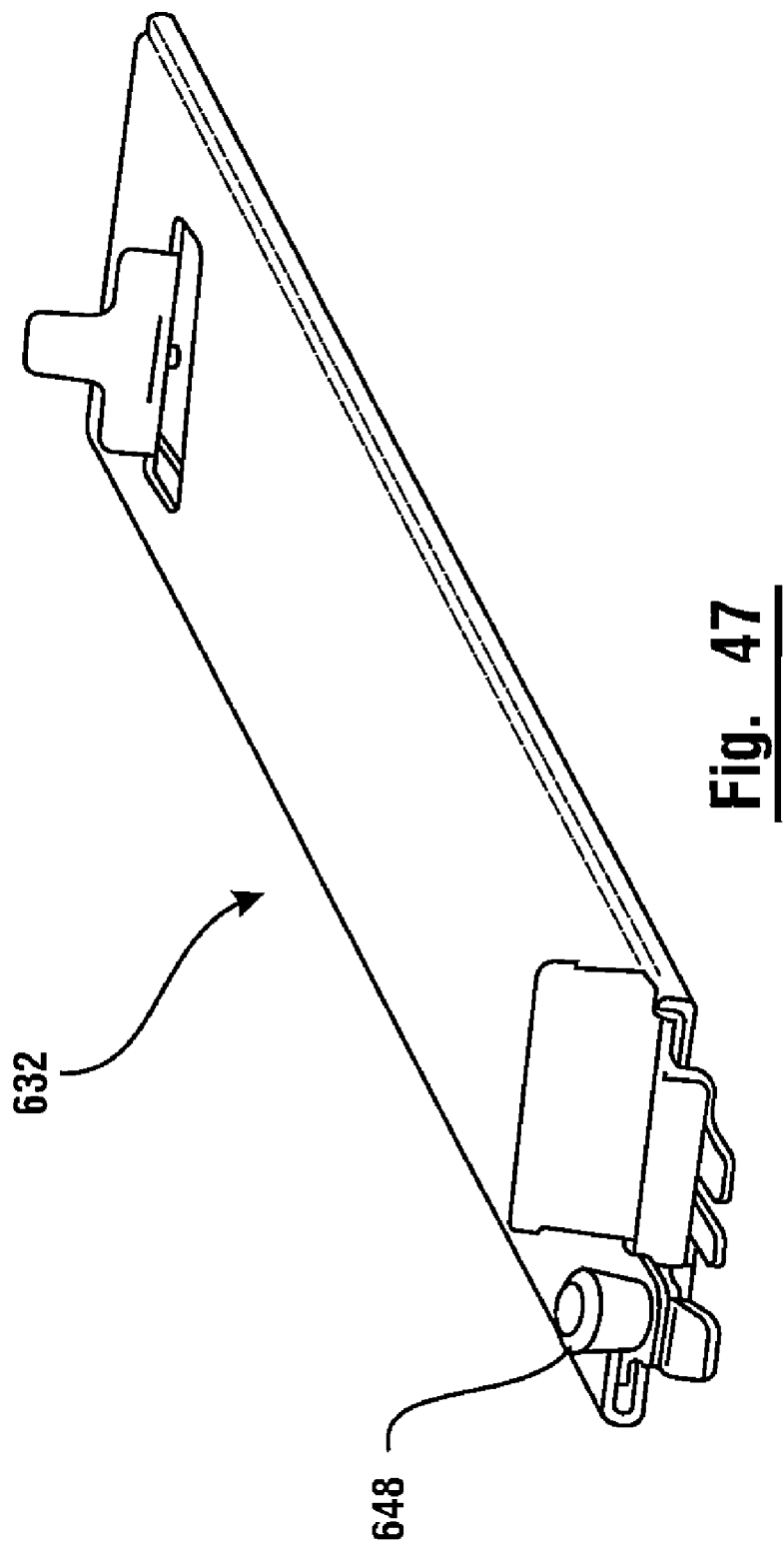
FIG. 47 is an isometric view of a slideable support tray.

A further exemplary embodiment is shown in FIGS. 43-47. Turning to FIG. 43, a second automated banking machine component 634 is in slideably operatively supported connection with the housing 612 (shown in phantom) and in a spaced-apart relation with the exemplary shroud 890. At least one ancillary banking machine component 891 is secured between the shroud 890 and the second automated banking machine component 634. The at least one ancillary banking machine component 891 may comprise electrical or electronic components such as circuit cards, a transformer, and wiring and cables 893 (best seen in FIG. 45). The second automated banking machine component 634 may, for example, be mounted on a pair of bayonet slides 884 as shown in FIG. 39 or on a slideable support tray 632 as shown in FIGS. 46 and 47. The exemplary slideable support tray 632 comprises a latch 648, which may be spring-loaded, and may comprise one or more bearings 652 such as a nylon button.

A further exemplary embodiment includes a method for manufacturing an automated banking machine. The method includes mounting a housing in supporting connection with a chest adapted for use in an automated banking machine; installing, in operatively supported connection with the housing, a card reader, a display, a cash dispenser, and a printer. The method further comprises installing an automated banking machine component such as a processor case in operatively supported connection with the housing. The automated banking machine component is moveable between an operational position and a first service position and the operational position and a second service position. The exemplary method further comprises installing a shroud, the shroud at least partially enclosing the automated banking machine component. The shroud comprises a first alignment tab, formed to align the component in the vertical direction, and a second alignment tab, formed to align the component in a first horizontal direction. (FIG. 39, e.g.) The method further comprises installing a retainer, formed to limit the movement of the component in a second horizontal direction. (FIG. 41, e.g.) In a further exemplary embodiment, the method further comprises installing a second retainer, formed to limit the movement of the component in a third horizontal direction.

In a further exemplary embodiment, the method further comprises installing a further banking machine component in operatively supported connection with the shroud. (FIG. 43-45, e.g.) The further banking machine component may be, for example, an electrical or electronic component such as a circuit card, transformer, and combinations thereof and may include wiring or cables. In a further exemplary embodiment, the method further comprises installing a second automated banking machine component in slideable operatively supported connection with the housing and in a spaced-apart relation to the shroud, wherein the further banking machine component is between the shroud and the second component. (FIG. 43, e.g.) In a further exemplary embodiment, the method further comprises installing a slideable support tray (FIG. 47) in operationally supported connection with the housing and installing the second component on the slideable support tray (FIG. 46).

A further exemplary embodiment includes a method for servicing an automated banking machine. The method comprises accessing an interior of a housing of an automated banking machine, where the housing includes, in operatively supported connection with the housing, an automated banking machine component moveable from an operational position to a first service position toward a front housing opening and moveable from the operational position to a second service position toward a rear housing opening. Also in operatively supported connection with the housing is a shroud which is adapted to at least partially enclose the automated banking machine component. The shroud comprises a first alignment tab, formed to align the automated banking machine component in the vertical direction and a second alignment tab formed to align the automated banking machine component in a horizontal direction. The method further comprises releasing a latch limiting movement of the component from the operational position, moving the component from the operational position to one of the first or second service positions, servicing the component, moving the component to the operational position, and securing the latch. (FIGS. 39 and 40, e.g.) In a further embodiment, the latch is a spring-loaded finger and the method further comprises depressing the finger while performing the step of releasing the latch limiting movement of the component from the operational position. (FIG. 42, e.g.) In a further embodiment, the component is supported on a slideable support tray which includes a spring-loaded latch and the method further comprises releasing the latch while performing the step of releasing the latch limiting movement of the component from the operational position.

A further exemplary embodiment includes a further method for servicing an automated banking machine. The method comprises accessing an interior area of a housing of an automated banking machine, where the housing includes, in operatively supported connection with the housing, a shroud adapted to at least partially enclose a first automated banking machine component, a second automated banking machine component in slideable connection with the housing and in a spaced-apart relation to the shroud, and a further banking machine component secured between the shroud and the second component. The second component is moveable between an operative position adjacent the shroud and a service position toward an opening of the housing. In a further embodiment, the second component is supported on a slideable support tray having a spring-loaded latch and the method further comprises releasing the latch prior to moving the second component from the operational position to the service position While the exemplary embodiments include particular structures and steps to achieve the desirable results, those having skill in the art may devise numerous other embodiments with other structures which employ the same principles described herein and which are encompassed by the subject matter as claimed.

Thus the exemplary embodiments achieve at least some of the above stated objectives, eliminate difficulties encountered in the making and use of prior devices, solve problems, and attain the desirable results described herein.

In the foregoing description certain terms have been used for brevity, clarity, and understanding. However, no unnecessary limitations are to be implied therefrom because such terms are for descriptive purposes and are intended to be broadly construed. Moreover, the descriptions and illustrations herein are given by way of examples and the invention is not limited to the exact details shown and described.

In the following claims any feature described as a means for performing a function will be construed as encompassing any means capable of performing the recited function, and will not be deemed limited to the particular means shown as performing that function in the foregoing description or mere equivalents thereof.

Having described the features, discoveries, and principles of the invention, the manner in which it is constructed and operated, and the advantages and useful results attained; the new and useful structures, devices, elements, arrangements, parts, combinations, systems, operations, methods, and relationships are set forth in the appended claims.

We claim:

1. Apparatus, comprising:
an automated banking machine that is operable responsive at least in part to data read from data bearing records to cause financial transfers, including:
a secure enclosure including a chest;
a housing in operatively supported connection with the chest,
wherein the housing includes an interior area above the chest,
wherein the housing includes at least one opening,
wherein the at least one opening includes a housing opening;
a card reader,
wherein the card reader is operative to read card data from user cards,
wherein the card data corresponds to financial accounts;
a display;
a cash dispenser,
wherein the cash dispenser is selectively operative to dispense cash housed in the chest to machine users;
a fascia assembly,
wherein the fascia assembly is movably mounted in operatively supported connection with the chest,
wherein the fascia assembly is moveable between
a closed position adjacent the housing opening,
wherein in the closed position at least a portion of the housing opening is covered by the fascia assembly, and
a released away position,
wherein in the released away position the fascia assembly is disposed away from the housing opening; and
a processor case,
wherein the processor case is in operatively supported movable connection with the housing,
wherein the processor case is rotatably movable within the housing about a generally horizontal axis.

2. The apparatus of claim 1, and further comprising:
a support bracket in fixed operative connection with the housing, wherein the support bracket is in operative connection with a first pivot element;
a component support, wherein the component support is in operative connection with a second pivot element, wherein the first and second pivot elements are releasably engageable, and wherein in engaged relation the first and second pivot elements are operative to enable the component support to rotatably move about the generally horizontal axis;
wherein the processor case is operatively supported on the component support.

3. The apparatus of claim 2, wherein:
the first pivot element comprises a generally upward extending lip; and
the second pivot element comprises a generally downward extending lip.

4. The apparatus of claim 2, wherein:
the processor case is movable horizontally within the housing in operatively supported connection with the component support.

5. The apparatus of claim 4, wherein the component support further includes a generally vertically extending support portion, wherein the support portion is disposed in spaced-apart relation from the second pivot element, and further comprising at least one releasable fastener, wherein the at least one releasable fastener is operative to releasably engage the support portion and the housing in fixed relation; and wherein when the at least one fastener is not engaged to hold the support portion and the housing in fixed relation, the processor case is rotationally movable in supported connection with the component support between an operative position and a service position.

6. The apparatus of claim 5, wherein in the service position the processor case is horizontally movable in operatively supported connection with the component support.

7. The apparatus according to claim 6, wherein the processor case comprises a removable top, whereby components in the processor case are service accessible with the top removed.

8. The apparatus according to claim 1, wherein the processor case is movable in supported operative connection within the interior area of the housing, both rotationally about the generally horizontal axis and in a horizontal direction.

9. The apparatus according to claim 1, and further comprising a support tray, wherein the processor case is operatively supported within the housing on the support tray, wherein the support tray is rotatable within the interior area of the housing,
and wherein the support tray further includes at least one lip portion in operative connection therewith, wherein the support tray is rotatable about the at least one lip portion.

10. The apparatus according to claim 9 and further comprising at least one engaging portion in fixed operative connection with the housing, wherein the at least one engaging portion is releasably rotatably engageable with the at least one lip portion,
wherein disengagement of the at least one lip portion and the at least one engaging portion enables the processor case to be removed from the interior area of the housing.

11. A method carried out with an automated banking machine that is operable responsive at least in part to data read from data bearing records to cause financial transfers, comprising:
(a) accessing an interior area of a housing of the automated banking machine, wherein the interior area is positioned above a chest, and wherein the automated banking machine includes:
a card reader,
wherein the card reader is operative to read card data from user cards wherein the card data corresponds to financial accounts;
a display;
a cash dispenser; and
a processor case,
wherein the processor case is within the interior area, and
wherein the processor case is mounted in horizontal pivotally supported connection with the housing;
(b) pivoting the processor case within the interior area while in operatively supported connection with the housing about a generally horizontal axis, from an operative position to a service position, wherein the service position is angularly disposed from the operative position;
(c) subsequent to (b), conducting service activity including accessing at least one component within the processor case.

12. The method of claim 11, and further comprising:
(d) subsequent to (b), removing a portion of the processor case, whereby the at least one component within the processor case is accessible.

13. The method according to claim 12 and further comprising:
- (e) prior to (b) changing a condition of at least one fastener, wherein the at least one fastener in a first condition is operative to hold the processor case in the operative position,
  wherein the at least one fastener in a second condition enables the processor case to pivotally move relative to the axis.

14. The method according to claim 13 and further comprising:
- (f) subsequent to (d) pivotally rotating the processor case within the interior area from the service position to the operative position; and
- (g) subsequent to (f) changing the condition of the at least one fastener to the first condition whereby the processor case is held in the operative condition.

15. The method of claim 12,
wherein the processor case is operatively supported on a component support;
  wherein the component support comprises a pivot element,
    wherein the pivot element is releasably operatively engageable with the housing;
and further comprising:
- (e) subsequent to (b), operatively disengaging the pivot element from the housing and removing the processor case from the interior area.

16. The method of claim 12,
wherein the housing further comprises a support bracket secured thereto, the support bracket further comprising a first pivot element;
wherein the processor case is operatively supported on a component support;
  wherein the component support comprises a second pivot element; and
wherein the first pivot element and the second pivot element operatively releasably engage to provide a pivotally movable connection of the processor case and the housing,
the method further comprising:
- (e) subsequent to (b), operatively disengaging the first and second pivot elements and removing the processor case from the interior area.

17. The method according to claim 12, wherein the processor case is operatively supported on a support component, and wherein in (b) the support component is rotated from an operative position to an angled position within the housing, and further comprising:
- (e) with the component support in the angled position, moving the processor case horizontally within the interior area while in operatively supported connection with the component support.

18. The method according to claim 12 wherein in (d) the top of the processor case is removed with the processor case in the service position within the interior area.

19. The method of claim 11, and further comprising:
- (d) disconnecting an electrical connection with the processor case;
- (e) removing the processor case from the interior area;
- (f) subsequent to step (e), placing the processor case within the interior area; and
- (g) reconnecting the electrical connection.

20. The method according to claim 11,
wherein in (b) the processor case is moved from the operative position in which a top of the processor case extends generally horizontally within the interior area, to the service position,
  wherein in the service position the processor case extends generally at an acute angle relative to the operative position within the interior area,
wherein in (c) the service activity is conducted with the processor case in the service position within the housing, and further comprising:
- (d) prior to (b), changing a condition of at least one fastener within the housing, wherein changing the condition of the at least one fastener enables the processor case to move from the operative position;
- (e) subsequent to (c), moving the processor case pivotally about the axis while in operatively supported connection with the housing, from the service position to the operative position; and
- (f) subsequent to (e), changing a condition of the at least one fastener, wherein the processor case is held in the operative condition.

* * * * *